(12) United States Patent
Okada

(10) Patent No.: US 6,227,474 B1
(45) Date of Patent: May 8, 2001

(54) SPINNING REEL WITH TENSION ROLLER FOR PREVENTING FISHING LINE TWIST

(75) Inventor: Atuhito Okada, Fuchu (JP)

(73) Assignee: Kabushiki Kaisha Johshuya, Tokyo (JP)

(*) Notice: Subject to any disclaimer, the term of this patent is extended or adjusted under 35 U.S.C. 154(b) by 0 days.

(21) Appl. No.: 09/382,953

(22) Filed: Aug. 25, 1999

(30) Foreign Application Priority Data

| Aug. 27, 1998 | (JP) | 10-241214 |
| Sep. 10, 1998 | (JP) | 10-257304 |
| Sep. 14, 1998 | (JP) | 10-260315 |
| Jan. 28, 1999 | (JP) | 11-020062 |
| Jan. 28, 1999 | (JP) | 11-020063 |
| Jan. 28, 1999 | (JP) | 11-020064 |

(51) Int. Cl.$^7$ .................................................. A01K 89/01
(52) U.S. Cl. .................. 242/231; 242/419.5; 242/150 R
(58) Field of Search ........................ D22/141; 242/231, 242/232, 150 R, 419.4, 419.5, 419.8, 151; 226/190, 192

(56) References Cited

U.S. PATENT DOCUMENTS

| 656,428 | * | 8/1900 | Sherd | 242/150 R |
| 2,086,983 | * | 7/1937 | McKean | 141/150 R |
| 2,728,534 | * | 12/1955 | Wallace | 242/231 |
| 5,513,813 | * | 5/1996 | Bernard et al. | 242/231 |
| 5,573,192 | * | 11/1996 | Tseng | 242/150 R |
| 5,681,001 | * | 10/1997 | Shinohara | 242/231 |
| 5,911,377 | * | 6/1999 | Jung | 242/231 |

FOREIGN PATENT DOCUMENTS

| 3004671 | 9/1994 | (JP) . |
| 3034701 | 12/1996 | (JP) . |
| 9-107852 | 4/1997 | (JP) . |
| 9-149749 | 6/1997 | (JP) . |

* cited by examiner

Primary Examiner—Katherine A. Matecki
(74) Attorney, Agent, or Firm—Oliff & Berridge, PLC

(57) ABSTRACT

A spinning reel having a line roller mechanism which directs a fishing line running from a tip end of a fishing rod toward a spool while applying a tension to a part of the fishing line, the part being bridging from the line roller mechanism to the spool. The line roller mechanism includes a first tension roller having a first axial end face and a second tension roller having a second axial end face confronting the first axial end face. The first and second axial end faces function as fishing line contact faces and define therebetween a fishing line guide groove. A distance between the fishing line contact faces becomes narrower toward the spool.

21 Claims, 46 Drawing Sheets

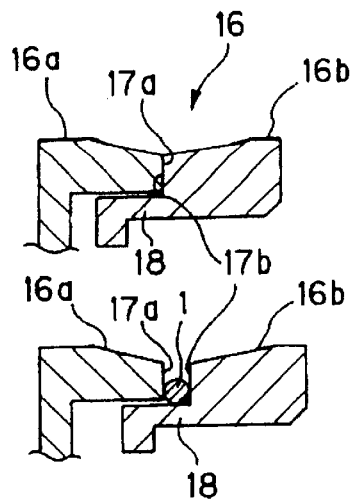
FIG. 75 (a)
FIG. 75 (b)
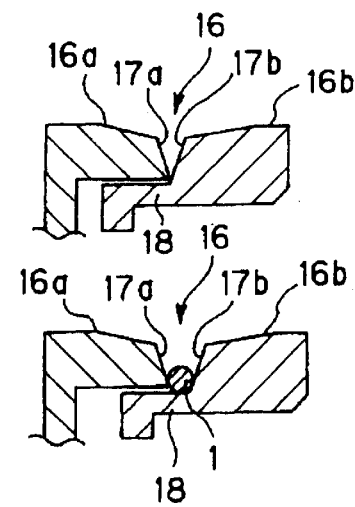
FIG. 76 (a)
FIG. 76 (b)
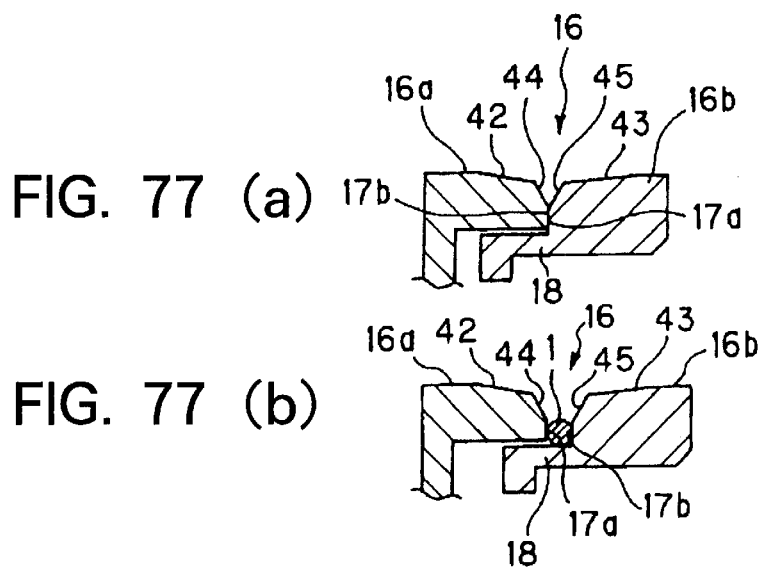
FIG. 77 (a)
FIG. 77 (b)

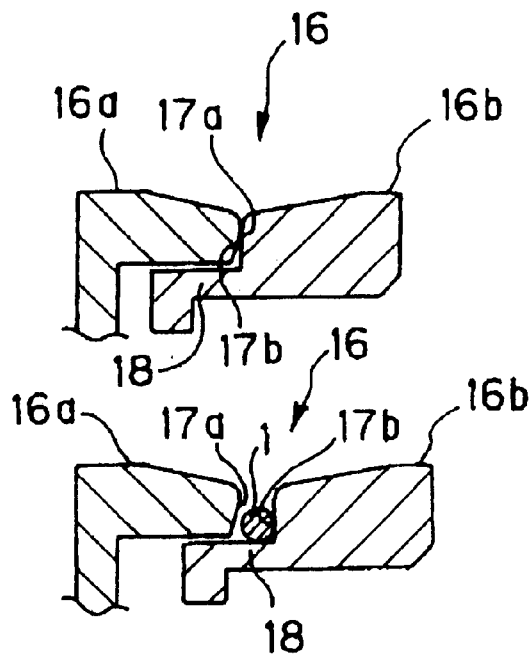
FIG. 78 (a)
FIG. 78 (b)
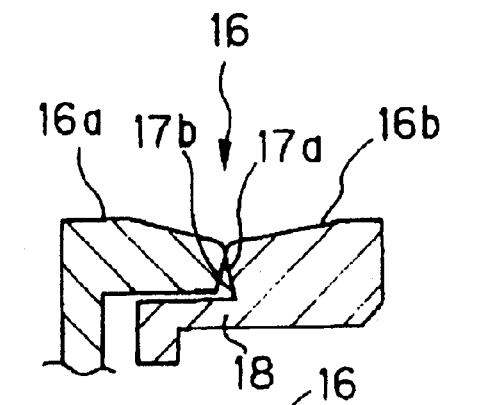
FIG. 79 (a)
FIG. 79 (b)

FIG. 80
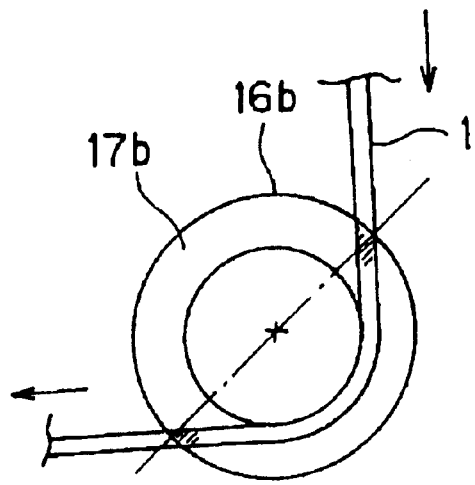
FIG. 81 (a)
FIG. 81 (b)
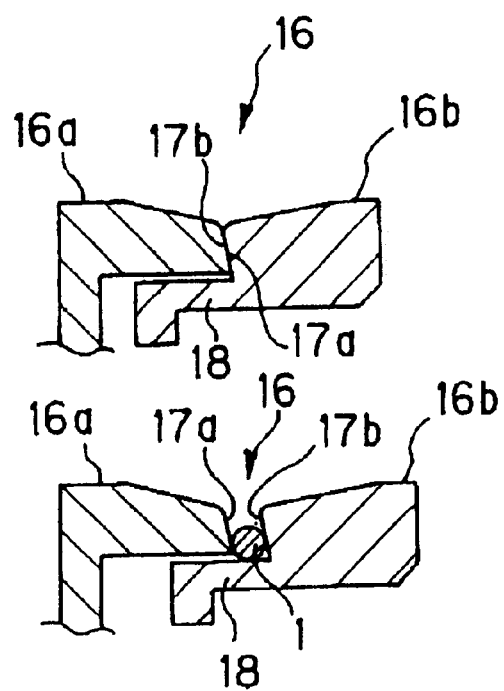

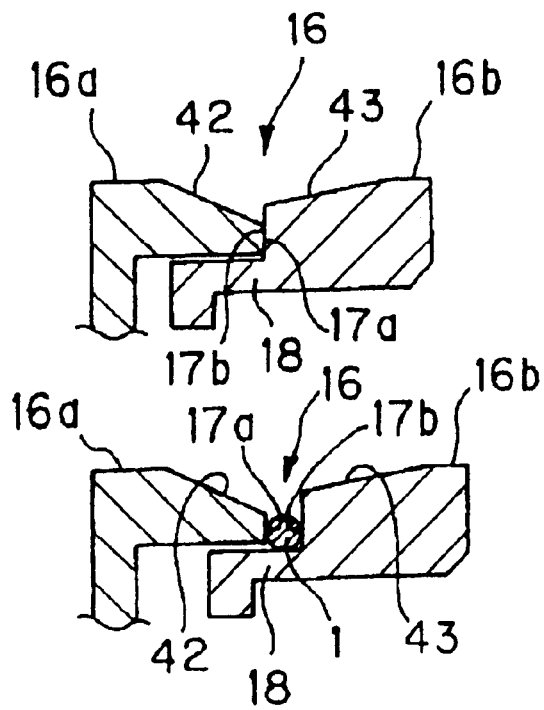
FIG. 82 (a)
FIG. 82 (b)
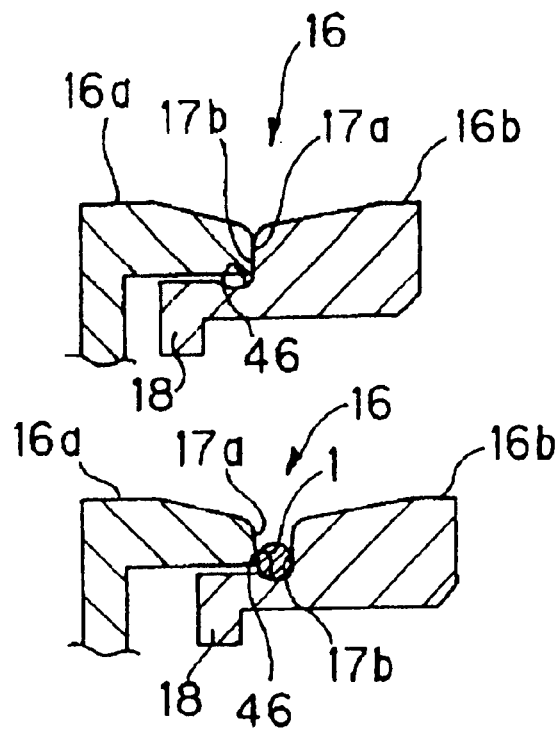
FIG. 83 (a)
FIG. 83 (b)

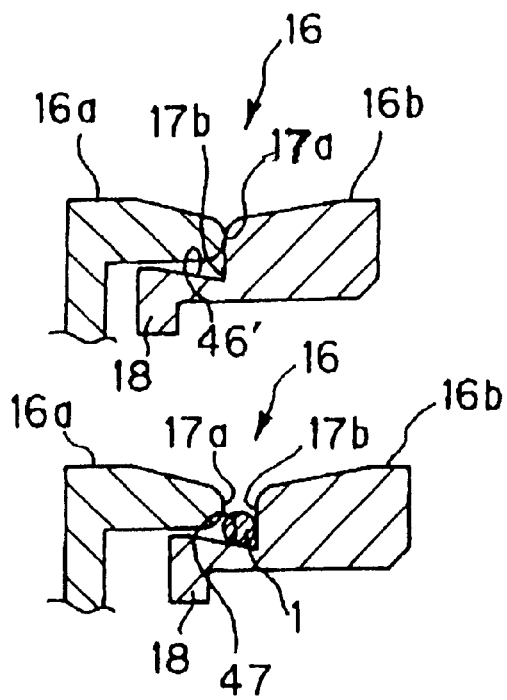
FIG. 84 (a)
FIG. 84 (b)
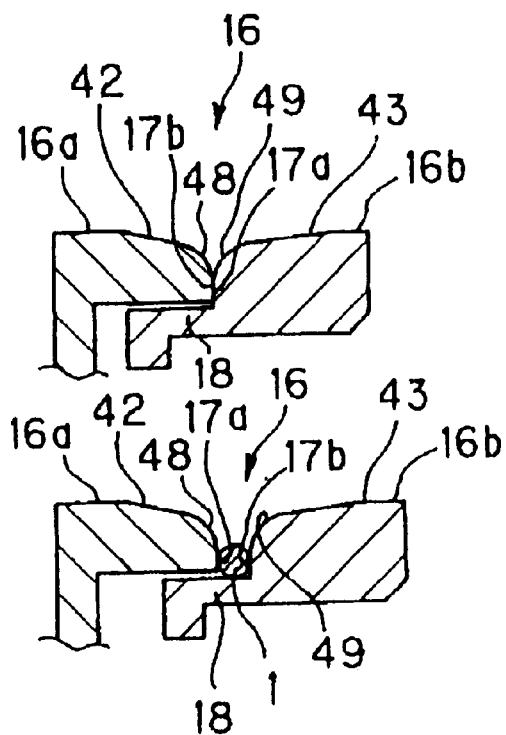
FIG. 85 (a)
FIG. 85 (b)

SPINNING REEL WITH TENSION ROLLER FOR PREVENTING FISHING LINE TWIST

BACKGROUND OF THE INVENTION

1. Field of the Invention

The present invention relates to a fishing spinning reel including a tension roller.

2. Description of the Related Art

A fishing spinning reel includes a reel body, a spool disposed at the front of the reel body, and a fishing line roller for guiding a fishing line (from the rod) toward the fishing line winding portion of the spool. The fishing line wound around the fishing line winding portion of the spool can be fed out by disengaging the fishing line from the fishing line roller.

There are two types of spinning reels that use different configurations to wind up the fishing line. In one type, rotating the handle rotates the spool itself to wind up the fishing line. In another type, turning the handle revolves the fishing line roller around the spool.

There are also two types of spinning reels each with a different configuration, to ensure that the fishing line is uniformly wound onto the fishing line winding portion of the spool. In one type, the spool itself slides toward and away from the reel body in a frontward/rearward direction thereof, and in another type, the fishing line roller slides toward and away from the reel body in the frontward/rearward direction thereof.

However, in all these types of spinning reels, the fishing line wound up around the cylindrical shape spool is fed out in the axial direction of the cylindrical spool, that is, away from the front of the reel. Therefore, it is easy for fishing line twist to accumulate in the fishing line each time the fishing line is fed out, which can cause the fishing line to quite easily wrap around the fishing rod or become entangled on itself.

FIG. 1 schematically shows how the above-described spinning reels wind a fishing line onto a fishing line winding portion of a spool 3. The fishing line 1 fed out from the front end of the reel body is bent by a fishing line roller 2, then guided around the outer peripheral surface of a spool 3 to be wound up on the fishing line winding portion of the spool 3. When, as indicated by the broken line in FIG. 1, a rather high tension is placed on the fishing line 1 while the fishing line 1 is being reeled in, the fishing line 1 is wound tightly and orderly around the fishing line winding portion of the spool 3.

However, when, as indicated by the solid line in FIG. 1, only a slight tension is placed on the fishing line 1, for example, when reeling in a small fish, reeling in a lure, or other light weight load, then the fishing line 1 will be guided by the fishing line roller 2 without being sufficiently bent. The fishing line 1 will wind around the spool 3 in a disorderly and consequently loose fashion, and the winding position may be displaced to the rear portion of the spool cylinder, so that the fishing line 1 will have difficulty separating from the spool 3 when casting the fishing line 1, which can result in back lash, and casting distance may be shortened.

Japanese Registered Utility Model No. 3004671 discloses a configuration for preventing such back lash and other problems. According to the disclosed configuration, abutment members, such as rollers, are disposed near the fishing line roller. A fishing line that is guided by the fishing line roller is sandwiched between the rollers to remove twist from the fishing line. However, with this configuration, the fishing line may be caught by the abutment members each time the fishing line disengages from the fishing line roller for casting or each time the fishing line engages the fishing line rollers for winding.

Japanese Patent-Application Publication (Kokai) No. HEI-9-107852 discloses other configuration for removing fishing line twist. According to this disclosure, a first and second line rollers are disposed coaxially with each other. The first line roller has a first side wall and the second line roller has a second side wall separate from the first side wall. The first side wall is rotatable and slidable with respect to the second side wall. An urging means is provided for resiliently urging the slidable side wall portion toward the other side wall portion.

However, because the urging means urges the confronting surfaces of the side wall portions into resilient abutment contact, unless a predetermined tension or greater is applied to the fishing line, the fishing line will not enter between and be supported by the confronting surfaces of the side wall portions.

Also, the fishing line, as it is bent and guided by the outer peripheral surface of the fishing line roller, is also sandwiched entirely from both sides by the entire confronting faces of the side wall portions. This places a great load on the fishing line, which can be resulted in fishing line breaking.

Also, when the fishing line roller rotates in the direction for feeding out the fishing line, for example, when the fishing line is drawn out by a fish, the fishing line can sometimes become disengaged from between the confronting surfaces of the side wall portion.

Also, the sandwiching force applied by the side wall portions is dispersed over all portions of the fishing line sandwiched between the side wall portions. Because the sandwiching force is dispersed, the fishing line can easily slide across the fishing line roller without sufficient tension being applied for pulling the fishing line.

Further, the outer peripheral surface of one side portion has a larger diameter because one of the side walls is rotatably and slidably supported with respect to the, outer peripheral surface of the other side wall. Also one side wall portion slants with respect to the outer peripheral surface of the other side wall portion, and so does not easily slide. This increases difficulty of the fishing line entering between the side wall portions. Also the side wall portions can rub against each other when the fishing line roller is rotated, thereby generating an unpleasant sound.

Further, one side wall portion is supported by the other side wall portion, which is in turn supported by a support portion of the reel through a bearing. As a result, unwanted rattling amount of one side wall portion relative to the support portion may be increased, which causes unwanted contact of the one side wall portion with a cover member disposed over the support portion, and interfere with the rotation of the fishing line roller, and also interfere with attempts to remove the twist from the fishing line and to increase tension of the fishing line.

Japanese Patent Application Publication (Kokai). No. HEI-9-149749 discloses a spinning reel, wherein the fishing line roller is rotatably supported on the roller bearing by a bushing. However, with this configuration, when the fishing line contacts the guide groove in the fishing line roller, water clinging to the fishing line can enter between the fishing line roller and the bushing or between the bushing and the bearing support member. The water accumulated in these areas can soak into the surrounding components. When the water is sea water, salt in the sea water can crystallize and cling to the surrounding components, so the rotation of the fishing line roller becomes defective.

SUMMARY OF THE INVENTION

It is therefore an object of the present invention to provide a spinning reel having a tension roller mechanism capable of uniformly winding a fishing line over a spool with a sufficient tension to the fishing line, thereby avoiding backlash of the fishing line and providing a sufficient casting distance.

Another object of the invention is to provide such spinning reel in which the fishing line can be sufficiently engaged with the tension roller mechanism without any release therefrom during a fishing line rewinding operation.

Still another object of the invention is to provide such spinning reel capable of providing a smooth rotation of a tension roller in the tension roller mechanism without any rattling.

Still another object of the invention is to provide such spinning reel capable of avoiding distortion of the fishing line during the fishing line rewinding operation.

Still another object of the invention is to provide such spinning reel provided with a water drainage arrangement for discharging water accidentally involved into the tension roller mechanism to the outside of the fishing reel.

These and other object of the present invention will ba attained by providing a spinning reel including a reel body, a spool, a rotor, a bail arm assembly, and an improved line roller mechanism. The reel body has a front side and a rear side, the front side being a front side of a fishing rod and the rear side being a rear side of the fishing rod when the spinning reel is mounted on the fishing rod. The spool is positioned at the front side of the reel body for winding therearound a fishing line. The fishing line extends from the spool toward the front side of the fishing rod. The rotor is rotatably supported on the reel body. The bail arm assembly is connected to the rotor and is movable around the spool. The line roller mechanism is provided to the bail arm assembly and includes a first tension roller, a second tension roller, and a biasing member. The first tension roller is mounted on the bail arm assembly and has a first fishing line contact face. The second tension roller is mounted on the bail arm assembly and has a second fishing line contact face confronting the first fishing line contact face. The first tension roller and the second tension roller have a front end side positioned at a side of the front side of the fishing rod and a rear end side positioned at a side of the rear side of the fishing rod. The first and second fishing line contact faces provide a fishing line guide groove therebetween. A distance between the first and second fishing line contact faces at the rear end side is smaller than a distance therebetween at the front end side. The fishing line is introduced from the front side of the fishing rod into the front end side of the fishing line guide groove, and the fishing line is guidedly directed to the spool while being pressed by the first fishing line contact face and the second fishing line contact face at the rear end side of the fishing line guide groove during a fishing line winding operation. The biasing member urges at least one of the first tension roller and the second tension roller to reduce a distance between the first and second fishing line contact faces.

BRIEF DESCRIPTION OF THE DRAWINGS

The above and other objects, features and advantages of the invention will become more apparent from reading the following description of the preferred embodiment taken in connection with the accompanying drawings in which:

FIG. 38 is a schematic view showing relationship between the fishing line and the tension roller when the fishing line is being reeled in;

FIG. 41 is a schematic view showing relationship between the tension roller according to the twenty second embodiment and the fishing line when the fishing line is being reeled in;

FIGS. 66(a) through 74(b) are cross-sectional views showing various modifications to the fishing line contact faces 17a, 17b of the tension roller 16 and in which each (a) shows the fishing line releasing state and each (b) shows the fishing line rewinding state;

FIGS. 75(a) to 79(b) and FIGS. 81(a) to 85(b) are cross-sectional views showing various modifications to the tension roller in the twentieth to thirty fourth embodiments, and in which each (a) shows the fishing line releasing states and each (b) shows the fishing line rewinding state; and FIG. 80 shows a view for description of the fishing line and the tension roller in a fifth modification.

DETAILED DESCRIPTION OF THE PREFERRED EMBODIMENTS

Next, while referring to FIGS. 2 through 7, a spinning reel for fishing according to a first embodiment of the present invention will be described.

Figure 2:
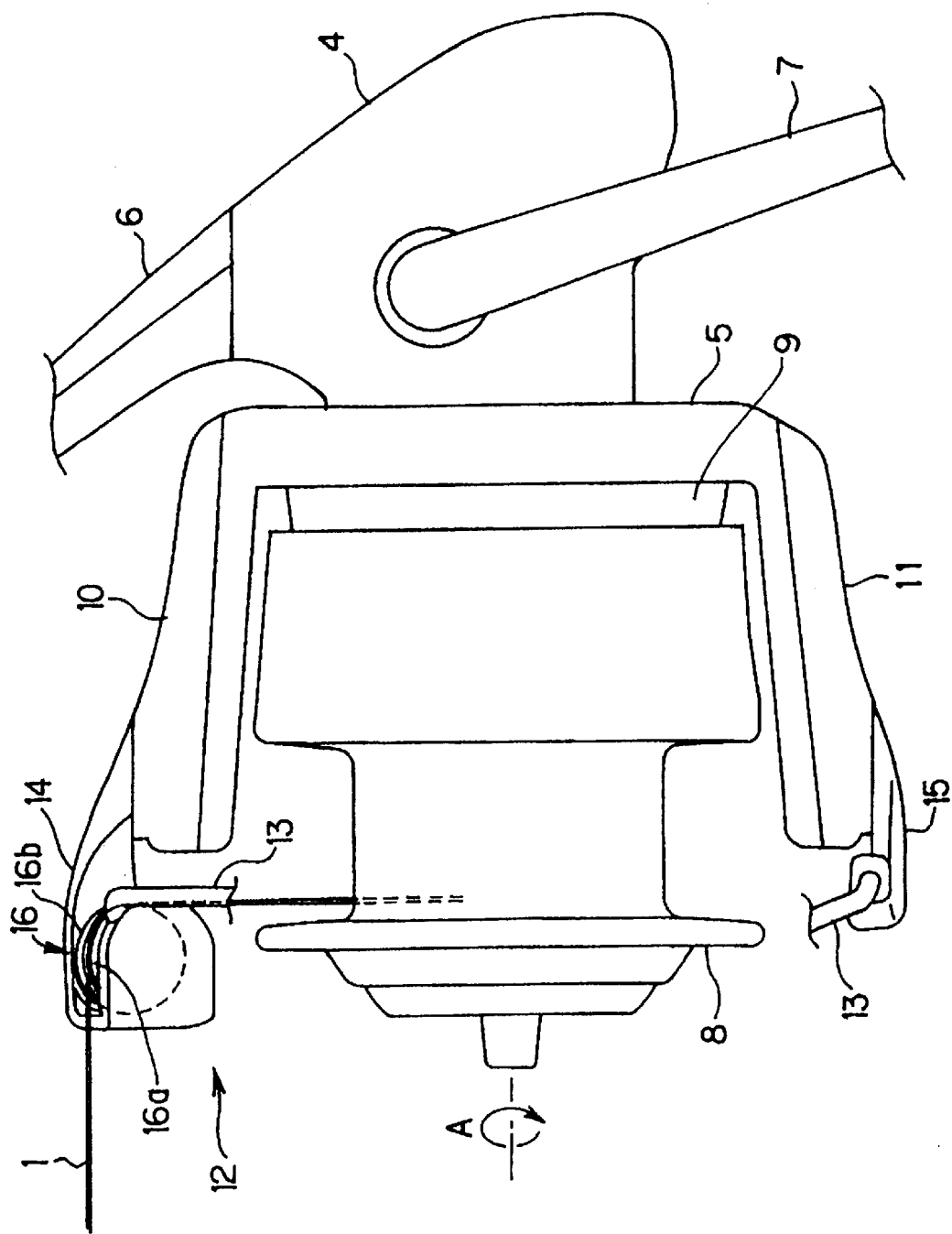
FIG. 2 is a side view in partial cross-section showing a spinning reel according to a first embodiment of the present invention, wherein a bail-arm is in a fishing line releasing state.
Figure 3:
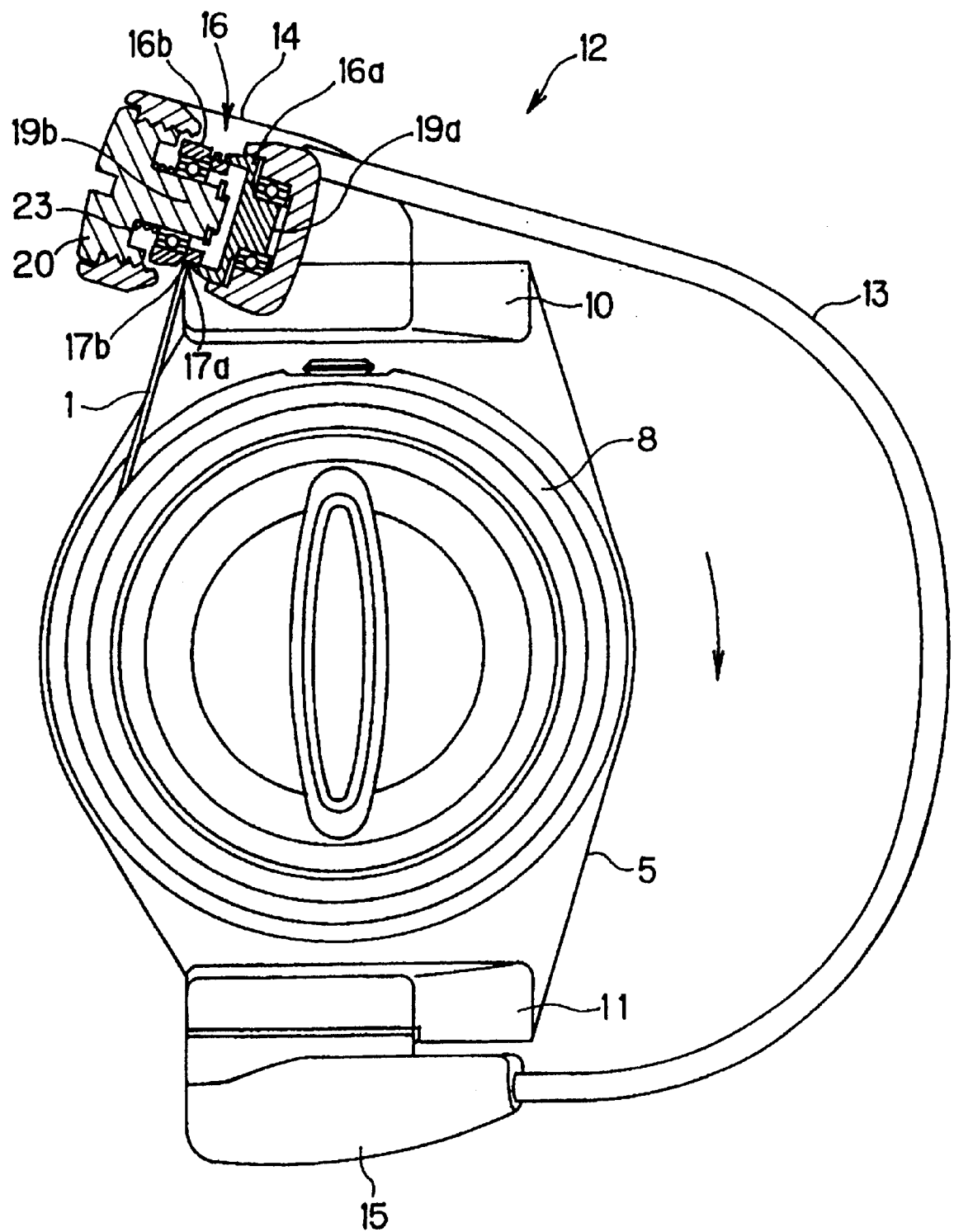
FIG. 3 is a front view in partial cross-section showing the spinning reel of FIG. 2.
Figure 4:
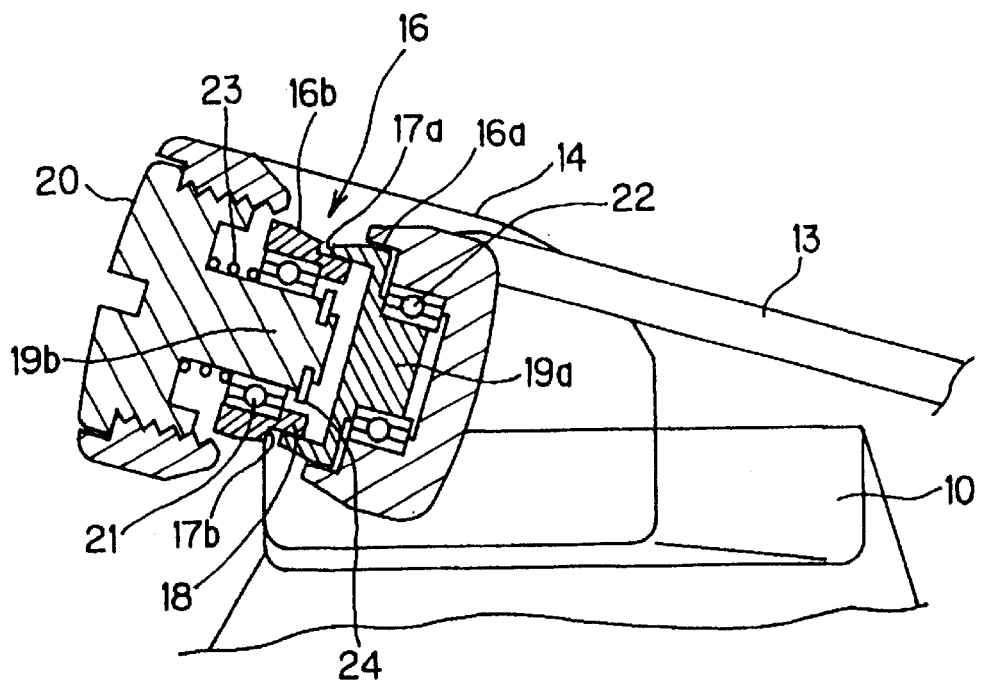
FIG. 4(a) is a vertical cross-sectional view showing a tension roller of the present embodiment, wherein the tension roller is in a fishing line releasing state.
FIG. 4(b) shows the tension roller of FIG. 4(a) wherein the tension roller is in a fishing line rewinding state.
Figure 4:
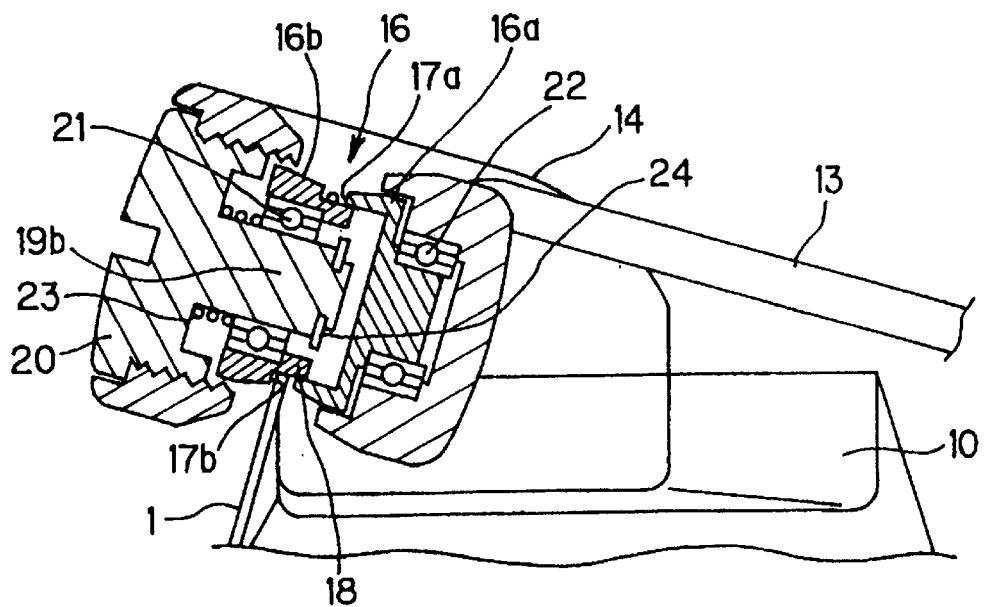
Figure 5:
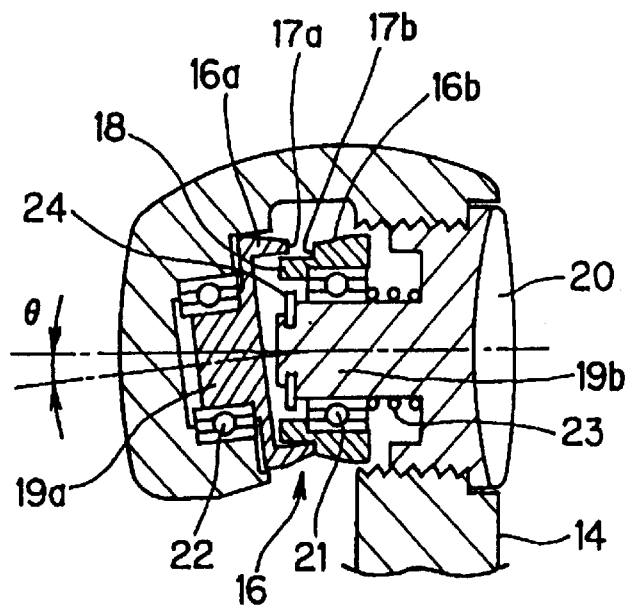
FIG. 5(a) is a cross-sectional view taken along a plane that includes the rotational axis of the tension roller, wherein the tension roller is in a fishing line releasing state.
FIG. 5(b) is a cross-sectional view similar to that shown in FIG. 5(a), wherein the tension roller is in a fishing line rewinding state.
Figure 5:
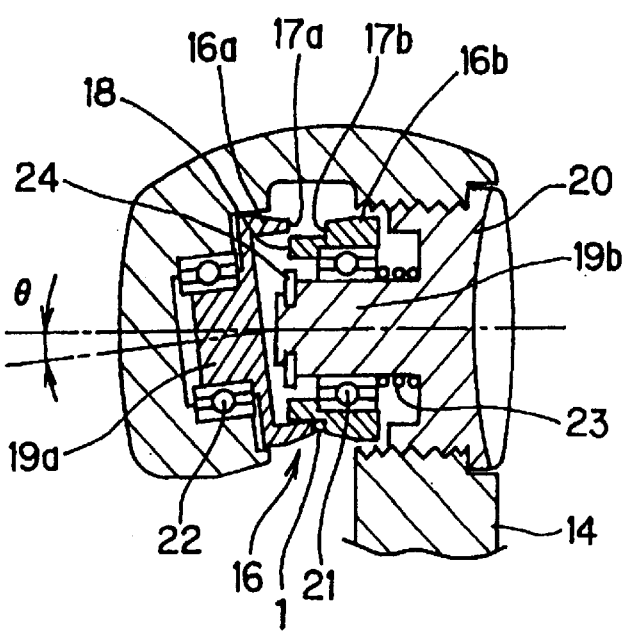
Figure 6:
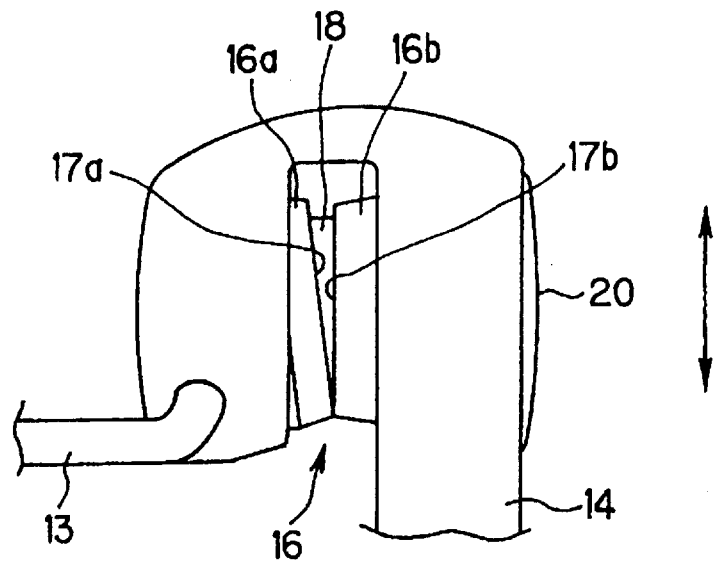
FIG. 6(a) is a plan view showing the tension roller, wherein the tension roller is in a fishing line releasing state.
FIG. 6(b) is a plan view similar to FIG. 6(a), wherein the tension roller is in a fishing line rewinding state.
Figure 6:
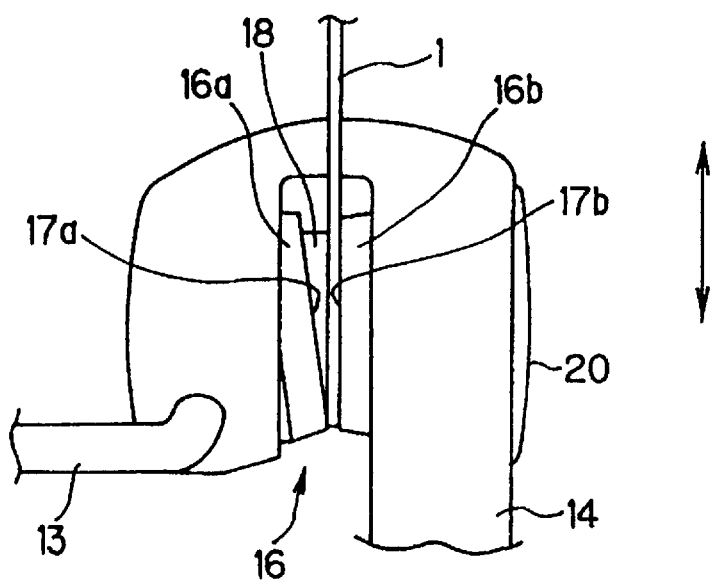

As shown in FIGS. 2 and 3, a spinning reel for fishing includes a reel body 4 and a rotor 5 disposed to the front of the reel body 4. An attachment arm 6 for attaching a fishing rod (not shown) is integrally formed with a rear portion of the reel body 4. The rotor 5 is rotatably connected to the front portion of the reel body 4 by a hollow shaft (not shown). A handle 7 is attached to the side surface of the reel body 4. Although not shown in the drawings, a transmission mechanism, such as a gear train and the like, is housed within the reel body 4 to transmit rotation of the handle 7 to the hollow shaft. To reel in the fishing line 1, the user rotates the handle 7 to rotate the hollow shaft, whereupon the rotor 5 rotates in a direction indicated by an arrow A in FIG. 2.

Although not shown in the drawings, a spool shaft is inserted into the hollow center of the hollow shaft. A spool 8 is attached to the front tip of the spool shaft. The rear end of the spool shaft is connected to the handle 7 by an oscillation mechanism (not shown) in the reel body 4. When the handle 7 is rotated to reel in the fishing line 1, the spool shaft and the spool 8 are reciprocally moved forward and rearward to uniformly wind the line 1 onto the spool.

The rotor 5 includes a cylindrical body 9 and a pair of bail arm supports 10, 11. The cylindrical body 9 is formed substantially symmetrical with respect to the rotational axis of the rotor 5. The pair of the bail arm supports 10, 11 are formed integrally with the base side of the cylindrical body 9, and extend to the outer periphery of the cylindrical body 9, where they sandwich the rotational axis of the rotor 5 in a substantially symmetrical manner.

A bail arm assembly 12 is attached to the front tips of the bail arm supports 10, 11. The bail arm assembly 12 includes a bail arm 13, a bail arm lever 14 connected to one end of the ball arm 13, and a bail arm holder 15 connected to another end of the bail arm 13. The bail arm lever 14 and the bail arm holder 15 serve as bail arm support portions. Both the bail arm lever 14 and the bail arm holder 15 are connected to the ball arm supports 10, 11 of the rotor 5 in a freely rotatable manner by support pins (now shown). Although not shown, a dead point spring is housed in one of the bail arm supports 10, 11. The dead point spring urges the ball arm lever 14 or the bail arm holder 15 in either of two directions depending on the pivotal position of the bail aim lever 14 or the bail arm holder 15 with respect to a dead point. As a result, rotation of the bail arm lever 14 and the bail arm holder 15 on the support pins pivots the bail arm 13 between a fishing line winding state shown in FIGS. 2 and 3 and a fishing line release state (now shown). The bail arm 13 is maintained in either of these positions by urging force of the dead point spring. When the bail arm 13 is pivoted into the fishing line winding state, the fishing line 1 is engaged with the bail arm 13. While in this condition, rotating the rotor 5 in a direction indicated by an arrow A In FIG. 2 winds the fishing line 1 on the spool 8 as guided by a tension roller 16 on the bail arm lever 14.

As shown in FIGS. 6(a) and 6(b), the tip of the bail arm lever 14 is bent Into a substantial U shape. This bent portion serves as a bracket for rotatably supporting the tension roller 16.

The tension roller 16 is provided by left tension roller 16a and a right tension roller 16b confronting each other at fishing line contact faces 17a, 17b. When the left and right tension rollers 16a, 16b are brought into abutment, the fishing line contact faces 17a, 17b form therebetween a tapering annular groove, which as described later serves as a fishing line guide groove portion.

A sleeve member 18 protrudes from an inner surface of the fishing line contact face 17b into an empty space at the inner periphery of the fishing line contact face 17a. The outer peripheral surface of the sleeve member 18 forms a base or a bottom of the fishing line guide groove portion.

As shown in FIGS. 5(a), 5(b), the left and right tension rollers 16a, 16b are rotatably supported on support shafts 19a, 19b, respectively. The support shafts 19a, 19b are disposed so that their rotational axes intersect at the front side portion of the reel body 4. That is, the rotational axes of the support shafts 19a, 19b intersect each other at an intersection angle θ so that the space between the fishing line contact faces 17a, 17b of the left and right tension rollers 16a, 16b becomes gradually narrower in the direction extending from the front toward the rear of the reel, that is, in the direction extending from the tip of the fishing rod toward the base of the fishing rod, until the fishing line contact faces 17a, 17b contact each other and no space exists therebetween at the end edge.

The support shaft 19b is provided at the tip of a screw member 20, which is screwingly engaged with the bail arm lever 14. The right tension roller 16b is rotatably attached to the support shaft 19b through a bearing 21. The support shaft 19a is integrally formed with the left tension roller 16a. The support shaft 19a is supported on the ball arm lever 14 through a bearing 22. The left and right tension rollers 16a, 16b rotate on the support shafts 19a, 19b while in slanted condition, because the rotational axes of the support shafts 19a, 19b intersect at the intersection angle θ.

The bearing 21 slidingly supports the right tension roller 16b on the support shaft 19b so that the right tension roller 16b can slide while supported on the support shaft 19b. A coil spring 23 is disposed around the support shaft 19b, and serves as an urging means for urging the bearing 21 toward the left tension roller 16a. Further, a stopping ring 24 is attached to the support shaft 19b, and serves to prevent the bearing 21 from falling off the support shaft 19b. With this configuration, the fishing line contact faces 17a, 17b resiliently abut with each other so that the space between the fishing line contact faces 17a, 17b gradually narrows from the front of the reel (fishing rod tip) toward the end of the reel (base of the fishing rod), until the gap between the fishing line contact faces 17a, 17b closes at the rear end portion of the fishing line guide groove.

Next, operation of the tension roller of the spinning reel with this configuration will be described. When the ball arm 13 is switched from the fishing line winding state shown in FIGS. 2 and 3 into the fishing line release state, then as shown in FIGS. 4(a), 5(a), and 6(a), the fishing line disengages from the tension roller 16 into a condition where it can be freely fed out from the fishing line wind portion of the spool 8.

Figure 1:
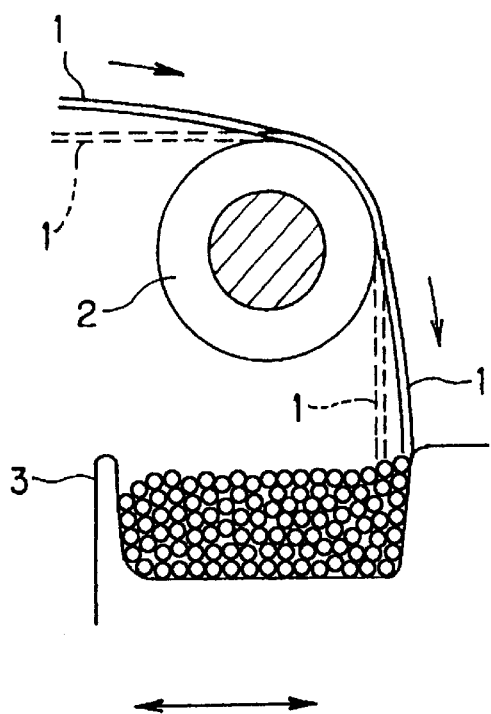
FIG. 1 is a schematic cross-sectional view showing a fishing line rewinding operation in a conventional spinning reel.
Figure 7:
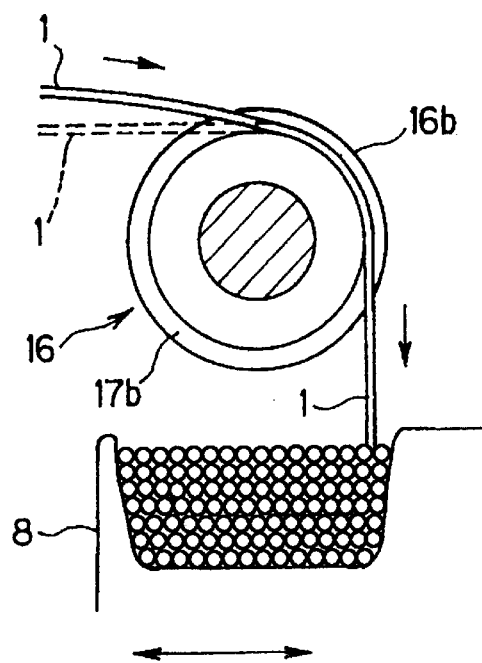
FIG. 7 is a cross-sectional view showing the fishing line being wound up with proper tension applied by the tension roller according to the embodiment.

After the fishing line has been fed out, and the bail arm 13 is inverted back to its fishing line winding position, the fishing line 1 engages with the tension roller 16. When the rotor 5 is rotated by operation of the handle 7, the fishing line 1 pushes the left and right tension rollers 16a, 16b apart, that is, leftward and rightward against urging force of the coil spring 23, and enters between the fishing line contact faces 17a, 17b until it is sandwiched between the fishing line contact faces 17a, 17b as shown in FIGS. 4(b), 5(b), and 6(b). Because the space between the fishing line contact faces 17a, 17b gradually narrows from the tip of the fishing rod toward the base of the fishing rod as shown in FIGS. 6(a) and 6(b), the fishing line 1 enters between the fishing line contact faces 17a, 17b regardless of whether a great or small tension is placed on the portion of the fishing line 1 between the fishing rod and the tension roller 16, as indicated by the broken and solid lines, respectively, in FIG. 7. As a result, the portion of the fishing line 1 that extends from the tension roller 16 to the spool 8 is applied with a great tension, and as indicated in FIGS. 4(b), 5(b), and 6(b) the fishing line 1 is wound around the fishing line windup portion of the spool 8 without any looseness. Problems, such as the fishing line 1 being thickly wound on the rear portion of the spool 3, or as indicated in FIG. 1, being loosely wound across the entire spool 3, can be prevented. As shown in FIG. 7, the fishing line 1 is wound around the spool 8 with an appropriate tightness and at a uniform thickness.

Figure 8:
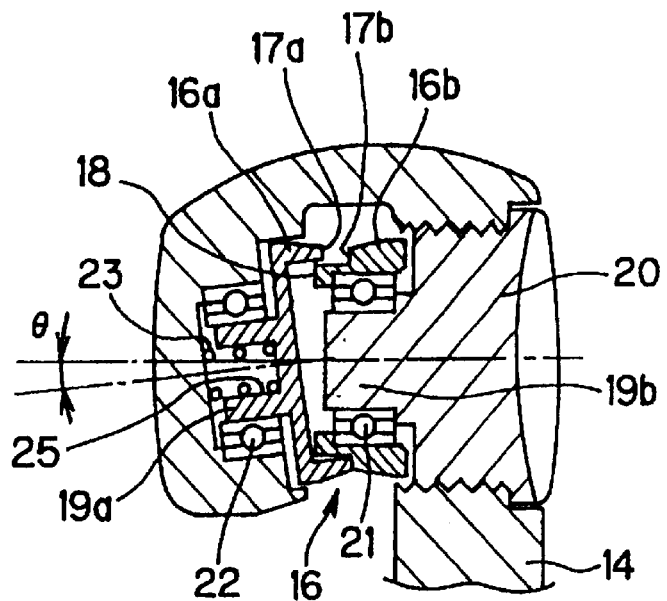
FIG. 8 is a horizontal cross-sectional view showing a tension roller according to a second embodiment of the present invention.

Next, a tension roller of a spinning reel according a second embodiment of the present invention will be described while referring to FIG. 8. According to the second embodiment, the coil spring 23, which serves as urging means, is positioned on the left side as shown in FIG. 8, instead of on the right side as in the first embodiment. The support shaft 19a, which is integrally formed with the left tension roller 16a, is formed with a hollow portion 25. The coil spring 23 is inserted in the hollow portion 25. The urging force of the coil spring 23 presses the left tension roller 16a toward the right tension roller 16b.

Figure 9:
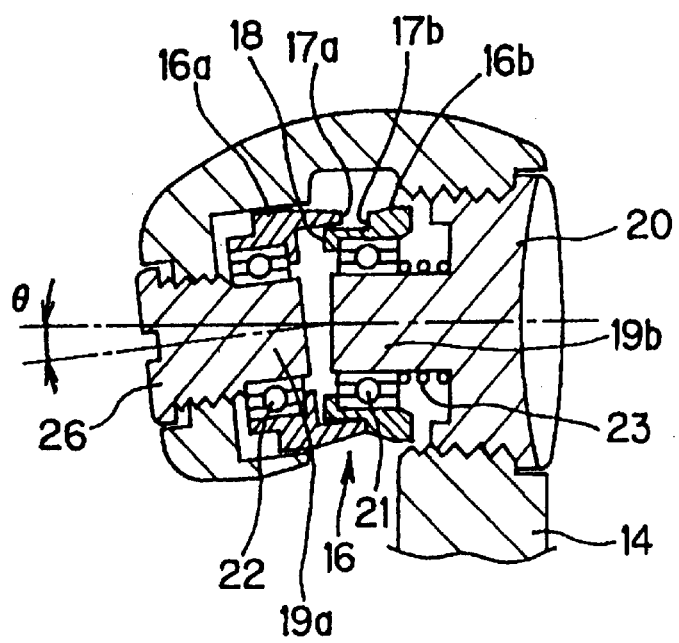
FIG. 9 is a horizontal cross-sectional view showing a tension roller according to a third embodiment of the present invention.

Next, a tension roller of a spinning reel according to a third embodiment of the present invention will be described while referring to FIG. 9. The third embodiment and the first embodiment are similar in that the right tension roller 16b is supported on the support shaft 19b, which is integrally formed with the screw member 20. Also, the coil spring 23 is provided as an urging means to urge the right tension roller 16b toward the left tension roller 16a. However, the third embodiment differs from the first embodiment in that the left tension roller 16a is supported on the bail arm lever 14 by a second screw member 26, which is similar to the screw member 20. That is, the support shaft 19a is integrally formed with the second screw member 26. The left tension roller 16a is supported on the support shaft 19a through the bearing 22. Also, the second screw member 26 can be screwed in and out the bail arm lever 14. By increasing or reducing the amount that the second screw member 26 is screwed into the bail arm lever 14, the strength of the urging force of the coil spring 23 can be adjusted. Accordingly, the strength of the tension applied to the fishing line 1 from the tension roller 16 to the spool 8 can be appropriately adjusted according to the thickness of the fishing line 1, the strength of the tension applied to the fishing line 1 when fishing, and other conditions.

Figure 10:
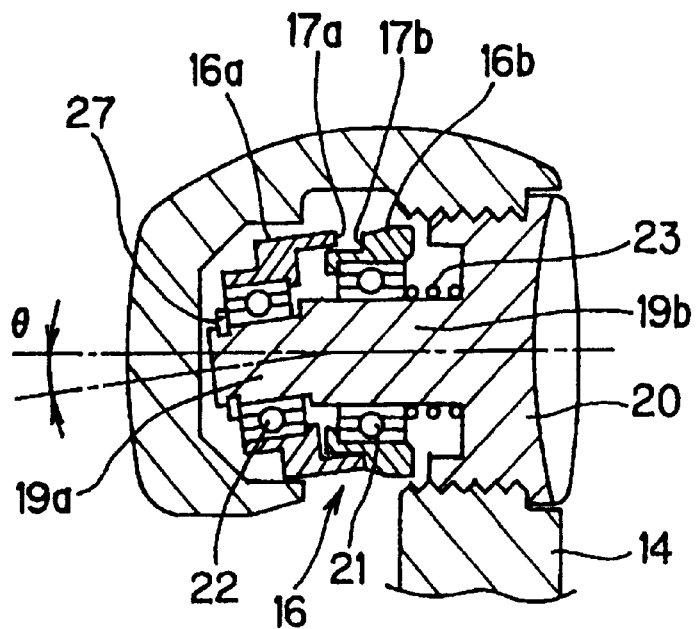
FIG. 10 is a horizontal cross-sectional view showing a tension roller according to a fourth embodiment of the present invention.

FIG. 10 shows a tension roller of a spinning reel according to a fourth embodiment of the present invention. According to the fourth embodiment, the support shafts 19a, 19b, which support the left and right tension rollers 16a, 16b of the tension roller 16, are integrally formed together from a single shaft member that is bent at near its axially central portion. The integrally formed support shafts 19a, 19b are also integrally formed with the screw member 20 that is screwingly held onto the bail arm lever 14. The left and right tension rollers 16a, 16b are held on the support shafts 19a, 19b, respectively, by bearings 22, 21. The coil spring 23 is mounted on the support shaft 19b between the base of the support shaft 19b and the right tension roller 16b. The stop ring 27 is fixed at the tip of the support shaft 19a. Therefore, the left and right tension rollers 16a, 16b are pressed against and stopped by the stop ring 27 in a condition wherein the fishing line contact faces 17a, 17b contact at a location nearest the base of the fishing rod.

The tension roller 16 according to the fourth embodiment can be detached as a single unit from the bail arm lever 14 by merely rotating the screw member 20 out of the bail arm lever 14. This makes it more difficult to loose components when attaching and detaching the tension roller 16 and it also makes easier to perform maintenance checks.

Figure 11:
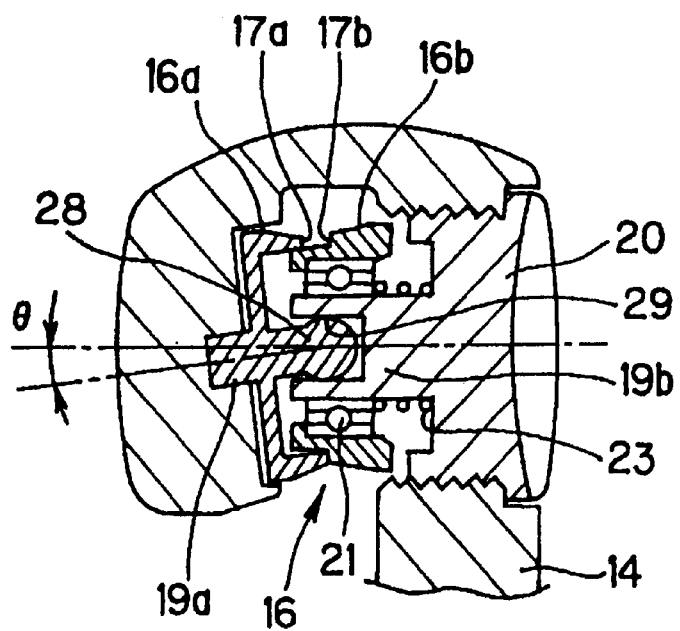
FIG. 11 is a horizontal cross-sectional view showing a tension roller according to a fifth embodiment of the present invention.

FIG. 11 shows a tension roller of a spinning reel according to a fifth embodiment of the present invention. In contrast to the first embodiment shown in FIG. 5, the support shaft 19a, which is integrally formed with the left tension roller 16a, is slidably and rotatably connected to the bail arm lever 14 in the form of a slide bearing. Also, a connection arm 28 is connected to the support shaft 19a, and a spherical portion is connected to the connection arm. The support shaft 19b, which supports the right tension roller 16b, is formed with a hollow space 29. The spherical portion of the connection arm 28 is fitted into the hollow space 29. With this configuration, the left tension roller 16a is rotatably provided while supported at the slide bearing portion of the support shaft 19a and the spherical portion of the connection arm 28.

Figure 12:
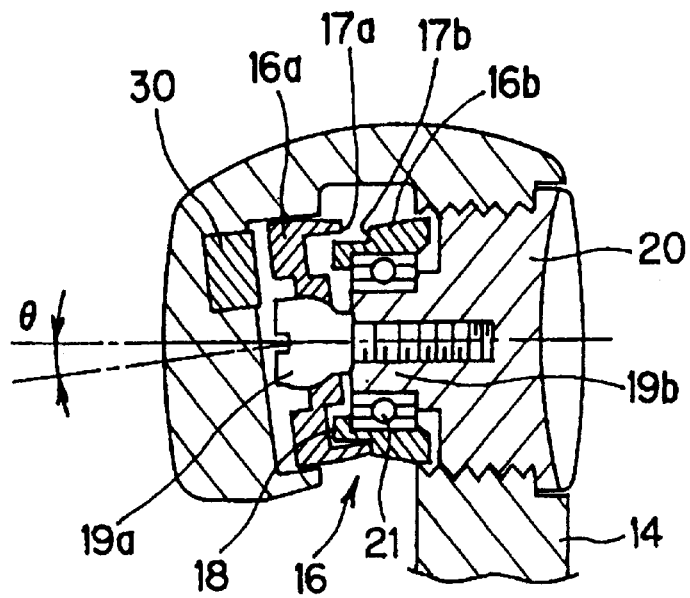
FIG. 12 is a horizontal cross-sectional view showing a tension roller according to a sixth embodiment of the present invention.

FIG. 12 shows a tension roller of a spinning reel according to a sixth embodiment of the present invention.

According to this embodiment, the support shaft 19a is formed in a screw shape and is fixed to the support shaft 19b by this screw. The left tension roller 16a and the head portion of the screw-shaped support shaft 19a are formed with spherical curved surfaces that form therebetween a spherical bearing for enabling the left tension roller 16a to slant at a fixed angle θ with respect to the right tension roller 16b.

A permanent magnet 30 is embedded in the bail arm lever 14, and serves as an urging means for resiliently urging the fishing line contact faces 17a, 17b so that the space between the fishing line contact faces 17a, 17b narrows with distance from the tip of the fishing rod to the base of the fishing rod. That is, the left tension roller 16a is formed from a magnetic material, and the permanent magnet 30 attracts the magnetic material of the left tension roller 16a. Because the left tension roller 16a is drawn toward the permanent magnet 30, the left tension roller 16a slants on the spherical surface bearing and the space between the left and right tension rollers 16a, 16b gradually narrows with distance from the tip of the fishing rod to the base of the fishing rod, thereby producing a fishing line guide groove.

Figure 13:
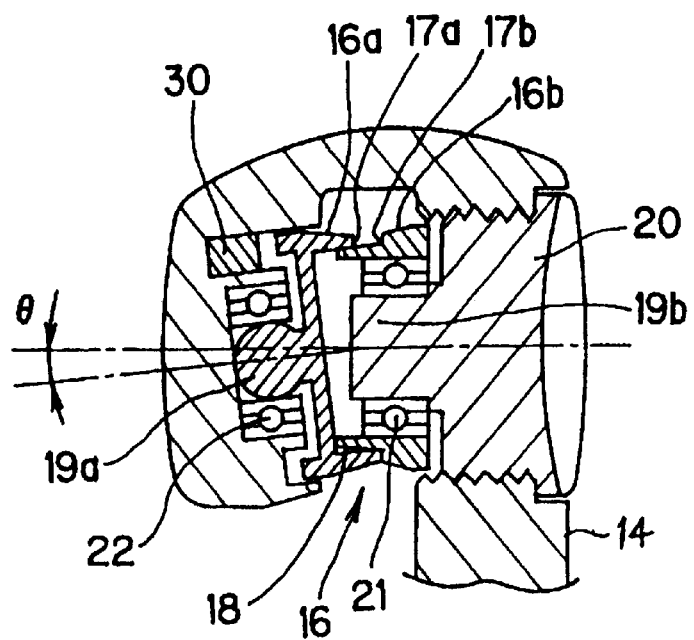
FIG. 13 is a horizontal cross-sectional view showing a tension roller according to a seventh embodiment of the present invention.

FIG. 13 shows a tension roller of a spinning reel according to a seventh embodiment of the present invention. According to the seventh embodiment, the left tension roller 16a is integrally formed with the support shaft 19a. The support shaft 19a is formed with a spherical tip that is inserted in a hollow portion of the bail arm lever 14. If needed, a bearing 22 can be mounted between the spherical portion of the support shaft 19a and the hollow portion of the bail arm lever 14.

In the same manner as the sixth embodiment shown in FIG. 12, the permanent magnet 30 is used as an urging means to tilt the left tension roller 16a formed of a magnetic material for resiliently urging the fishing line contact faces 17a, 17b to narrow the gap therebetween in the direction from the fishing rod tip to the fishing rod base. Because the left tension roller 16a is drawn toward the permanent magnet 30, the left tension roller 16a tilts on the spherical bearing, to form a fishing line guide groove that gradually narrows between the right tension roller 16b in the direction extending from the tip of the fishing rod to the base of the fishing rod.

Figure 14:
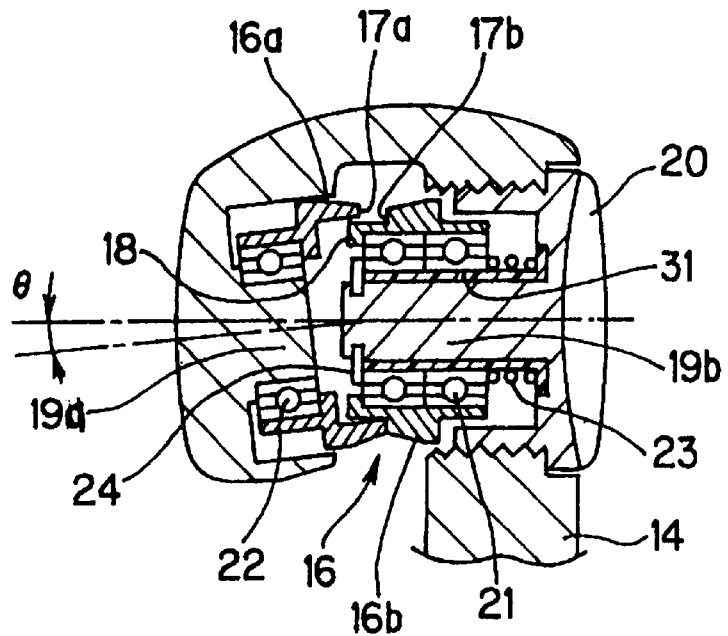
FIG. 14 is a horizontal cross-sectional view showing a tension roller according to an eighth embodiment of the present invention.

FIG. 14 shows a tension roller of a spinning reel according to an eighth embodiment. The tension roller according to the eighth embodiment differs from the tension roller of the first embodiment shown in FIG. 5, in that a cylindrical collar 31 formed from a synthetic resin is interposed between the support shaft 19b and the right tension roller 16b. Also, a plurality of bearings 21 are fitted on the inner surface of the right tension roller 16b. The collar 31 is inserted between the inner surface of the bearings 21 and the support shaft 19b, and the collar 31 is fixed on the side of the support shaft 19b. By providing the collar 31 in this manner, the right tension roller 16b smoothly slides over the support shaft 19b with the bearing 21. Therefore, the fishing line 1 can enter between the fishing line contact faces 17a, 17b much easier.

Figure 15:
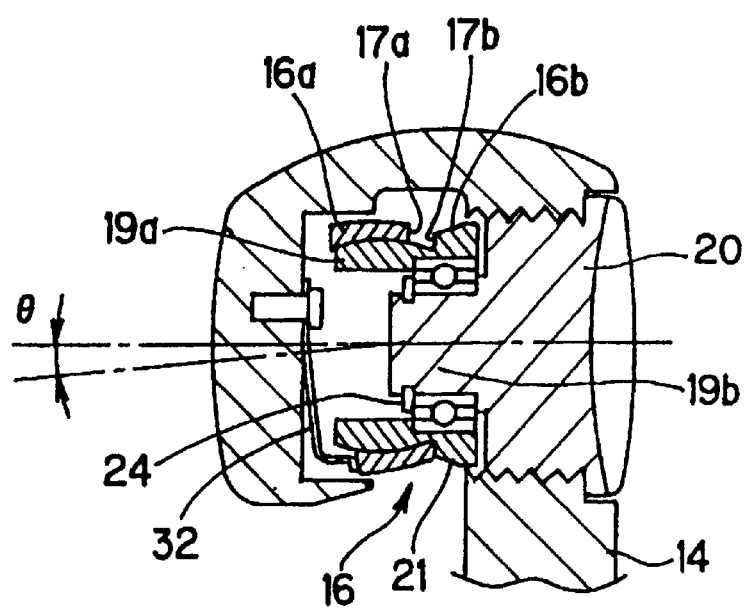
FIG. 15 is a horizontal cross-sectional view showing a tension roller according to a ninth embodiment of the present invention.

FIG. 15 shows a tension roller of a spinning reel according to a ninth embodiment. The tension roller according to the ninth embodiment differs from that of the first embodiment shown in FIG. 5 in that the support shaft 19a for supporting the left tension roller 16a is formed integrally with the right tension roller 16b, and the left tension roller 16a is rotatably and tiltably disposed over the support shaft 19a. The mating surfaces of the left tension roller 16a and the support shaft 19a are formed in complementary curved shapes to form bearing. Because the left tension roller 16a can slant on the curved surface of the support shaft 19a, the fishing line guide groove portion defined by the fishing line contact faces 17a, 17b of the left and right tension rollers 16a, 16b can gradually narrow in the direction from the tip of the fishing rod to the base of the fishing rod.

A leaf spring 32 serves as an urging means for resiliently urging the fishing line contact faces 17a, 17b together. One end of the leaf spring 32 is fixed to the bail arm lever 14. The other end of the leaf spring 32 contacts the left tension roller 16a, and tilts the left tension roller 16a on the curved surface bearing. With this configuration, the fishing line guide groove portion formed between the left and right tension rollers 16a, 16b gradually narrows in a direction from the fishing rod tip to the fishing rod base.

Figure 16:
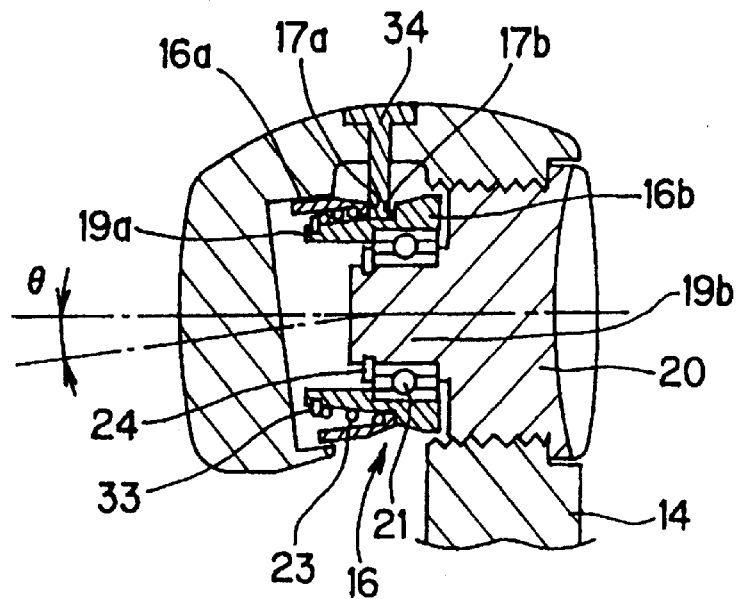
FIG. 16 is a horizontal cross-sectional view showing a tension roller according to a tenth embodiment of the present invention.

FIG. 16 shows a tension roller of a spinning reel according to a tenth embodiment. Similar to the ninth embodiment shown in FIG. 15, according to the tenth embodiment shown in FIG. 16, the support shaft 19a which supports the left tension roller 16a is formed integrally with the right tension roller 16b. A coil spring 23 is inserted between the left tension roller 16a and the support shaft 19a. One end of the coil spring 23 is held at a portion adjacent the fishing line contact face 17a, and another end of the coil spring 23 is stopped at a stop ring 33 fixed to a tip end portion of the support shaft 19a. With this configuration, the left tension roller 16a is urged toward the right tension roller 16b so that the fishing line contact faces 17a, 17b attempt to contact each other.

A spacer 34 is connected to the fishing rod tip side of the bail arm lever 14. The tip of the spacer 34 is inserted at a single position between the fishing line contact faces 17a, 17b, to open up a fishing line guide groove portion between the fishing line contact faces 17a, 17b. Thus, the left tension roller 16a is tilted with respect to the right tension roller 16b to provide the tapered fishing line guide groove.

Figure 17:
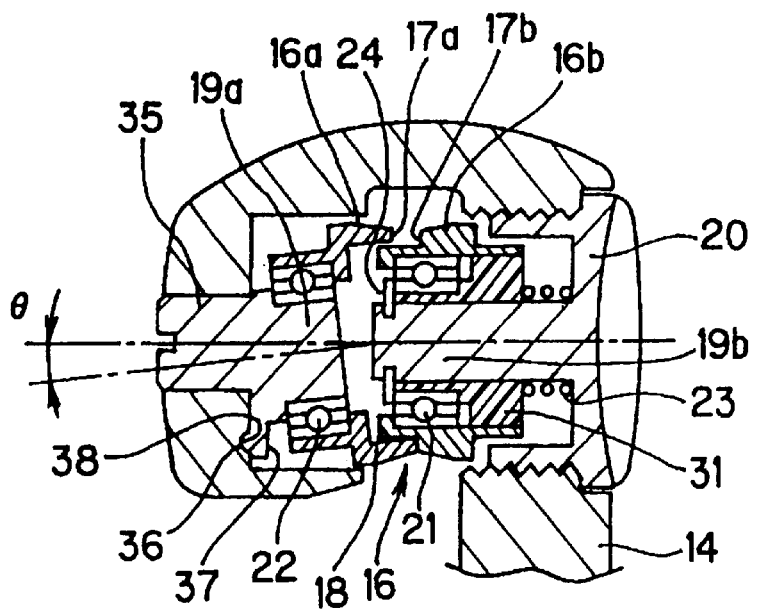
FIG. 17 is a horizontal cross-sectional view showing a tension roller according to an eleventh embodiment of the present invention.

FIG. 17 shows a tension roller of a spinning reel according to an eleventh embodiment of the present invention.

In a manner similar to the eighth embodiment shown in FIG. 14, according to the eleventh embodiment, a synthetic resin collar 31 is interposed between the support shaft 19b and the right tension roller 16b, so that the right tension roller 16b smoothly sides over the support shaft 19b along with the bearing 21. As a result, the fishing line 1 can more easily enter between the fishing line contact faces 17a, 17b.

The difference between the eighth and eleventh embodiments is that the support shaft 19a is formed as a separate member for the bail arm lever 14 according to the eleventh embodiment, Instead of formed integrally with the ball arm lever 14 as In the eighth embodiment. The support shaft 19a is formed integrally with an intersecting angle adjusting shaft 35. The Intersecting angle adjusting shaft 35 is rotatably attached to the bail arm lever 14 at a portion aligned on an extension of the axial line of the support shaft 19b. The support shaft 19a is bent relative to the intersecting angle adjusting shaft 35, so that the support shaft 19a extends in a direction to intersects the support shaft 19b. By rotating the intersecting angle adjusting shaft 35 by a desired amount with respect to the bail arm lever 14, the Intersecting angle between the support shafts 19a, 19b can be changed so that the amount that the fishing line guide groove portion between the fishing line contact faces 17a, 17b narrows can be increased or decreased as desired. Therefore, the strength of the tension applied to the fishing line 1 can be adjusted according to the thickness, material, tension, spool diameter (winding amount), and the like of the fishing line 1.

A protrusion portion 36 and a plurality of recessed portions 38 are provided as a positioning means at the boundary between the intersecting angle adjusting shaft 35 and the support shaft 19a. The protrusion portion 36 is provided on a spring rib extending from the intersecting angle adjusting shaft 35. The plurality of recessed portions 38 are formed on the bail arm lever 14 at various locations following the orbit drawn by the protrusion portion 36 when the intersecting angle adjusting shaft 35 is rotated. By rotating the shaft 35 and fitting the protrusion portion 36 into an appropriate recessed portion 38, a desired intersecting angle θ can be formed between the support shafts 19a, 19b.

Figure 18:
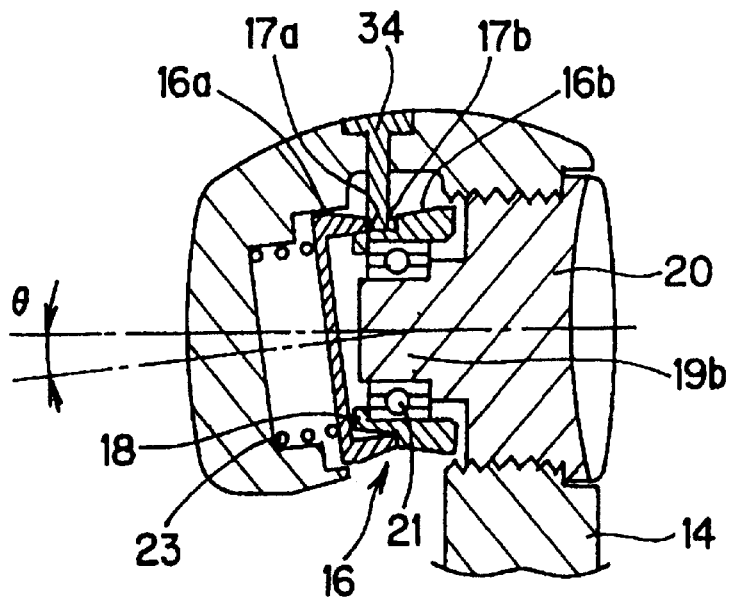
FIG. 18 is a horizontal cross-sectional view showing a tension roller according to a twelfth embodiment of the present invention.

FIG. 18 shows a tension roller of a spinning reel according to a twelfth embodiment of the present invention. The tension roller according to the twelfth embodiment differs from those of the tenth embodiment shown in FIG. 16 in that the support shaft 19a for supporting the left tension roller 16a is dispensed with. Also, the coil spring 23 which serves as urging means is disposed between the left tension roller 16a and the bail arm lever 14 in order to urge the left tension roller 16a toward the right tension roller 16b.

In a manner similar to the tension roller of the tenth embodiment, according to the twelfth embodiment, the spacer 34 is inserted in a single location between the fishing line contact faces 17a, 17b so that the rotational axes of the left and right tension rollers 16a, 16b intersect at the intersectional angle θ, thereby forming a fishing line guide groove portion between the fishing line contact faces 17a, 17b that gradually narrows in the direction from the tip to the base of the fishing rod.

Figure 19:
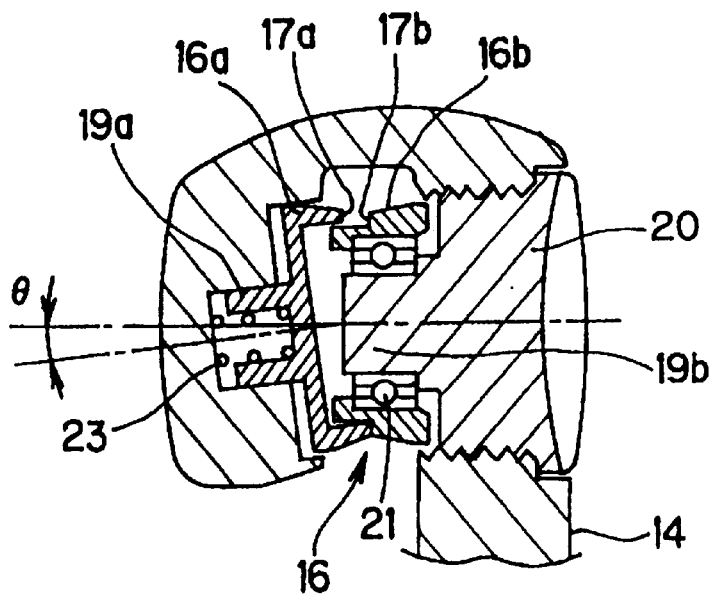
FIG. 19 is a horizontal cross-sectional view showing a tension roller according to a thirteenth embodiment of the present invention.

FIG. 19 shows a tension roller of a spinning reel according to a thirteenth embodiment of the present invention. The tension roller of the thirteenth embodiment differs from that of the second embodiment shown in FIG. 8 in that the bearing 22 has been dispensed with and the support shaft 19a is slidably, but unrotatably, disposed in a hollow portion of the bail arm lever 14. With this configuration, a large tension is applied on the fishing line 1 sandwiched between the left and right tension rollers 16a, 16b.

Figure 20:
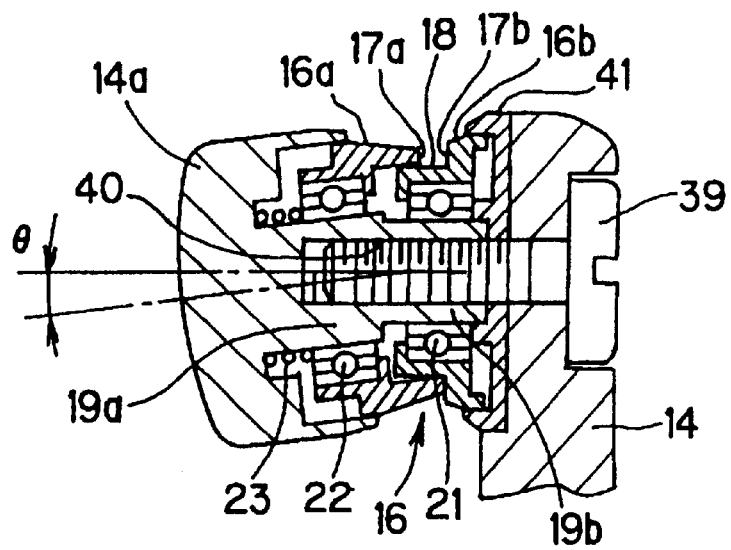
FIG. 20 is a horizontal cross-sectional view showing a tension roller according to a fourteenth embodiment of the present invention.

FIG. 20 shows a tension roller of a spinning reel according a fourteenth embodiment. The tension roller according to the fourteenth embodiment differs from those of the first thorough the thirteenth embodiments shown in FIGS. 2 to 19 in that a fishing line sliding portion 14a is provided as a component separate from the bail arm lever 14. The fishing line sliding portion 14a is fixed to the bail arm lever 14 by a connecting bolt 39.

The support shafts 19a, 19b and the fishing line sliding portion 14a are all formed integrally with each other. The support shafts 19a, 19b are formed with a desired intersection angle θ therebetween. A screw hole 40 for engaging with a connecting bolt 39 is formed in the center of the support shafts 19a, 19b. The connecting bolt 39 is passed through the bail arm lever 14 into engagement with the screw hole 40. With this configuration, the fishing line sliding portion 14a is connected and fixed to the bail arm lever 14 through the support shafts 19a, 19b.

The left and right tension rollers 16a, 16b are supported on the support shafts 19a, 19b by the bearings 22, 21. The coil spring 23 serving as an urging means is inserted between the fishing line sliding portion 14a and the bearing 22 of the left tension roller 16a. The urging force of the coil spring 23 urges the left tension roller 16a toward the right tension roller 16b so that the right tension roller 16b is pressed toward the bail arm lever 14.

A collar 41 is interposed between the right tension roller 16b and the bail arm lever 14. The collar 41 eliminates the space between the outer peripheral surface of the right tension roller 16b and the bail arm lever 14, to prevent the fishing line 1 from entering between the right tension roller 16b and the bail arm lever 14.

Figure 21:
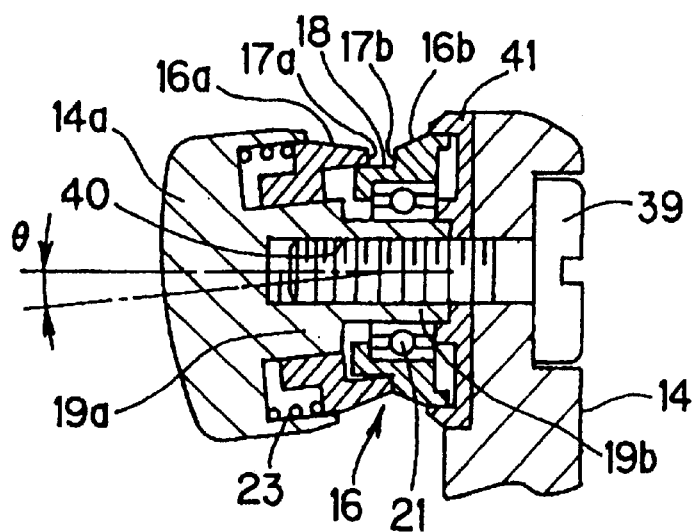
FIG. 21 is a horizontal cross-sectional view showing a tension roller according to a fifteenth embodiment of the present invention.
Figure 22:
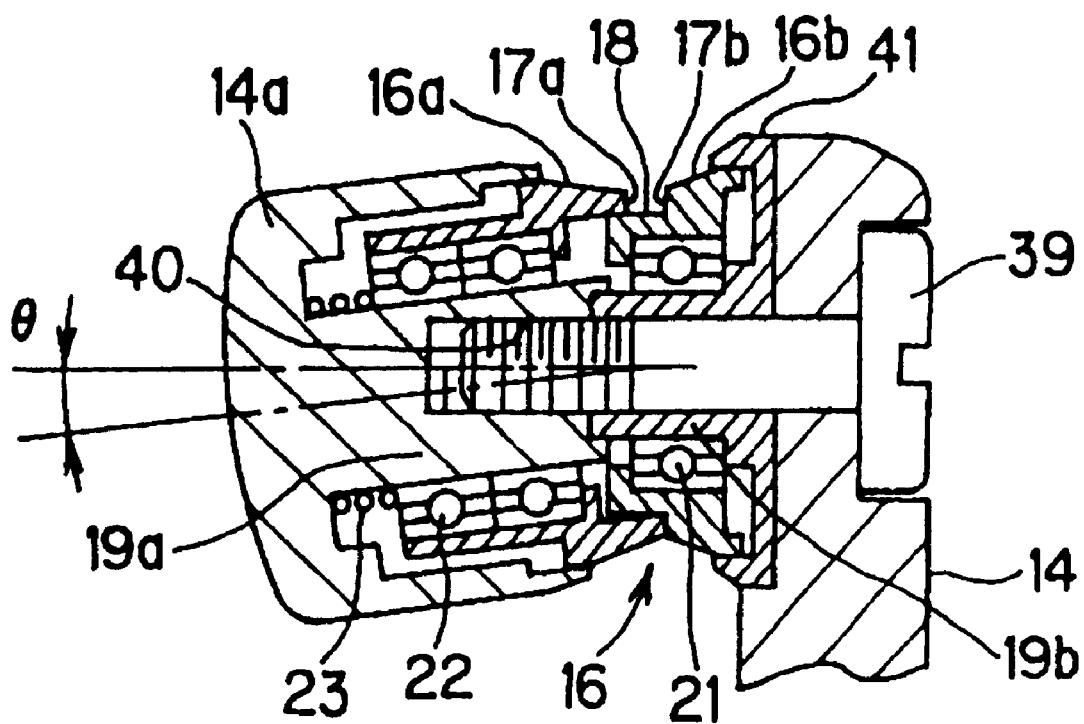
FIG. 22 is a horizontal cross-sectional view showing a tension roller according to a sixteenth embodiment of the present invention.
Figure 23:
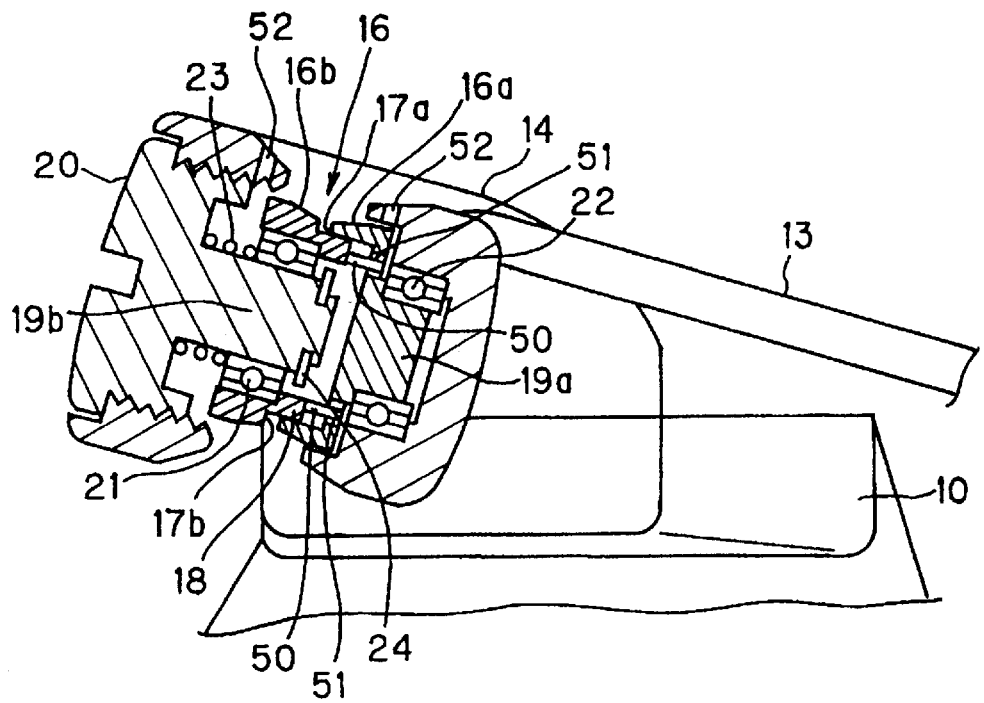
FIG. 23(a) is a vertical cross-sectional view showing a tension roller according to a seventeenth embodiment of the present invention, wherein the tension roller is in a fishing line releasing state.
FIG. 23(b) is a vertical cross-sectional view similar to that of FIG. 23(a) showing the tension roller in a fishing line rewinding state.
Figure 23:
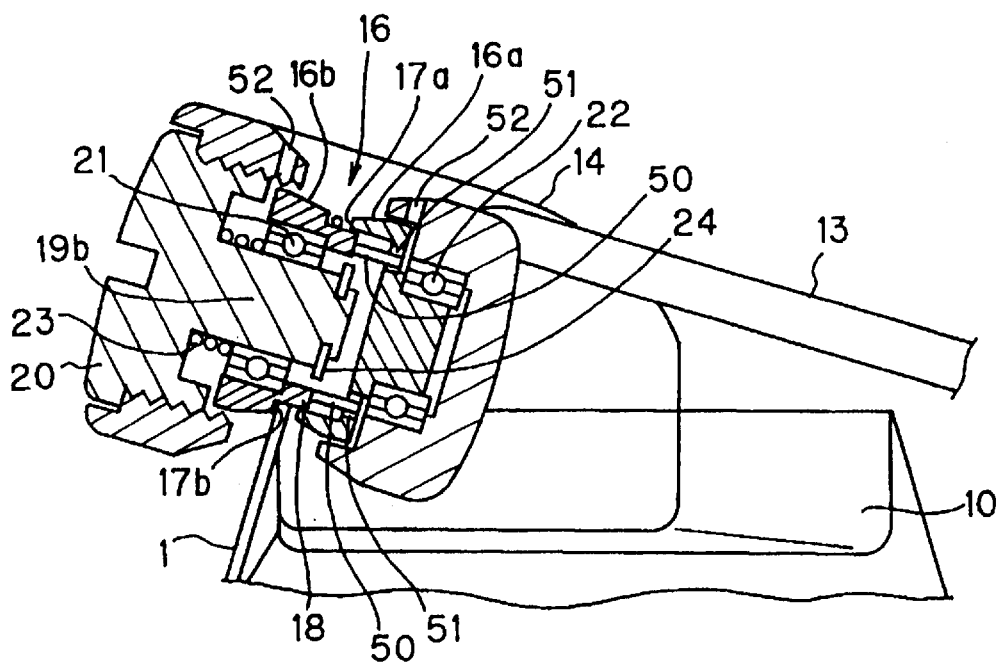

FIG. 21 shows a tension roller of spinning reel according a fifteenth embodiment of the present invention. The tension roller according to the fifteenth embodiment differs from those of the fourteen embodiment shown in FIG. 20 in that the bearing 22 has been eliminated. The left tension roller 16a is slidably, but unrotatably, attached directly on the support shaft 19a. As a result, a large tension force is applied to the fishing line 1 sandwiched between the fishing line contact faces 17a, 17b FIG. 22 shows a tension roller of a spinning reel according a sixteenth embodiment. According to the sixteenth embodiment, the collar 41 of the fourteenth embodiment shown in FIG. 20 is formed with a central sleeve portion that extends through the right tension roller 16b. The central sleeve portion serves as the support shaft 19b for the right tension roller 16b.

Figure 24:
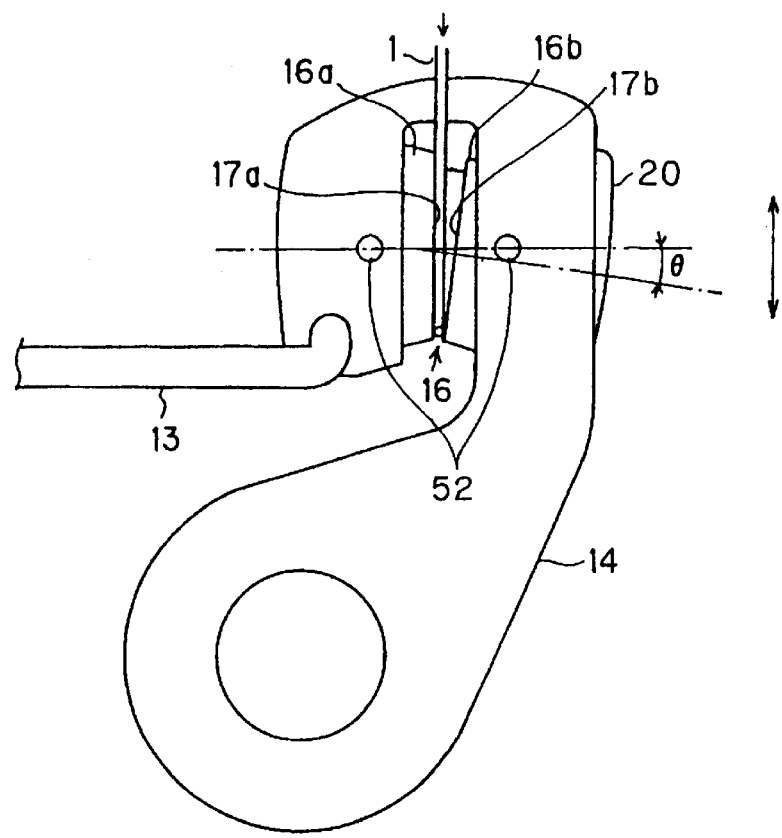
FIG. 24 is a plan view showing the tension roller according to the seventeenth embodiment.

A tension roller of a spinning reel according a seventeenth embodiment of the present invention will be described while referring to FIGS. 23(a) to 25. The tension roller according to the seventeenth embodiment is configured substantially the same as the tension roller of the first embodiment. However, as best seen in FIG. 24, the fishing line contact face 17a is formed to extend substantially parallel with the fishing line 1 that enters from the rod tip (not shown) to the spool 8. With this configuration, the fishing line 1 that travels from the rod tip following a fishing line guide (not shown) to the rod base, is guided by contact with the fishing line contact face 17a to the contacting portion between the fishing line contact faces 17a, 17b, and is then wound up on the winding portion of the spool 8. Accordingly, line twist can be reduced. Alternatively, the fishing line contact face 17b can be disposed substantially parallel with the fishing line 1 instead.

Figure 25:
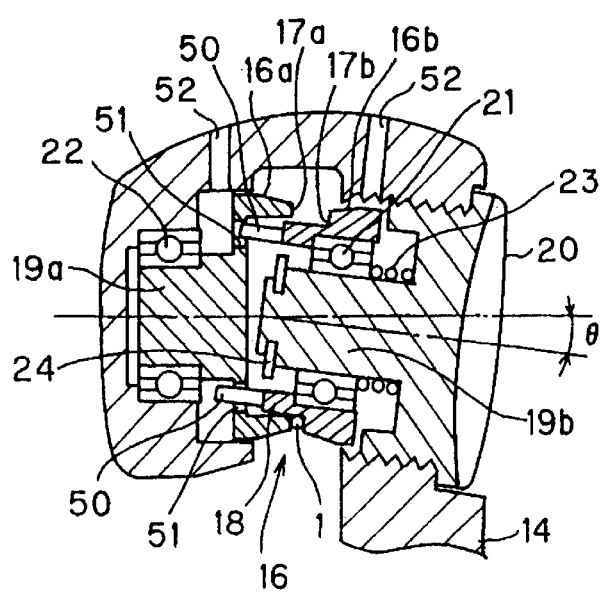
FIG. 25 is a horizontal cross-sectional view showing the tension roller of FIG. 24.

As shown in FIG. 25, a protrusion 50 and an engagement hole 51 are disposed between the left and right tension rollers 16a, 16b. The protrusion 50 and the engagement hole 51 serve as a synchronous rotation means for rotating the tension roller 16 in synchronization. The protrusion 50 has a pin shape that protrudes from an edge of a sleeve member 18 which is a part of the right tension roller 16b toward the left tension roller 16a. The engagement hole 51 is formed on the inner peripheral surface of the left tension roller 16a. The protrusion 50 is inserted into the engagement hole 51. It should be noted that the protrusion 50 can be provided on the left tension roller 16a and the engagement hole 51 can be formed in the sleeve member 18 instead. Because the protrusion 50 engages with the engagement hole 51, when the left tension roller 16a is rotated by contact with the fishing line 1, the right tension roller 16b rotates in synchronization with the left tension roller 16a without any difference in rotational amount. Accordingly, the fishing line 1 will not twist. Because the protrusion 50 of one of the left and right tension rollers 16a, 16b fits into the engagement hole 51 of the other one of the left and right tension rollers 16a, 16b, the left and right tension rollers 16a, 16b rotate in synchronization with each other without generating any deviation in rotation speed or amount. Therefore, the fishing line 1 will not twist even if it is sandwiched between the left and right tension rollers 16a, 16b.

As shown in FIGS. 24 and 25, water drain holes 52 are formed in the C shaped bent portion at the tip of the bail arm lever 14. The water drain holes 52 fluidly connect the area around the left and right tension rollers 16a, 16b to the outside of the bail arm lever 14. It is desirable to provide the water drain holes 52 at positions and with an orientation that facilitate removal of water to the outside of the bail arm lever 14 by centrifugal force generated by rotation of the rotor shown in FIGS. 2 and 3. Because the water that enters the tension roller 16 is discharged through the water drain holes 52, problems caused by crystallized salt, such as poor rotation and or rust of the tension roller 16, can be prevented.

Figure 26:
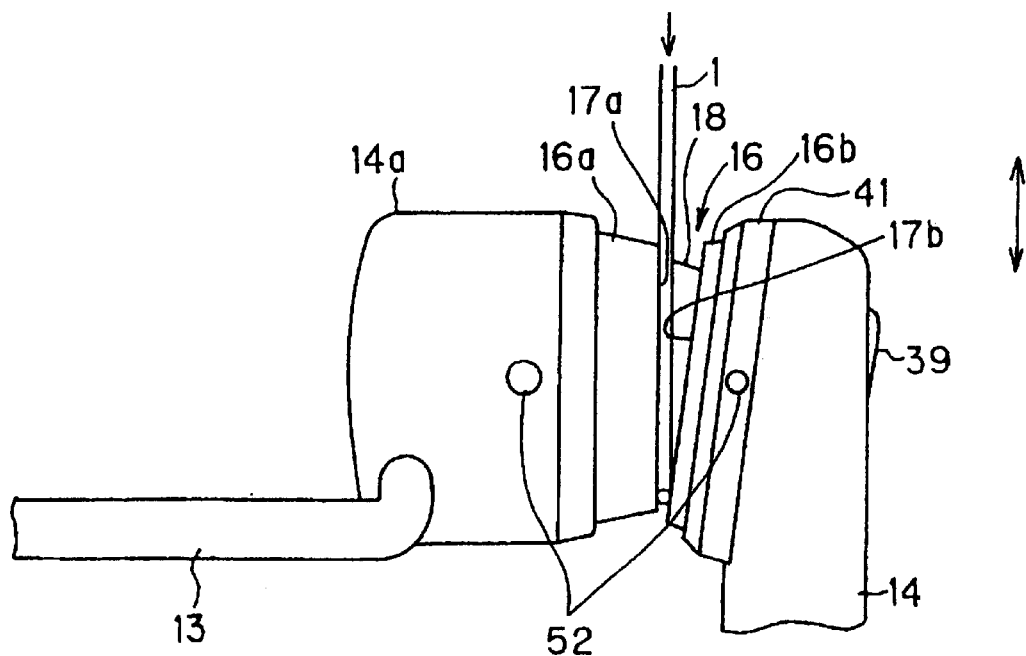
FIG. 26 is a plan view showing a tension roller according to an eighteen embodiment of the present invention.
Figure 27:
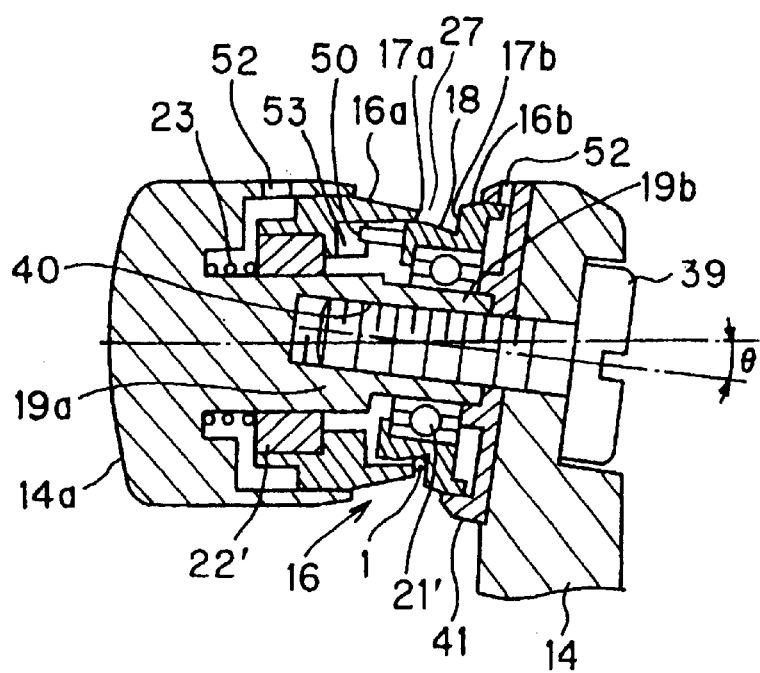
FIG. 27 is a horizontal cross-sectional view showing the tension roller of FIG. 26.

FIGS. 26 and 27 show a tension roller of a spinning reel according to an eighteenth embodiment of the present invention. In a manner similar to the fourteenth embodiment shown in FIG. 20, the fishing line sliding portion 14*a* according to the eighteenth embodiment is formed separately from the bail arm lever 14 and connected to the bail arm lever 14 by a connecting bolt 39. The support shafts 19*a*, 19*b* are formed as integral parts of the fishing line sliding portion 14*a*. The support shafts 19*a*, 19*b* have a bent portion that creates a predetermined intersection angle θ. The screw hole 40 is formed in the center of the support shafts 19*a*, 19*b*. The connecting bolt 39 is screwingly engaged with the screw hole 40. The connecting bolt 39 passes through the bail arm lever 14 into a screwing engagement with the screw hole 40. Accordingly, the fishing line sliding portion 14*a* is connected and fixed to the bail arm lever 14 through the support shafts 19*a*, 19*b*.

The left and right tension rollers 16*a*, 16*b* are supported on the support shafts 19*a*, 19*b* through a non lubrication type (oil-less) metal sleeve 22' and a ball bearing 21', respectively. The coil spring 23, serving as urging means, is inserted between the fishing line sliding portion 14*a* and the oil-less metal sleeve 22' of the left tension roller 16*a*. The coil spring 23 urges the left tension roller 16*a* toward the right tension roller 16*b* so that the right tension roller 16*b* is pressed toward the bail arm lever 14. The collar 41 is interposed between the right tension roller 16*b* and the bail arm lever 14 for eliminating the gap between the outer peripheral surface of the right tension roller 16*b* and the bail arm lever 14 to prevent the fishing line 1 from entering into the gap.

As shown in FIG. 27, a protrusion 50 and an indented cutout portion 53 are provided between the left and right tension rollers 16*a*, 16*b*. The protrusion 50 and the indented cutout portion 53 serves as a synchronous rotation means for rotating the left and right tension rollers 16*a*, 16*b* in synchronization. The protrusion 50 protrudes from the edge of a sleeve member 18 toward the left tension roller 16*a*. The indented cutout portion 53 is formed in the inner periphery of the left tension roller 16*a*. With this configuration, when the left tension roller 16*a* rotates by contact with the fishing line 1, engagement between the protrusion 50 and the indented cutout portion 53 rotates the left and right tension rollers 16*a*, 16*b* together in synchronization without any rotational difference. As a result, the fishing line 1 does not easily twist. It should be noted that alternatively, the protrusion 50 can be provided to the sleeve member 18 and the indented cutout portion 53 can be formed in the left tension roller 16*a*.

As shown in FIG. 26, the fishing line contact face 17*a* is formed to run substantially parallel with the fishing line 1 that enters from the fishing rod toward the spool 8. With this configuration, the fishing line 1 from the tip of the fishing rod passes along a fishing line guide (not shown) toward the base of the fishing rod, is guided by the fishing line contact face 17*a* toward the position where the fishing line contact faces 17*a*, 17*b* contact each other, and is then wound around the fishing line winding portion of the spool 8 shown in FIGS. 2 and 3. Thus, the amount of the fishing line twist can be further reduced. It should be noted that the fishing line contact face 17*b* can be formed to run substantially parallel with the fishing line 1 instead.

As shown in FIGS. 26 and 27, a water drain holes 52 are formed in the collar 41 and the fishing line sliding portion 14*a* at the tip of the bail arm lever 14. The water drain holes 52 are for fluidly connecting an internal area around the left and right tension rollers 16*a*, 16*b* with outside of the bail arm lever 14. It is desirable that the water drain holes 52 are provided at positions and with orientations that facilitate discharge of water out of the bail arm lever 14 by centrifugal force generated by the rotor 5 shown in FIGS. 2 and 3.

Figure 28:
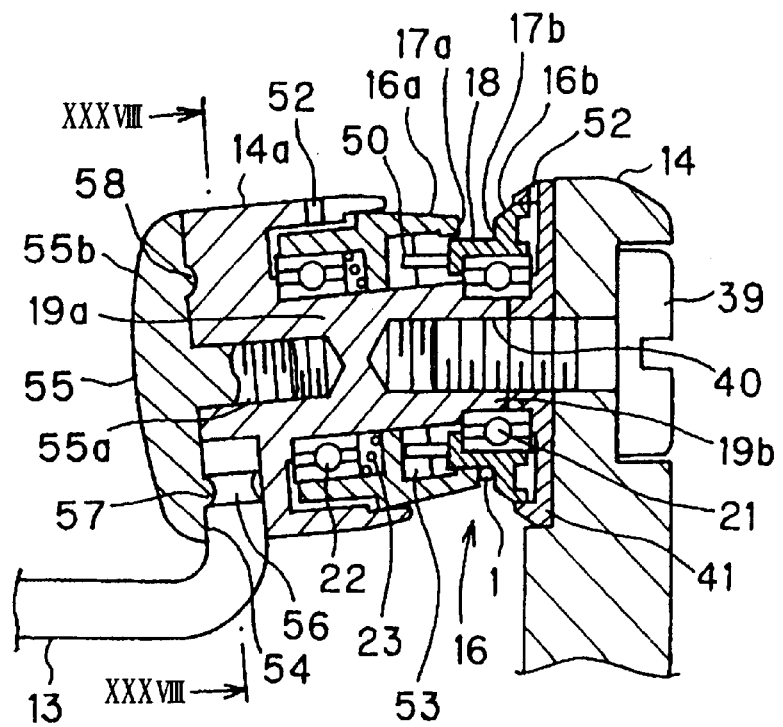
FIG. 28 is a horizontal cross-sectional view showing a tension roller according to a nineteenth embodiment of the present invention.
Figure 29:
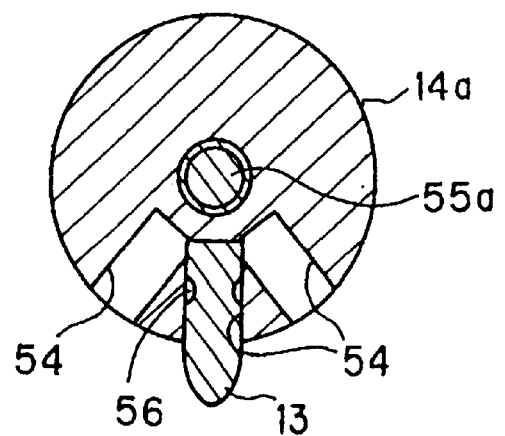
FIG. 29 is a cross-sectional view taken along a line XXVIII—XXVIII of FIG. 28.

Next, while referring to FIGS. 28 and 29, a tension roller of a spinning reel according a nineteenth embodiment of the present invention will be described. The tension roller according to the nineteenth embodiment differs from the eighteenth embodiment in that a plurality of bail arm insertion holes 54 are formed in the fishing line sliding portion 14*a*. The bail arm 13 is detachably fixed in one of the bail arm insertion holes 54 by a fixing screw 55. As shown in FIG. 29, the bail arm insertion recesses 54 are formed in the sliding portion 14*a* radially toward an axis of the support shaft 19*a*, and open at one end to the outer peripheral surface of the fishing line sliding portion 14*a*. Each recess 54 is also open at axial end face of the sliding portion 14*a*. A screw portion 55*a* of the fixing screw 55 is screwingly engaged at the center of the support shaft 19*a*. The head portion 55*b* of the fixing screw 55 closes the opening of the recesses 54 at the axial end face of the fishing line sliding portion 14*a*. Thus, a bail arm insertion holes 54 are provided. An indentation groove 56 is formed in one end of the bail arm 13. Protrusions 57 are formed annularly at an inner face of the head portion 55*b* to engage the indentation groove 56 for preventing the bail arm 13 from falling out of its insertion hole 54. An annular groove 58 is formed on the axial end surface of the fishing line sliding portion 14*a* at positions corresponding to the annular protrusions 57. When the fixing screw 55 is screwed into the fishing line sliding portion 14*a*, the protrusion 57 fits simultaneously into the annular groove 58 and also into the indentation groove 56 of the bail arm 13. Thus, the bail arm 13 is supported in the bail arm insertion holes 54 of the fishing line sliding portion 14*a*.

By loosening the connecting bolt 39 and angularly rotating the fishing line sliding portion 14*a*, the position where the fishing line contact faces 17*a*, 17*b* contact each other can be changed. When the contact position is changed, the position where the bail arm 13 is attached to the fishing line sliding portion 14*a* must also be changed. To change the attachment position of the bail arm 13, first the fixing screw 55 is loosened. Then, the protrusion 57 is pulled out of the indentation groove 56 and the bail arm 13 is pulled out of its bail arm insertion hole 54. Then, the bail arm 13*b* is inserted into another bail arm insertion hole 54 with a more appropriate position, and the fixing screw 55 is tightened. With this configuration, the position where the fishing line contact faces 17*a*, 17*b* contact each other can be appropriately changed in accordance with the diameter of the fishing line 1, desired winding tension, and winding diameter of the spool. As a result, the fishing line 1 can be applied with an appropriate tension while being wound uniformly around the spool 8 shown in FIGS. 2 and 3.

In the same manner as in the eighteenth embodiment, the protrusion 50 and the indented cutout portion 53 are provided as a synchronous rotation means. The protrusion 50 protrudes from the sleeve member 18 towards the left tension roller 16*a*. The indented cutout portion 53 is formed in inner peripheral surface of the left tension roller 16*a*. The fishing line contact face 17*b* is formed substantially parallel with the fishing line 1 that enters from the fishing rod (not shown) to the spool 8 shown in FIGS. 2 and 3. As a result, the fishing line 1 which travels from the rod tip following a fishing line guide (not shown) toward the base of the fishing rod, is guided by contact with the fishing line contact face 17*b* toward the location where the fishing line contact faces 17*a*, 17*b* contact each other. Then, the fishing line 1 is wound around the fishing line windup portion of the spool 8. As a result, fishing line twisting can be reduced. The water drain holes 52 are formed in the collar 41 and the tip of the fishing line sliding portion 14a, in order to bring the area around the left and right tension rollers 16a, 16b into fluid communication with the outside the bail arm lever 14.

As described above, according to the first through nineteenth embodiments, a line roller is separated into left and right tension rollers with a fishing line guide groove portion disposed therebetween. The left and right tension rollers are rotatably supported on the support shafts that are disposed so that their axial lines intersect at a position in front of the reel body. Further, fishing line contact faces engage with each other so that the space between the fishing line contact faces narrows gradually in a direction from the tip of the fishing rod to the base of the fishing rod. Also, the urging means is provided for resiliently urging the fising line contact faces toward each other. With this configuration, even when a small tension is applied to the fishing line that travels from the tip of the fishing rod to the tension roller, the fishing line will accurately enter between the fishing line contact faces of the left and right tension rollers. Accordingly, the fishing line can be wound on the spool to a uniform thickness while applied with an appropriate tension. Backlash can thus be prevented.

According to the seventeenth through nineteenth embodiments, a synchronous rotation means is provided between the fishing line contacts faces in order to ensure that the left and right tension rollers rotate in synchronization. With this configuration, left and right tension rollers will rotate by the same amount and speed when the fishing line is being wound onto its spool. As a result, fishing line twist can further be prevented. Also, even if one of the left and right tension rollers does not easily rotate for some reason, such as salt clinging to the one of the tension rollers, it will be forced to rotate with rotation of the other tension roller when the other tension roller is contacted by the fishing line. As a result, accurate rotation of the tension roller is ensured.

According to the seventeenth to nineteenth embodiments, water drain holes are further provided in the bail arm support member, which supports the fishing line tension rollers. Therefore, water which has accumulated in an internal space surrounding the tension rollers can be discharged out from the reel through the water drain holes by rotation of the rotor, for example. Accordingly, mechanical parts can be prevented from rusting and salt crystals can be prevented from clinging to various components of the reel, so that smooth rotation of the tension roller can be ensured.

Next, a spinning reel according to a twentieth embodiment will be described with reference to FIGS. 30(*a*) to 32. Different from the foregoing embodiments, various embodiments shown in FIGS. 30(*a*) to 64 provide left and right tension rollers disposed coaxially with each other.

Figure 30:
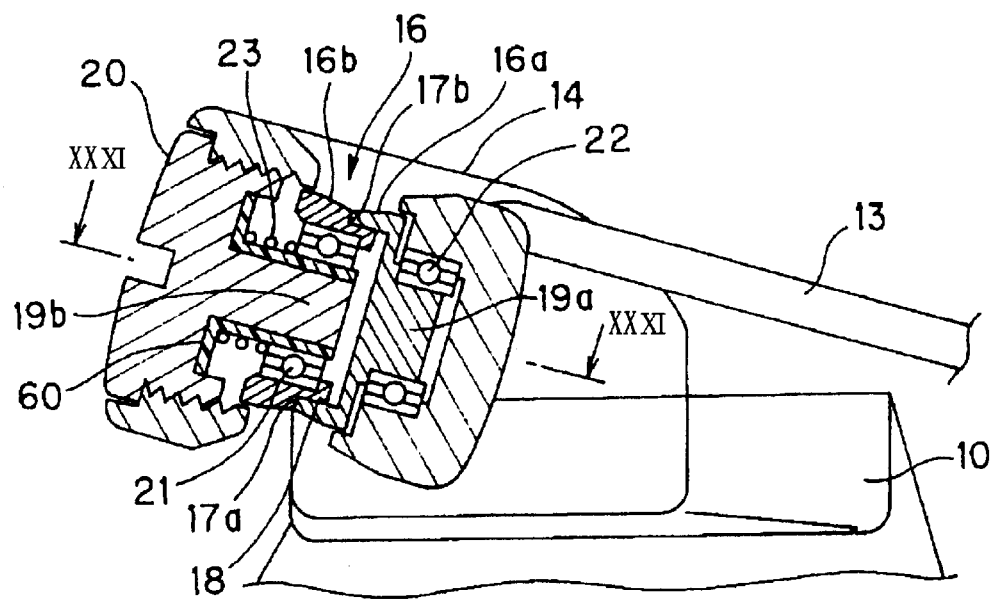
FIG. 30(a) is a cross-sectional view showing a tension roller according to a twentieth embodiment of the present invention, wherein the tension roller is in a fishing line releasing state.
FIG. 30(b) is a vertical cross-sectional view similar to that of FIG. 30(a) wherein the tension roller is in a fishing line rewinding state.
Figure 30:
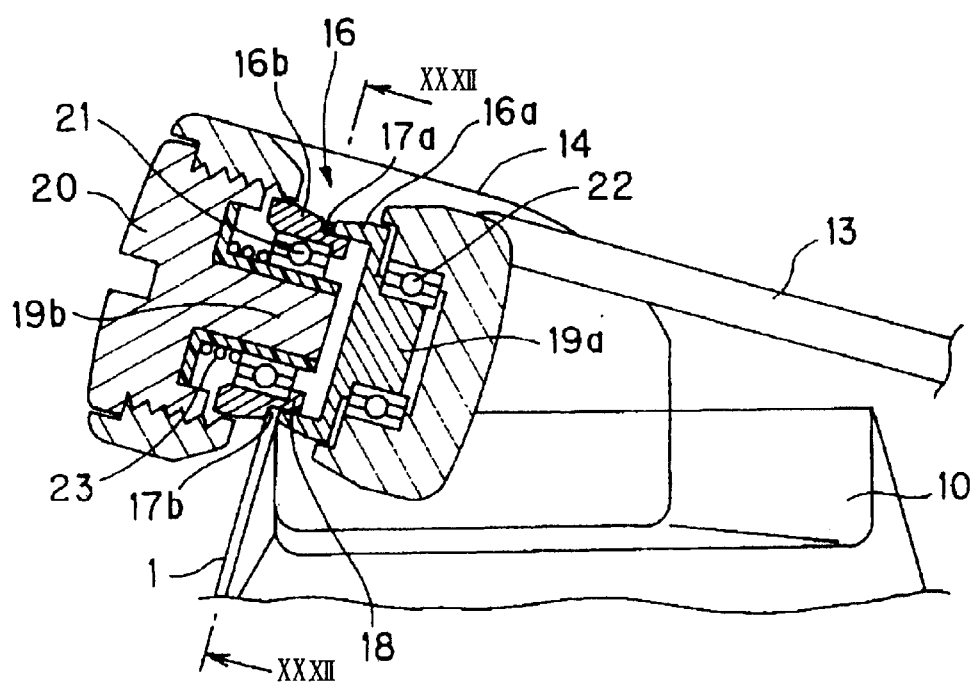
Figure 31:
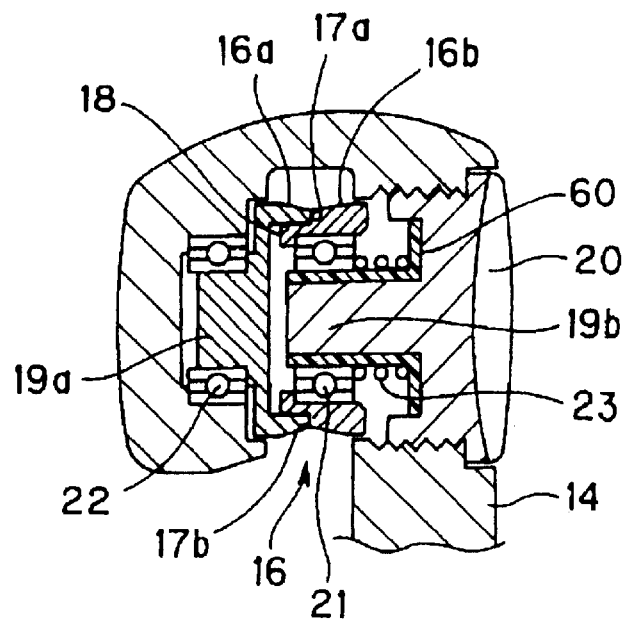
FIG. 31 is a cross-sectional view taken along a line XXXI—XXXI of FIG. 30(a)
Figure 32:
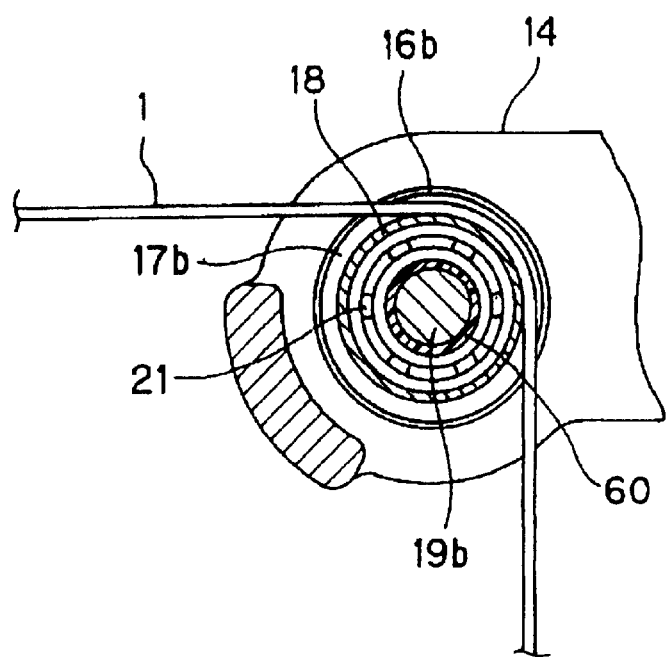
FIG. 32 is a cross-sectional view taken along a line XXXII—XXXII of FIG. 30(b)

As shown in FIGS. 30(*a*) to 32, the left and right tension rollers 16*a*, 16*b* are rotatably supported by the support shafts 19*a*, 19*b*, respectively, which are positioned in axial alignment with each other. The support shaft 19*b* is attached to the tip end of the screw member 20, which is screwingly engaged with a tension roller support portion of the bail arm lever 14. The right tension roller 16*b* is attached to the support shaft 19*b* through a bearing 21. The left tension roller 16*a* is formed integrally with the support shaft 19*a*. The support shaft 19*a* is supported by a support portion of the bail arm lever 14 through a bearing 22. With this configuration, the left and right left and right tension rollers 16*a*, 16*b* are independently rotatable on the support shafts 19*a*, 19*b* while supported in an axial alignment. It should be noted that a slide bearing can be used instead of the roller bearings 21, 22.

The bearing 21, which supports the right tension roller 16*b* on the support shaft 19*b*, can slide in its axial direction over the support shaft 19*b* while supporting the right tension roller 16*b*. The coil spring 23 is disposed over the support shaft 19*b*, and serves as a resilient urging means for urging the bearing 21 toward the left tension roller 16*a*. With this configuration, the fishing line contact faces 17*a*, 17*b* of the left and right tension rollers 16*a*, 16*b* resiliently engage with each other. As shown in FIGS. 30(*a*) and 31, the groove between the fishing line contact faces 17*a*, 17*b* into which the fishing line 1 is introduced is normally closed. However, as shown in FIGS. 30(*b*) and 32, when the fishing line 1 is being reeled in, the fishing line 1 separates the fishing line contact faces 17*a*, 17*b* from each other and enters in between the two.

As shown in FIGS. 30(*a*) through 32, it is desirable to interpose a synthetic resin collar 60 between the support shaft 19*b* and the bearing 21, which supports the right tension roller 16*b*. The collar 60 enhances smooth sliding movement of the right tension roller 16*b* over the support shaft 19*b* without the right tension roller 16*b* tilting.

After a cast is made, the bail arm 13 is switched from the fishing line release state into the fishing line winding state, and the fishing line 1 is wound around the tension roller 16. When the rotor 5 is rotated by the operation of the handle 7 and the fishing line 1 is wound up, the right tension roller 16*b* slides tightly, that is, without play, in the axial direction over the support shaft 19*b* against urging force of the coil spring 23. The right tension roller 16*b* slides because the left and right tension rollers 16*a*, 16*b* are independently supported on the support shafts 19*a*, 19*b*, respectively. Therefore, the right tension roller 16*b* will slide regardless of whether the fishing line 1 traveling from the fishing rod tip toward the tension roller 16 is applied with a large tension as indicated by the broken line in FIG. 7, or with a small tension applied as indicated by the solid line in FIG. 7. When the right tension roller 16*b* slides in this manner, the fishing line 1 enters into the groove between the left and right tension rollers 16*a*, 16*b*. Simultaneously with this, the fishing line 1 is sandwiched between the fishing line contact faces 17*a*, 17*b* from both sides as shown in FIGS. 30(*b*), 32, and 7. As a result, a large tension is applied to the fishing line 1 as it travels from the tension roller 16 to the spool 8. The fishing line 1 will be wound around the fishing line winding portion of the spool 8 without any looseness.

Figure 33:
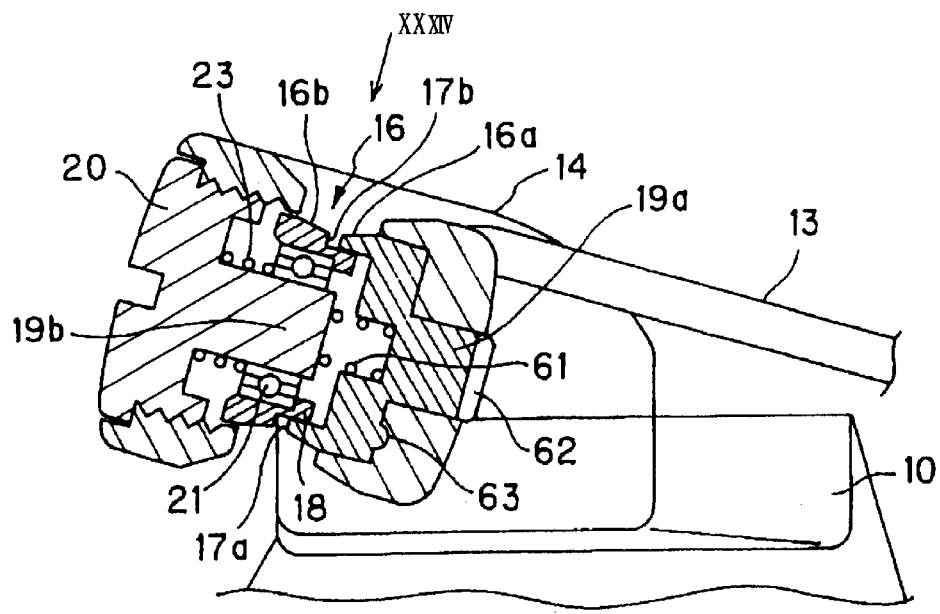
FIG. 33(a) is a vertical cross-sectional showing a tension roller according to a twenty first embodiment of the present invention wherein the tension roller is in a fishing line releasing state.
FIG. 33(b) is a cross-sectional view similar to that of FIG. 33(a), wherein the tension roller is in a fishing line rewinding state.
Figure 33:
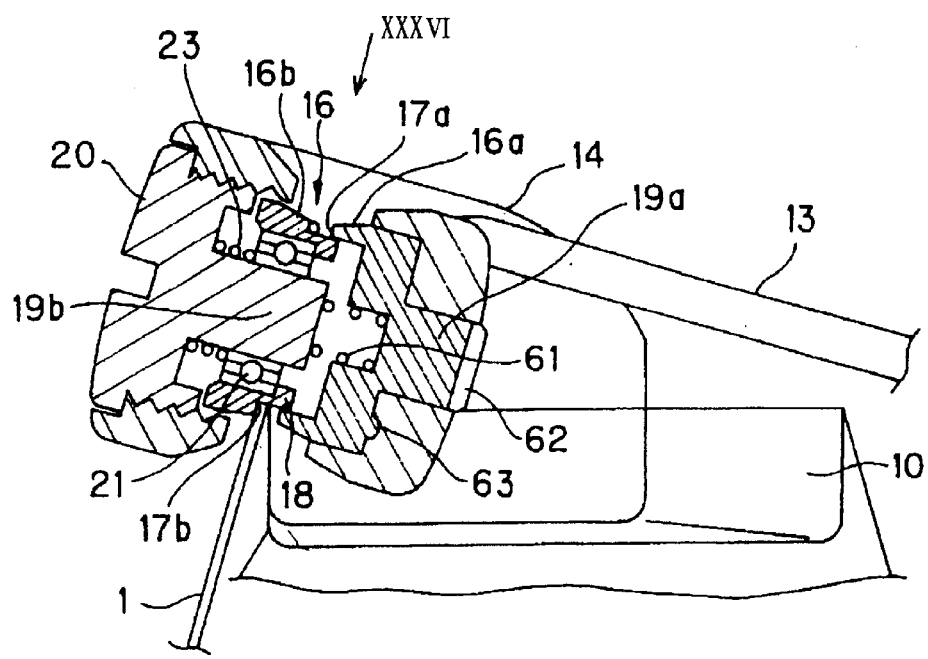

Next, a tension roller of spinning reel according a twenty first embodiment of the present invention will be described while referring to FIGS. 33(*a*) to 38. According to this embodiment, the left tension roller 16*a* of the tension roller 16 is fixed so as to be unrotatable with respect to the tension roller support portion of the bail arm lever 14 even if contacted by the fishing line 1. On the other hand, the right tension roller 16*b* is rotatably provided to the tension roller support portion, and is rotated when contacted by the fishing line 1.

The left tension roller 16*a* is formed integrally with the support shaft 19*a*. Both the left tension roller 16*a* and the support shaft 19*a* are disposed in a hollow space formed in the tension roller support portion of the bail arm lever 14. The left tension roller 16*a* is pressed into the hollow portion by a spring 61 that serves as resilient member and which is mounted between the tip of the support shaft 19*b* and the left tension roller 16*a*. The support shaft 19*a* of the left tension roller 16*a* passes through the hollow portion in the tension roller support portion, and protrudes out of the ail arm lever 14 to be exposed to outside. An engagement groove 62 is formed in the protruding tip end portion of the support shaft 19a. The engagement groove 62 is used to rotate the left tension roller 16a in the tension roller support portion with a screw driver or other tool. Matching protrusions and indentations 63 are formed in the left tension roller 16a and the inner surface of the hollow portion of the tension roller support portion and function as a click stop mechanism when the left tension roller 16a is rotated in the tension roller support portion.

The right tension roller 16b is supported on the support shaft 19b by a bearing 21 so as to be slidable in the axial direction over the support shaft 19b along with the bearing 21 itself. The coil spring 23 is mounted as an urging means on the support shaft 19b. The right tension roller 16b is constantly pressed toward the left tension roller 16a by the coil spring 23. With this configuration, the fishing line contact faces 17a, 17b attempt to engage and contact each other so as to reduce the gap between the fishing line contact faces 17a, 17b.

Figure 34:
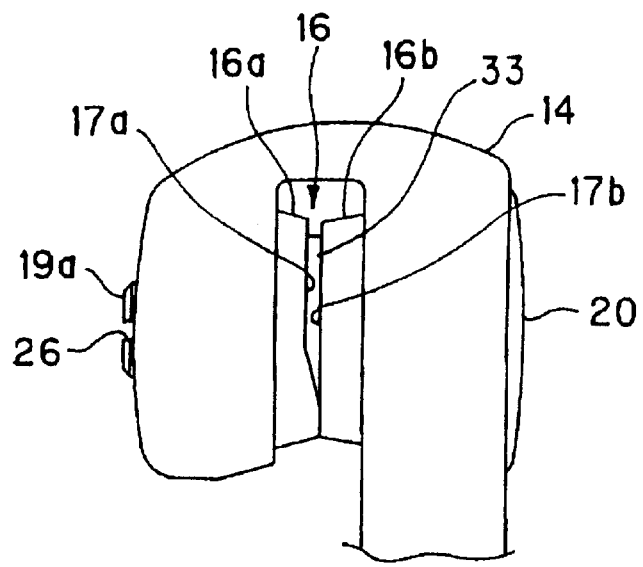
FIG. 34 is a cross-sectional view taken along a line XXXIV—XXXIV of FIG. 33(a) showing the tension roller support portion and the tension roller itself.
Figure 35:
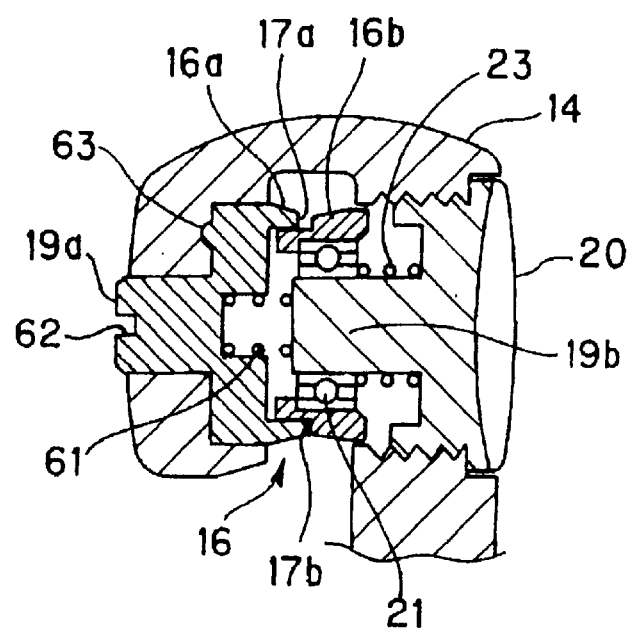
FIG. 35 is a horizontal cross-sectional view showing the tension roller of FIG. 34.
Figure 36:
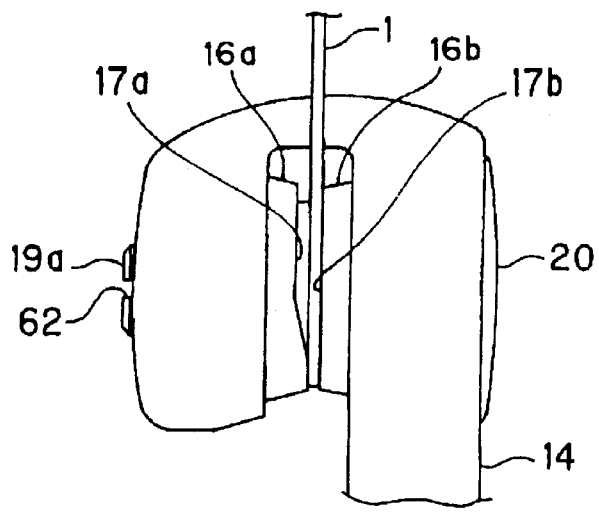
FIG. 36 is a cross-sectional view taken along a line XXXVI—XXXVI of FIG. 33(b) showing the tension roller and the tension roller support portion.
Figure 37:
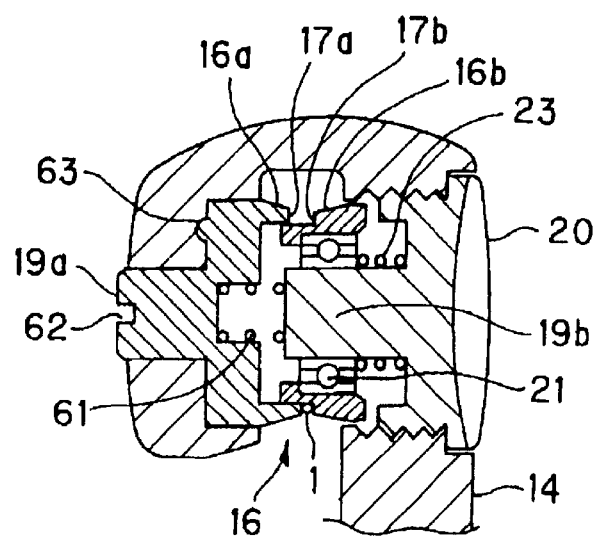
FIG. 37 is a cross-sectional view of the tension roller shown in FIG. 36.

As best seen in FIG. 34, the left tension roller 16a is formed with a broad portion, a narrow portion, and a slanting surface between the broad and narrow portions. On the other hand, the fishing line contact face 17b is formed in a linear face at its axial end. With this configuration, when the fishing line 1 separates from the tension roller 16, the fishing line introduction groove between the left and right tension rollers 16a, 16b closes at the portion of the broad portion as shown in FIGS. 34 and 35. However, at this time a space 33 is formed by the narrow portion of the left tension roller 16a. Accordingly, as shown in FIGS. 36 and 37, even when a small tension is applied on the fishing line 1 when the fishing line 1 is reeled in, the fishing line 1 will easily enter between the fishing line contact faces 17a, 17b. The fishing line 1 will press and move apart the fishing line contact faces 17a, 17b from each other at the location of the broad portion of the left tension roller 16a. When the fishing line 1 enters between contact faces 17a, 17b at the broad portion, then as indicated by the hatching in FIG. 38 the fishing line 1 will be sandwiched between the fishing line contact faces 17a, 17b while being wound up on the spool 8 as shown in FIGS. 2 and 3.

Figure 38:
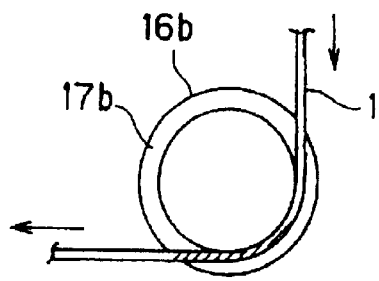

The position where the hatching of FIG. 38 sandwiches the fishing line 1 can be adjusted by inserting a tool (not shown) into the engagement groove 62 of the support shaft 19a and rotating the left tension roller 16a to the desired angle on the tension roller support portion. Adjusting position in this manner enables adjustments to match material of the line, thickness of the line, tension to be applied on the line, and winding diameter of the spool 8.

Figure 39:
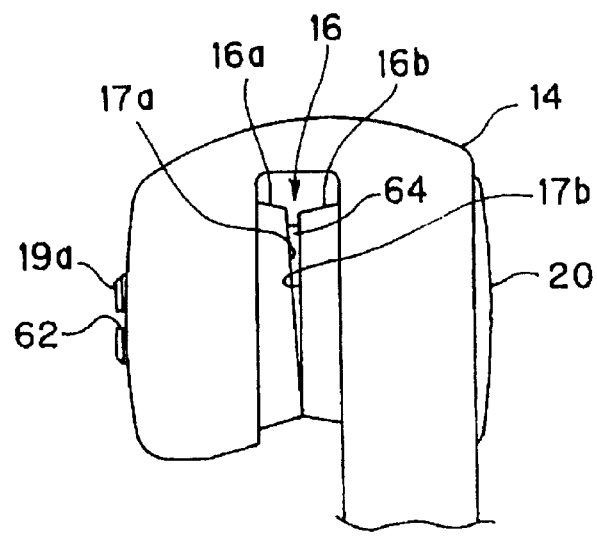
FIG. 39 is a cross-sectional view similar to that of FIG. 36, showing the tension roller and the tension roller support portion according to a twenty second embodiment of the present invention, wherein the tension roller is in a fishing line releasing state.
Figure 40:
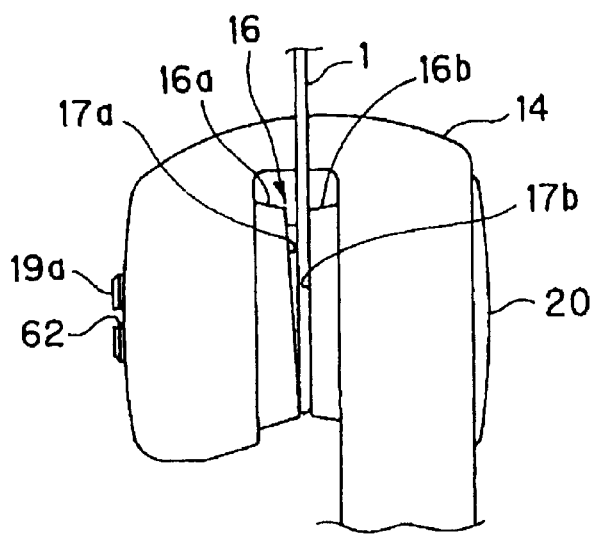
FIG. 40 is a cross-sectional view similar to that of FIG. 36, showing the tension roller and the tension roller support portion according to the twenty second embodiment, when the tension roller is in a fishing line rewinding state.
Figure 41:
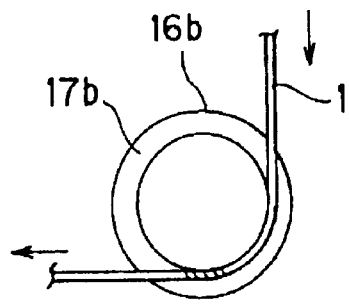

Next, while referring to FIGS. 39 through 41, a tension roller of a spinning reel according to a twenty second embodiment of the present invention will be described. Similar to the twenty first embodiment, the left tension roller 16a according to the twenty second embodiment has broad and narrow portions. However, according to the present embodiment, the broad portions and the narrow portions of the left tension roller 16a are formed by aligning the fishing line contact face 17a on a plane that intersects the rotational axis of the tension roller 16 at a slant. In other words, a right end face of the left tension roller 16a is in a from of a flat slanting face. Therefore, as shown in FIG. 39, the fishing line contact faces 17a and 17b define therebetween a triangular fishing line introduction groove 64 whose width is the greatest at the fishing rod tip side, and the smallest at the base side of the fishing rod.

The fishing line contact faces 17a, 17b close to each other at the broadest portion during the fishing line release state. Even if only a small tension is applied to the fishing line 1 when the fishing line 1 is reeled in, as shown in FIG. 40 the fishing line 1 can easily enter between the fishing line contact faces 17a, 17b. The fishing line 1 presses apart and enters between the fishing line contact faces 17a, 17b at the location of the broadest portion of the contact face 17a. As a result, while the fishing line 1 is wound around the spool 8 shown in FIGS. 2 and 3, the fishing line 1 is sandwiched between the fishing line contact faces 17a, 17b at the broadest portion as indicated by hatching in FIG. 41.

Figure 42:
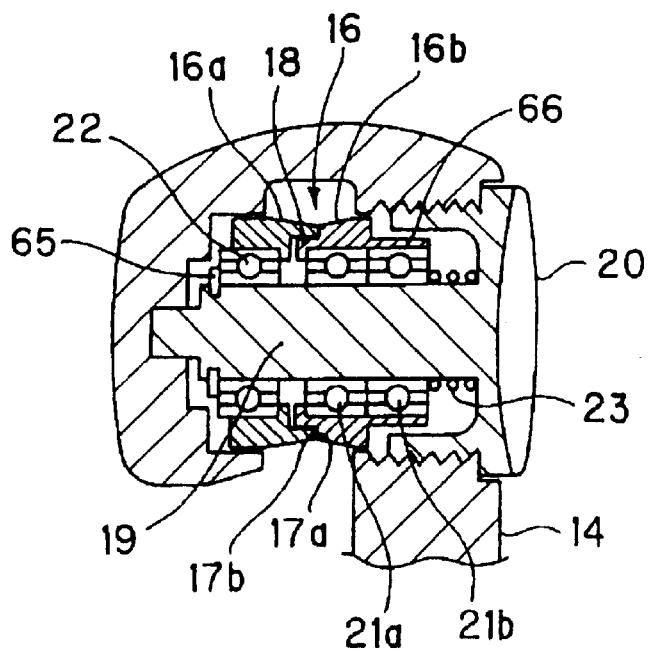
FIG. 42 is a cross-sectional view similar to that of FIG. 31 showing a tension roller and a tension roller support portion according to a twenty third embodiment of the present invention.

FIG. 42 shows a tension roller of a spinning roller according to a twenty third embodiment of the present invention.

The tension roller 16 according to the present embodiment differs from the tension roller of the twentieth embodiment in that both the left and right tension rollers 16a, 16b are supported on a single support shaft 19, which is formed integrally with a screw member 20 which is screwingly engaged with one side wall of the tension roller support portion of the bail arm lever 14. Thus, one end of the support shaft 19 is supported on one side wall of the tension roller support portion. Another end of the support shaft 19 has a protrusion fitted into a hole in another side wall of the tension roller support portion of the bail arm lever 14. With this configuration, the support shaft 19 is supported at both ends on the tension roller support portion of the bail arm lever 14.

The left and right tension rollers 16a, 16b are slidably supported on the support shaft 19a by the bearings 22, 21a, 21b. A coil spring 23 serving as urging means is mounted on the base side of the support shaft 19. The coil spring 23 resiliently presses the left and right tension rollers 16a, 16b toward a stop ring 65 that is fixed to the tip of the support shaft 19.

The tension roller 16 of the twenty third embodiment differs from that of the twentieth embodiment in that the right tension roller 16b, which is near the coil spring 23, has an elongated sleeve 66. The right tension roller 16b is supported on the support shaft 19 by a plurality of bearings 21a, 21b. With this configuration, the right tension roller 16b smoothly slides over the support shaft 19 with the bearings 21a, 21b without tilting, so that the fishing line 1 can more easily enter between the fishing line contact faces 17a, 17b.

Figure 43:
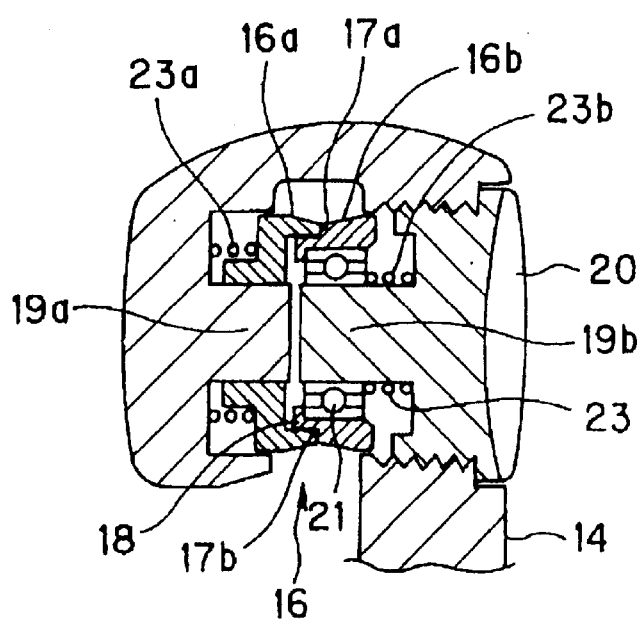
FIG. 43 is a cross-sectional view similar to that of FIG. 31 showing a tension roller and a tension roller support portion according to a twenty fourth embodiment of the present invention.

FIG. 43 shows a tension roller of a spinning reel according to a twenty fourth embodiment of the present invention. The tension roller 16 according to the twenty fourth embodiment differs from that of the twentieth embodiment in that the left and right tension rollers 16a, 16b are both slidably supported on the support shafts 19a, 19b, respectively. That is, coil springs 31a, 31b which serve as urging means are mounted on the support shafts 19a, 19b behind the respective ones of the left and right tension rollers 16a, 16b. Urging force generated by these coil springs 31a, 31b press the left and right tension rollers 16a, 16b toward each other so that the fishing line contact faces 17a, 17b abut against each other.

Figure 44:
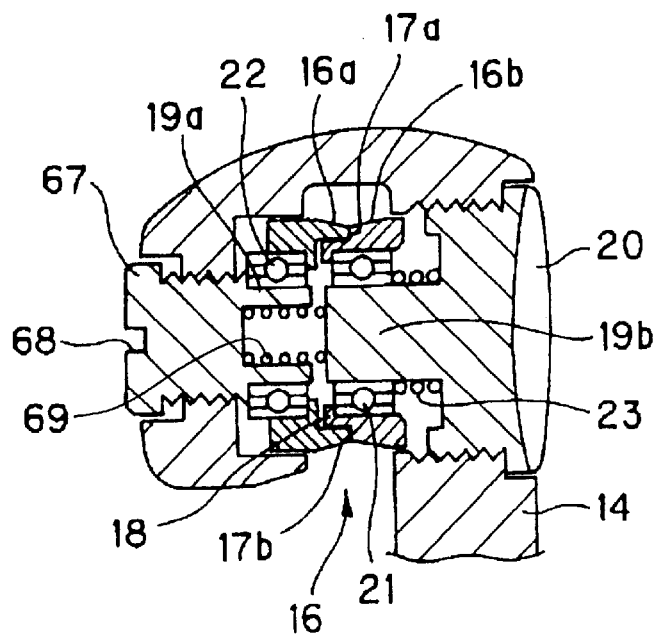
FIG. 44 is a cross-sectional view similar to that of FIG. 31 showing a tension roller and a tension roller support portion according to a twenty fifth embodiment of the present invention.

FIG. 44 shows a tension roller for a spinning reel according to a twenty fifth embodiment. In a manner similar to the twentieth embodiment, according to the twenty fifth embodiment, the support shaft 19b, which supports the right tension roller 16b, is formed integrally with the screw member 20. Also, the support shaft 19b is supported on the tension roller support portion by the screw member 20. However, the present embodiment differs from the twentieth embodiment in that the support shaft 19a, which supports the left tension roller 16a, is also formed at its tip with an adjustment screw 67.

The head portion of the adjustment screw 67 protrudes away from the tension roller support portion, and an engagement groove 68 into which a screw driver or other tool is inserted is formed in the head portion. By rotating the adjustment screw 67 using a tool, the urging force of the coil spring 23, which is provided behind the right tension roller 16b, can be adjusted by moving the left tension roller 16a on the adjustment screw 67 away from or toward the right tension roller 16b. The pressure at which the fishing line contact faces 17a, 17b press against the fishing line 1 can be increased or decreased. It should be noted that if necessary, a coil spring 69 can be provided between the support shafts 19a, 19b to remove backlash of the screw member 20 and the adjustment screw 67.

Figure 45:
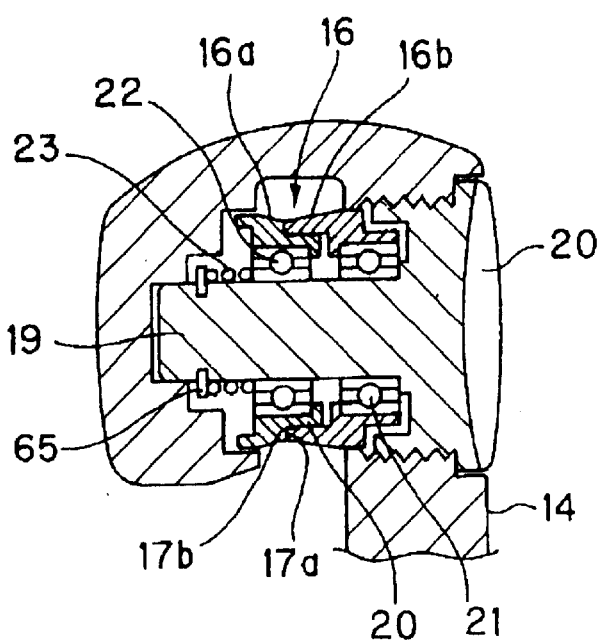
FIG. 45 is a cross-sectional view similar to that of FIG. 31 showing a tension roller and a tension roller support portion according to a twenty sixth embodiment of the present invention.

FIG. 45 shows a tension roller of a spinning reel according to a twenty sixth embodiment. According to this embodiment, a support shaft 19 formed in a single rod shape supports both of the left and right tension rollers 16a, 16b. The integral support shaft 19 is formed integrally with the screw member 20, which is screwed into the tension roller support portion. The left and right tension rollers 16a, 16b are supported on the support shaft 19 by the bearings 21, 22.

A stop ring 65 is fixed to the tip of the support shaft 19. The coil spring 23 is mounted between the stop ring 65 and the left tension roller 16a. The urging force of the coil spring 23 urges the left and right tension rollers 16a, 16b in place with the fishing line contact faces 17a, 17b in contact with each other. The tension roller 16 can be detached from the bail arm lever 14 by merely turning the screw member 20 on the tension roller support member of the bail arm lever 14. As a result, parts are not easily lost when removed. Also, maintenance checks can be simplified.

Figure 46:
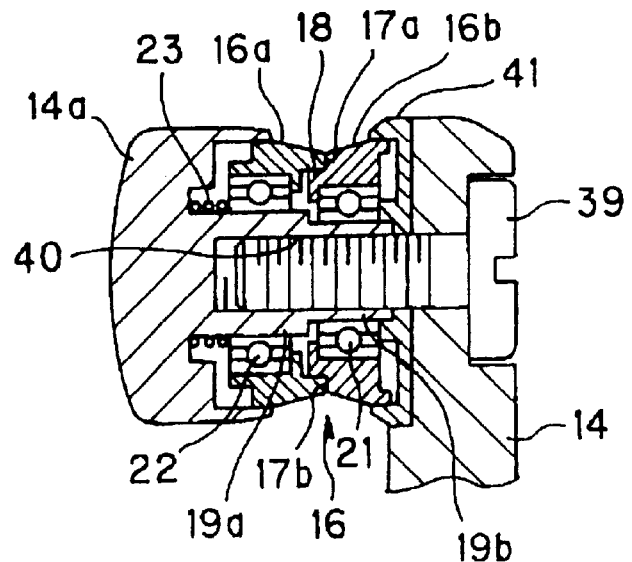
FIG. 46 is a cross-sectional view similar to that of FIG. 31 showing a tension roller and a tension roller support portion according to a twenty seventh embodiment of the present invention.

FIG. 46 shows a tension roller of a spinning reel according to a twenty seventh embodiment. The present embodiment differs from the twentieth through twenty sixth embodiments shown in FIGS. 30 through 45 in that the fishing line sliding portion 14a is formed separately from the bail arm lever 14 and is fixed to the bail arm lever 14 by a connecting bolt 39. The support shafts 19a, 19b and the fishing line sliding portion 14a are provided integrally with each other. The support shafts 19a, 19b are aligned with their axes on a single imaginary line. A screw hole 40 for screwingly engaging with the connecting bolt 39 is formed through the center of the integral support shafts 19a, 19b. The connecting bolt 39 passes from the main body of the bail arm lever 14 and screwingly engages with the screw hole 40. With this configuration, the fishing line sliding portion 14a is fixedly connected to the main body of the bail arm lever 14 by the support shafts 19a, 19b.

The left and right tension rollers 16a, 16b are supported on the support shafts 19a, 19b by the bearings 21, 22. The coil spring 23 is inserted between the fishing line sliding portion 14a and the bearing 22 of the left tension roller 16a. Urging force of the coil spring 23 urges the left tension roller 16a toward the right tension roller 16b and presses the right tension roller 16b toward the main body of the bail arm lever 14. The collar 41 is provided between the right tension roller 16b and the main body of the bail arm lever 14. The collar 41 is for eliminating the gap between the outer peripheral surface of the right tension roller 16b and the bail arm lever 14 to prevent the fishing line 1 from entering between the right tension roller 16b and the main body of the bail arm lever 14.

Figure 47:
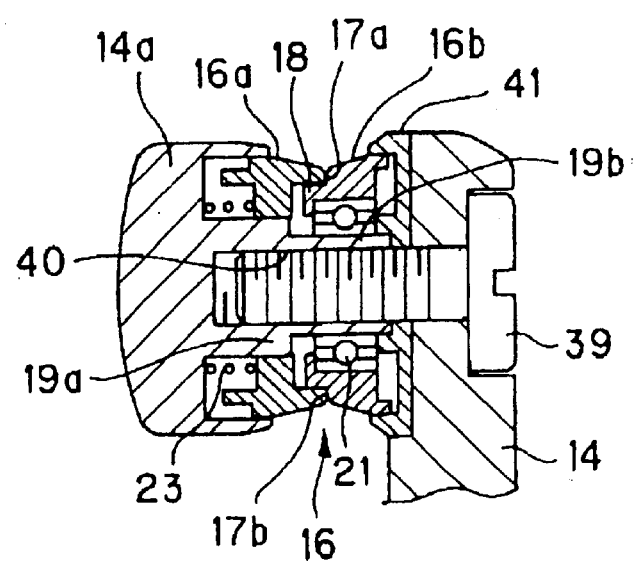
FIG. 47 is a cross-sectional view similar to that of FIG. 31 showing a tension roller and a tension roller support portion according to a twenty eighth embodiment of the present invention.

FIG. 47 shows a tension roller of a spinning reel according to a twenty eighth embodiment. The tension roller of the present embodiment differs from that of the twenty seventh embodiment shown in FIG. 46 in that the bearing 22 is eliminated from below the left tension roller 16a. The left tension roller 16a is attached slidably but unrotatably directly on the support shaft 19a. For this reason, great tension is applied to the fishing line 1 sandwiched between the fishing line contact faces 17a, 17b.

Next, while referring to FIGS. 48 to 50, a spinning reel according to a twenty ninth embodiment of the present invention will be described. According to this embodiment, the tip of the bail arm lever 14 is bent into an approximate U shape. The bent portion forms a tension roller support portion for rotatably supporting the tension roller 16.

Figure 48:
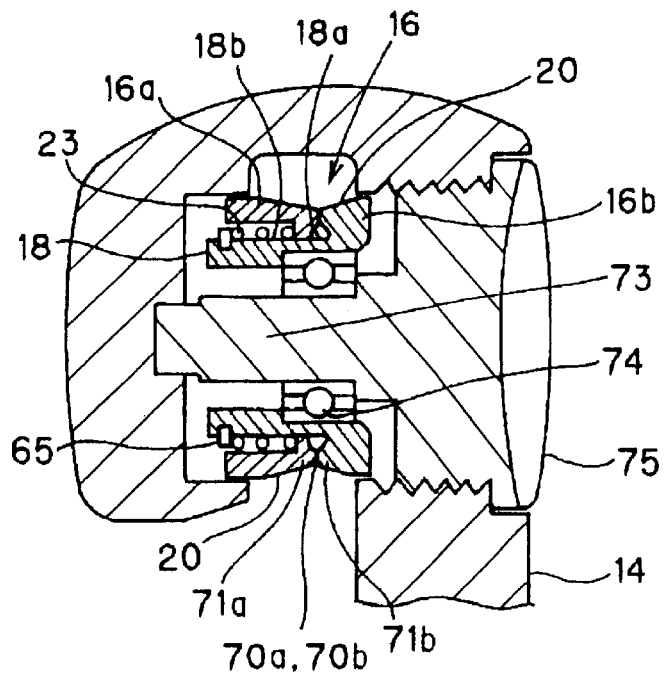
FIG. 48 is a cross-sectional view showing a tension roller and surrounding components according to a twenty ninth embodiment of the present invention, wherein the tension roller is in a fishing line releasing state.
Figure 49:
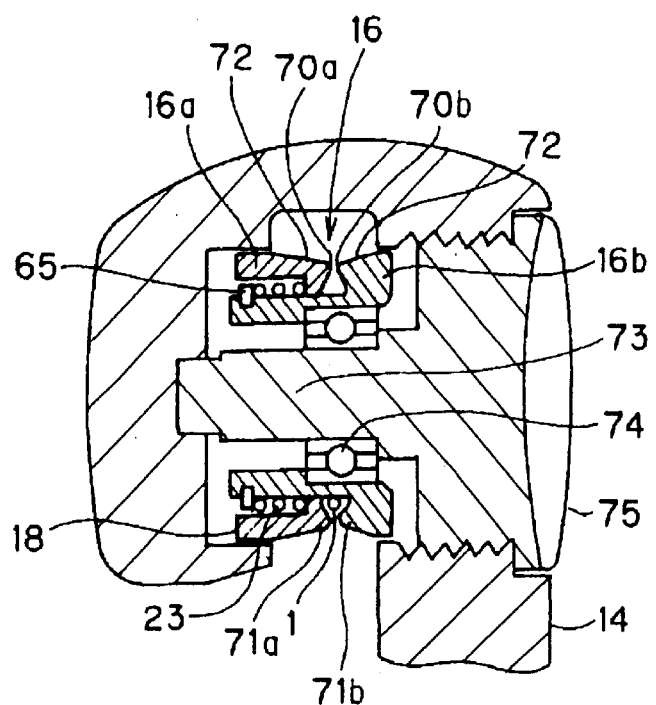
FIG. 49 is a cross-sectional view similar to that of FIG. 48 showing the tension roller in a fishing line rewinding state.
Figure 50:
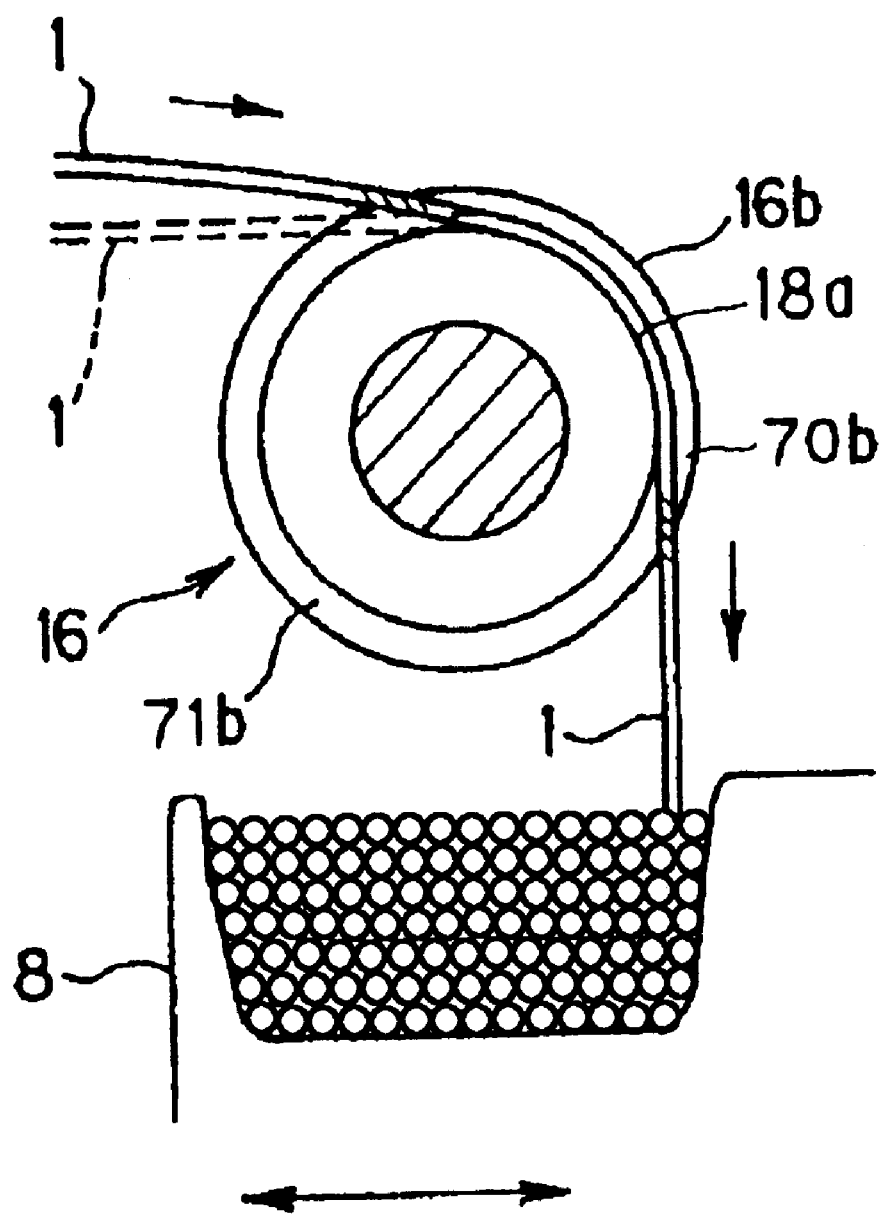
FIG. 50 is a cross-sectional view showing a tension roller according to the twenty ninth embodiment of the present invention.

As shown in FIGS. 48 and 49, the tension roller 16 is divided into left and right tension rollers 16a, 16b at the approximate center in its axial direction. A sleeve member 18 is formed integrally with the right tension roller 16b. The left tension roller 16a slidingly disposed over the sleeve member 18. The outer peripheral portion of the sleeve member 18 where the left and right tension rollers 16a, 16b confront each other, forms the outer peripheral surface 18a of the fishing line guide. Other outer peripheral portion along the sleeve member 18 form a slide guide surface for the left tension roller 16a.

The left and right tension rollers 16a, 16b includes mutually confronting cylindrical abutment portions 71a, 71b whose confronting ends 70a, 70b are in contactable with each other at only radially outer portions thereof. Each radially inner portion of each confronting end 70a, 70b of the cylindrical abutment portions 71a, 71b are separated from each other, so that an annular closed chamber can be provided by the confronting ends 70a, 70b and the outer peripheral surface 18a of the sleeve member 18. The fishing line can be entered into the annular closed chamber.

The cylindrical abutment portions 71a, 71b gradually narrow in diameter toward the confronting ends, i.e., fishing line contact faces 70a, 70b, so that tapering surfaces 72 are formed at the outer peripheral surfaces of each cylindrical abutment portion 71a, 71b. The entire tapering surfaces 72 form a recessed groove.

The left tension roller 16a is slidably disposed over the sleeve member 18, which is formed integrally with the right tension roller 16b. A stop ring 65 is fixed to the tip of the sleeve member 18. The resilient coil spring 23, which serves as urging means for urging the left tension roller 16a toward the right tension roller 16b, is mounted on the sleeve member 18, interposed between the stop ring 65 and the left tension roller 16a. With this configuration, the fishing line contact faces 70a, 70b of the cylindrical abutment portions 71a, 71b resiliently abut against each other so that the annular chamber is closed as shown in FIG. 48 when no tension is applied to the fishing line 1. On the other hand, when the fishing line 1 is being reeled in, otherwise tension is applied to the fishing line 1, the fishing line 1 pushes the fishing line contact faces 70a, 70b apart against urging force of the coil spring 23, and enters into the annular chamber as shown in FIG. 49. As indicated by hatching in FIG. 50, the fishing line 1 is sandwiched from both sides by the fishing line contact faces 70a, 70b where it enters and leaves the annular chamber. Once the fishing line 1 has entered the annular chamber however, it contacts the fishing line guide outer peripheral surface 18a.

The right tension roller 16b is rotatably supported on a support shaft 73 by a bearing 74. One end of the support shaft 73 is formed integrally with a screw member 75, which is screwingly engaged in the tension roller support portion of the bail arm lever 14. The other end of the support shaft 73 is fitted in a hole formed in the tension roller support portion. With this configuration, the support shaft 73 is supported at both ends by the tension roller support portion. The bearing 74 could be a slide bearing instead of a roller type bearing.

When the fishing line 1 is being reeled in, the left tension roller 16a slides smoothly in its axial direction, without any play, over the sleeve member 18 against the urging force of the coil spring 23. The fishing line 1 forces the fishing line contact faces 70a, 70b to separate from each other, and the fishing line 1 enters into the annular chamber. The fishing line 1 is sandwiched between the fishing line contact faces 70a, 70b where the fishing line 1 enters and leaves the annular chamber (FIG. 50). As a result, a high tension is applied to the fishing line 1 between the tension roller 16 and the spool 8 so that the fishing line 1 is tightly wound around the fishing line winding portion of the spool 8.

Figure 51:
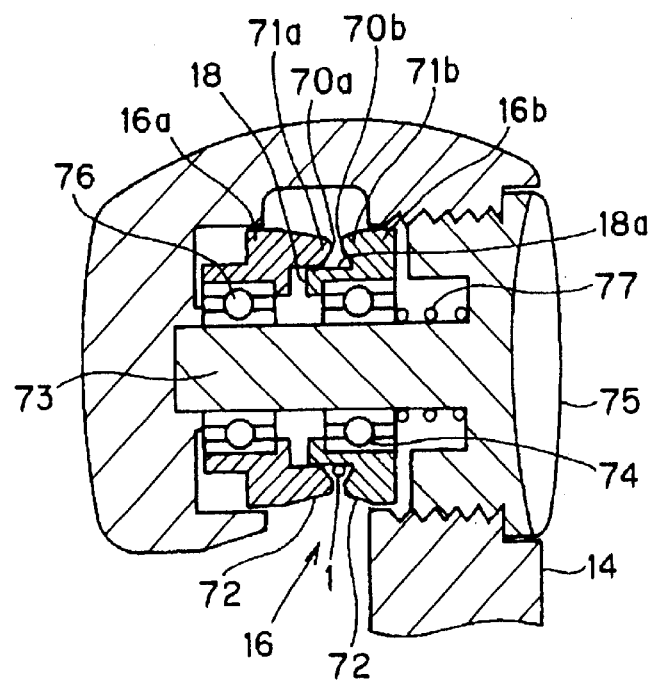
FIG. 51 is a cross-sectional view similar to that of FIG. 48 showing a tension roller according to a thirtieth embodiment of the present invention in a fishing line releasing state.
Figure 52:
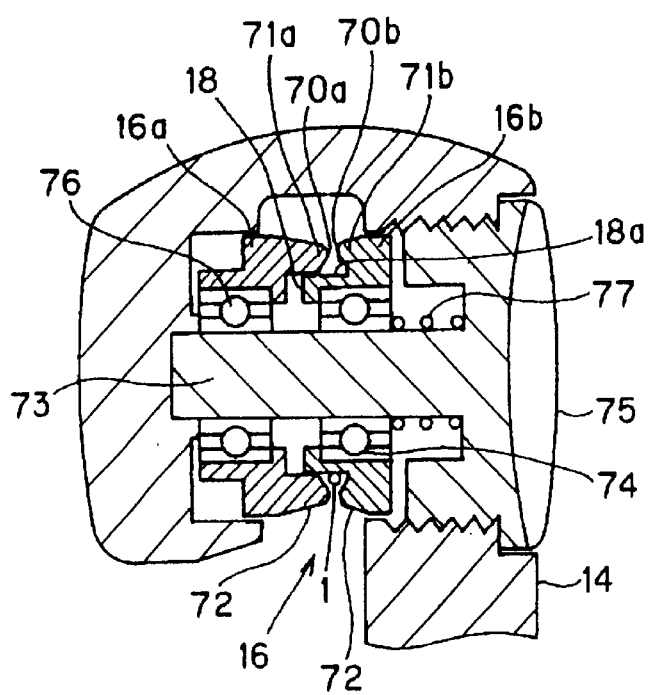
FIG. 52 is a cross-sectional view similar to that of FIG. 51, in a fishing line rewinding state.

FIGS. 51 and 52 show a tension roller of a spinning reel according to a thirtieth embodiment of the present invention. In a manner similar to the twenty ninth embodiment, according to the thirtieth embodiment, the left and right tension rollers 16a, 16b are supported on the single support shaft 73, which is integrally formed with the screw member 75. However, in contrast to the twenty ninth embodiment, according to the thirtieth embodiment, both of the left and right tension rollers 16a, 16b are slidably supported on the support shaft 73 through bearings 74, 76. A coil spring 77, which serves as an urging means, is mounted on the base end of the support shaft 73. The coil spring 77 presses the left and right tension rollers 16a, 16b toward the inner wall surface of the tension roller support body. The sleeve member 18 is formed from a protrusion of the right tension roller 16b, and is capable of sliding under the cylindrical abutment portion 71a of the left tension roller 16a. An annular chamber is formed by the fishing line contact faces 71a, 71b and an outer peripheral surface 18a of the sleeve member 18. The fishing line 1 can enter into the cylindrical annular chamber by pressing apart the left and right tension rollers 16a, 16b.

Figure 53:
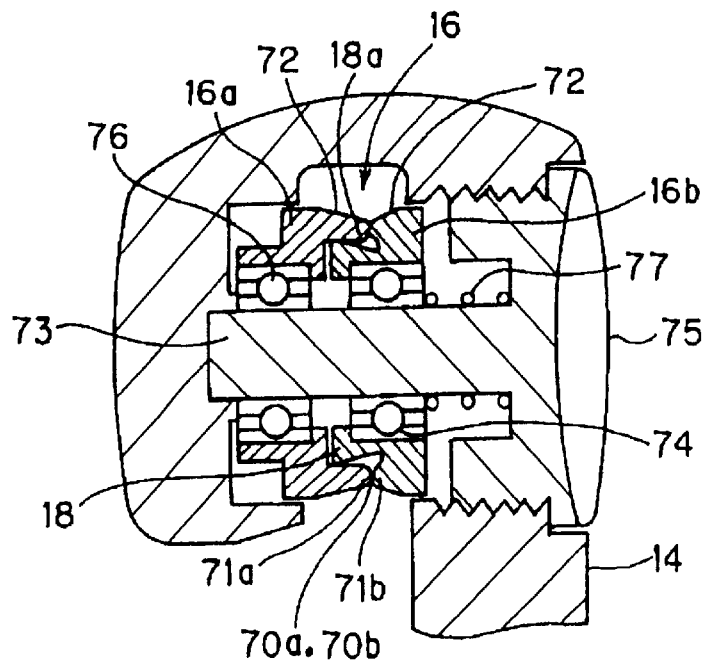
FIG. 53 is a cross-sectional view similar to that of FIG. 48 showing a tension roller according to a thirty first embodiment of the present invention in a fishing line releasing state.
Figure 54:
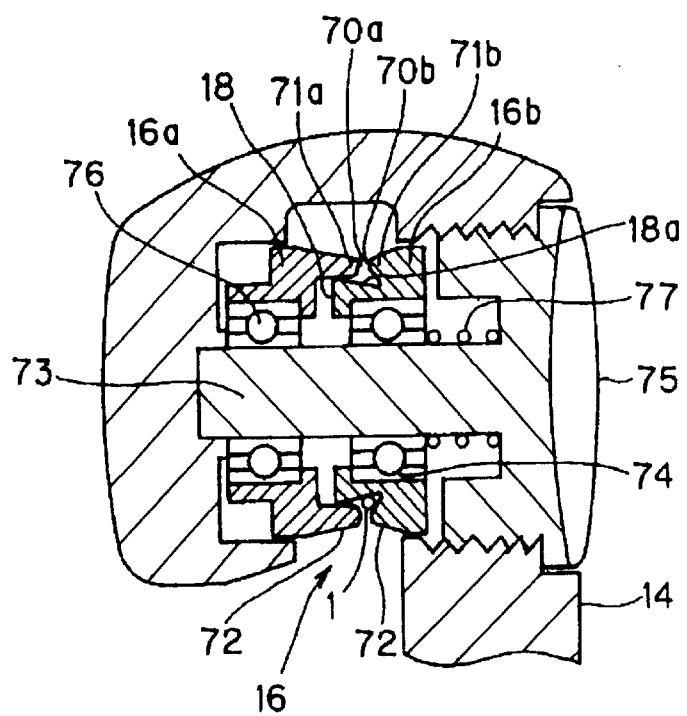
FIG. 54 is a cross-sectional view similar to that of FIG. 53, showing a fishing line rewinding state.

FIGS. 53 and 54 show a tension roller for a spinning reel according to a thirty first embodiment of the present invention. In contrast to the thirtieth embodiment, according to the thirty first embodiment, the fishing line guide outer peripheral surface 18a is formed with a slant from its free end to its base end because the diameter of the sleeve member 18 gradually gets smaller in this direction. That is to say, the diameter of the sleeve member 18 measured from its outer peripheral surface gradually reduces from the free tip of the sleeve member 18 in the direction from the cylindrical abutment portion 71a toward the cylindrical abutment portion 71b. As a result, a groove is formed on the fishing line guide outer peripheral surface 18a, at a position in between the cylindrical abutment portions 71a, 71b. With this configuration, the space between the cylindrical abutment portions 71a, 71b and the sleeve member 18 can be quite large in the radial direction of the cylindrical abutment portions 71a, 71b.

Figure 55:
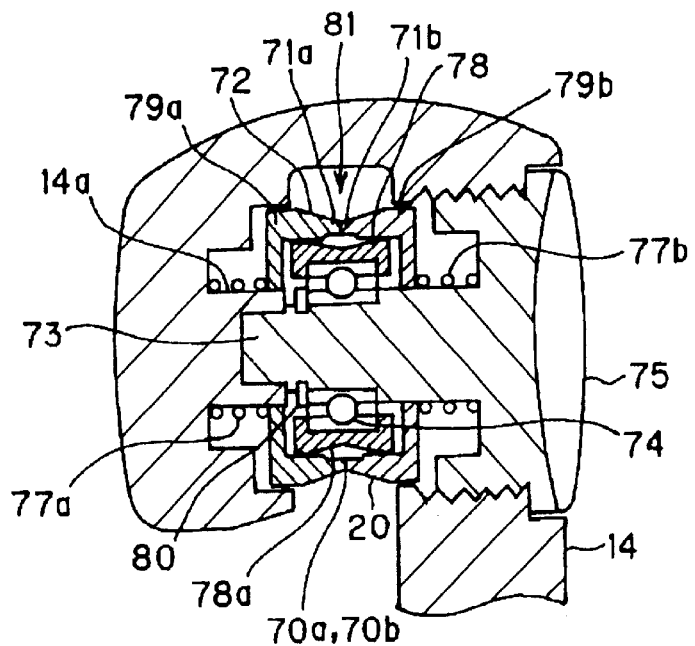
FIG. 55 is a cross-sectional view similar to that of FIG. 48, showing a tension roller according to a thirty second embodiment of the present invention in a fishing line releasing state.
Figure 56:
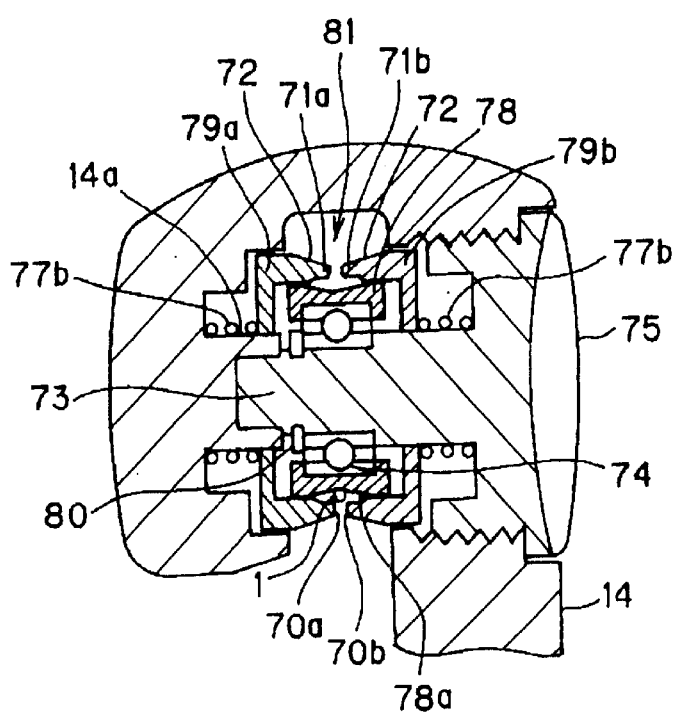
FIG. 56 is a cross-sectional view similar to that of FIG. 55, showing a fishing line rewinding state.

FIGS. 55 and 56 show a tension roller for a spinning reel according to a thirty second embodiment. The tension roller according the thirty second embodiment includes a roller portion 78 and two collar portions 79a, 79b, which enclose the roller portion 78. The roller portion 78 is referred to as an inner roller in claim 20.

The roller portion 78 is formed in a substantial cylindrical shape. The roller portion 78 is formed with a fishing line guide outer peripheral surface 78a that has an indentation at its center to facilitate guiding of the fishing line 1. The roller portion 78 is rotatably supported on the support shaft 73 by a bearing 74. The support shaft 73 is provided at the tip of the screw member 75, which is screwingly engaged in the tension roller support portion of the bail arm lever 14. A protruding portion 14a having a hollow tip, protrudes from an inner surface of the tension roller support portion 14. The tip of the support shaft 73 is fitted in the hollow tip of the protruding portion 14a. In this manner, the support shaft 73 is supported at both ends on the tension roller support portion 14. The bearing 74 is fixed in place by a stop ring 80 so as not slide along the support shaft 73. As a result, the roller portion 78 is rotatably disposed at a predetermined position on the support shaft 73.

The collar portions 79a, 79b have a short tube shape, wherein one end of the tube is open and another end is closed. A hole is opened in the closed end of the tube. The protruding portion 14a and the support shaft 73 pass through the hole in the closed end of the collar portion 79a, and the support shaft passes through the hole in the closed end of the collar portion 79b. The collar portions 79a, 79b are slidable in their axial direction over the protruding portion 14a and the support shaft 73. The collar portions 79a, 79b are also rotatable on the protruding portion 14a and the support shaft 73. The tubular shapes of the collar portions 79a, 79b encase the roller portion 78 from left and right sides. Open ends of the tubular collar portions 79a, 79b face each other and abut each other, at cylindrical abutment portions 71a, 71b, just radially outside the fishing line guide outer peripheral surface 78a of the roller portion 78. The annular chamber for accommodating the fishing line 1 is formed between the pair of the cylindrical abutment portions 71a, 71b and the fishing line guide outer peripheral surface 78a. Also, resilient coil springs 77a, 77b, which serve as urging means, are mounted between the closed end of the collar portions 79a, 79b and the tension roller support portion. As shown in FIG. 55, urging force of the resilient coil springs 77a, 77b brings the fishing line contact faces 70a, 70b of the cylindrical abutment portions 71a, 71b into contact with each other so that the annular chamber is closed when the fishing line 1 is not being reeled in. On the other hand, when the fishing line 1 is being reeled in, the fishing line 1 presses apart the fishing line contact faces 70a, 70b against the urging force of the resilient coil springs 77a, 77b, so that the fishing line 1 opens and enters the annular chamber as shown in FIG. 56. As indicated by the hatching in FIG. 50, the fishing line 1 is sandwiched from both sides by the fishing line contact faces 70a, 70b at positions where the fishing line 1 enters and exits the annular chamber. At positions where the fishing line 1 is inside the annular chamber, the fishing line 1 contacts the fishing line guide outer peripheral surface 78a. The outer peripheral surfaces of the cylindrical abutment portions 71a, 71b are each formed with a tapering surface 72, because the diameters of the cylindrical abutment portions 71a, 71b get gradually smaller in a direction toward the fishing line contact faces 70a, 70b. The tapering surfaces 72 form an annular groove between the cylindrical abutment portions 71a, 71b. With this configuration, the fishing line 1 is more easily guided into the annular chamber.

Figure 57:
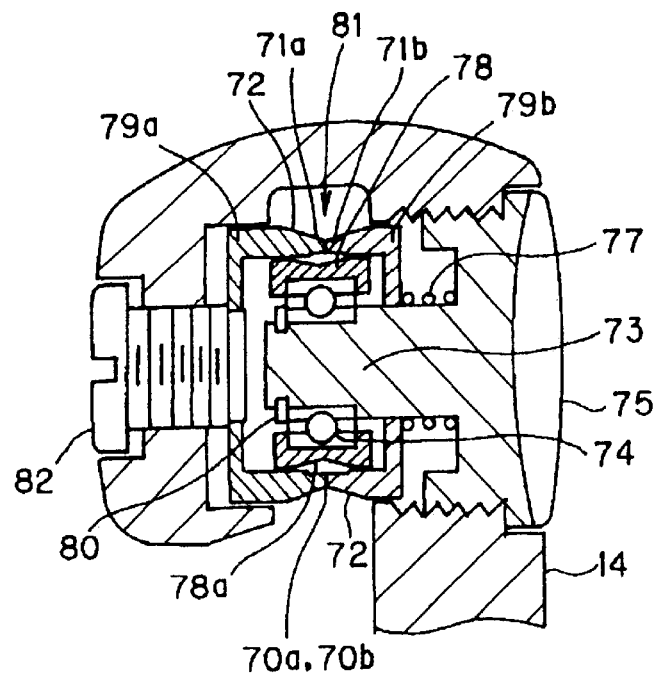
FIG. 57 is a cross-sectional view similar to that of FIG. 48 showing a tension roller according to a thirty third embodiment of the present invention, in a fishing line releasing state.
Figure 58:
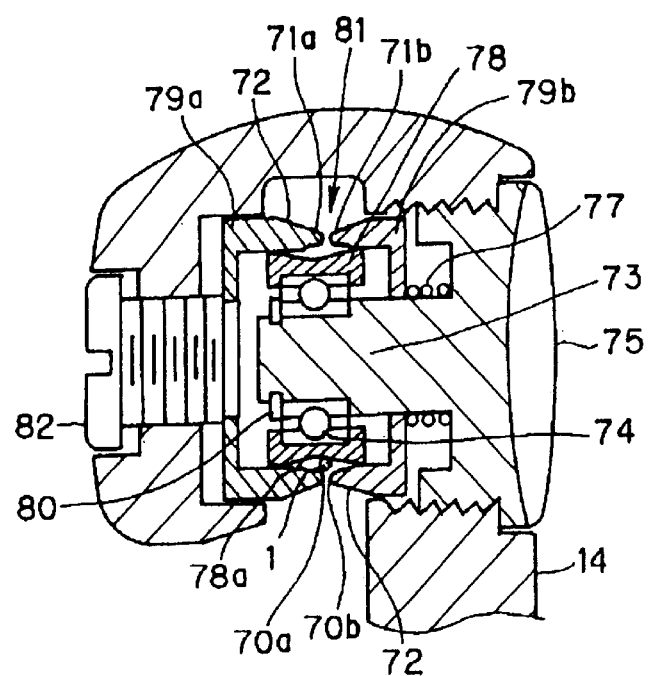
FIG. 58 is a cross-sectional view similar to that of FIG. 57 wherein the left hand tension roller is adjusted to the right in a fishing line rewinding state.
Figure 59:
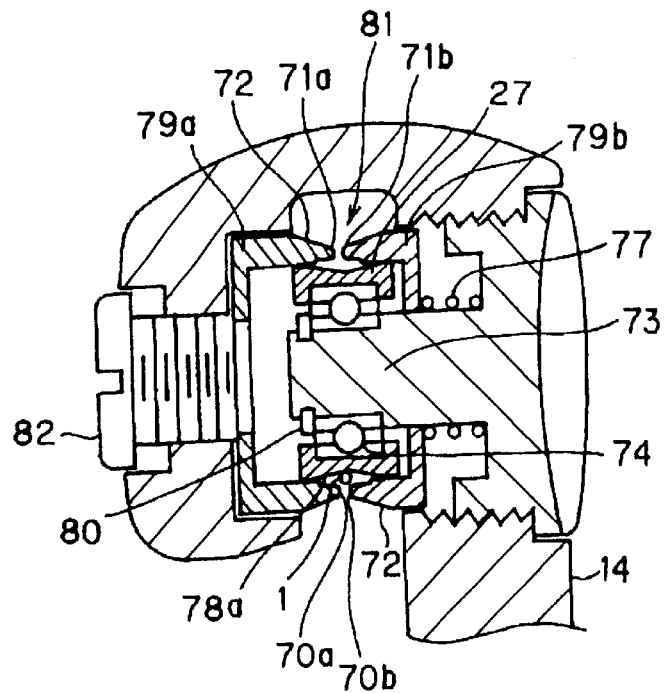
FIG. 59 is a cross-sectional view similar to that of FIG. 57 wherein the left hand tension roller is adjusted to the left in a fishing line rewinding state.

FIGS. 57 through 59 show a tension roller for a spinning reel according to a thirty third embodiment of the present invention. In contrast to the thirty second embodiment, according to the thirty third embodiment, urging force of the coil spring 77, which serves as urging means, can be adjusted. As shown in FIG. 57, an adjustment screw 82 is provided instead of the protruding portion 14a of the tension roller support portion. The adjustment screw 82 is screwingly engaged in a female screw hole formed in the tension roller support portion 14. The collar portion 79a is either rotatably or unrotatably supported on the tip of the adjustment screw 82. By screwing the adjustment screw 82 into and out of the female screw hole, the deformation amount of the coil spring 77 can be changed. Therefore, the abutment pressure applied to the fishing line contact faces 70a, 70b can be adjusted. Also, as shown in FIGS. 58 and 59, by rotating the adjustment screw 82, the position where the fishing line contact faces 70a, 70b abut each other can be changed in the axial direction of the tension roller, to find the position that produces the least fishing line twist in accordance with a certain tension applied to the fishing line 1, a certain fishing line made from a particular material or a particular thickness. FIG. 58 shows the position where the fishing line contact faces 70a, 70b abut each other is deviated to the right side of the slanting surface of the annular groove formed on the roller portion 78. FIG. 59 shows the abutment position adjusted leftward, to a position above the left side slanting surface of the annular groove.

Figure 62:
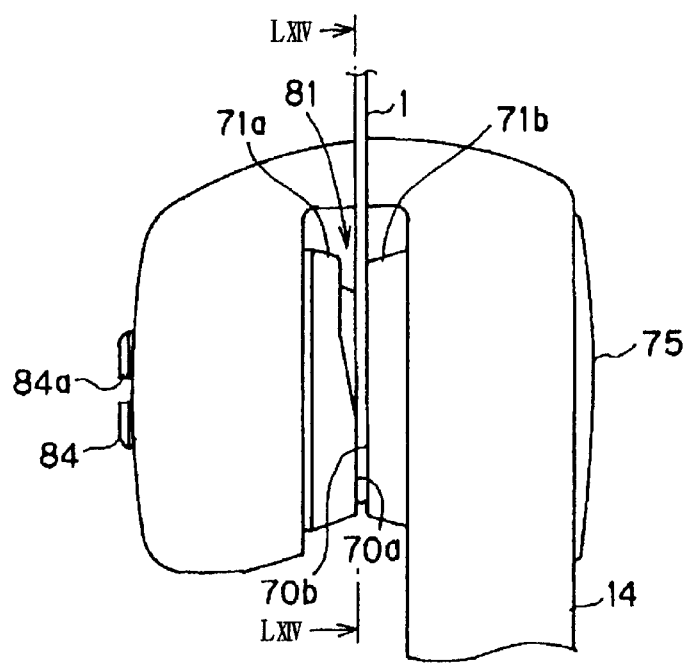
FIG. 62 is a plan view showing a tension roller according to the thirty fourth embodiment of the present invention in a fishing line rewinding state.
Figure 63:
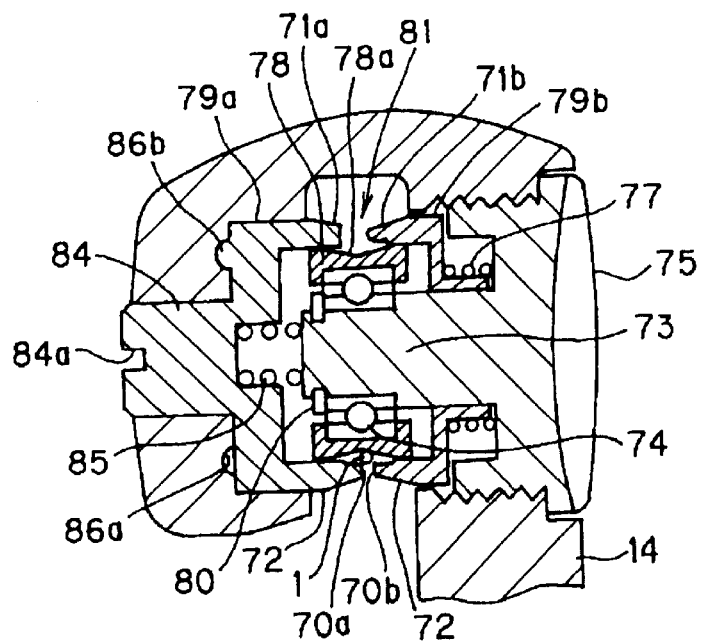
FIG. 63 is a cross-sectional view showing components of FIG. 62 in a fishing line rewinding state.
Figure 64:
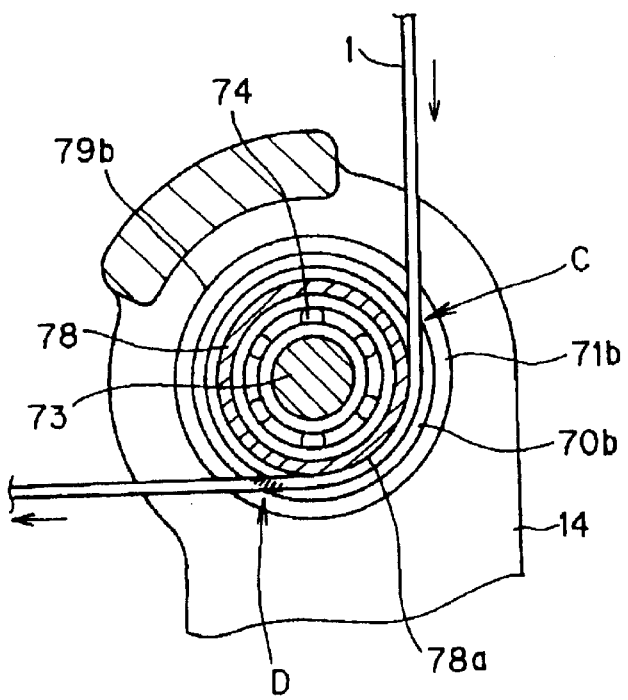
FIG. 64 is a cross-sectional view taken along a line LXIV—LXIV of FIG. 62.

FIGS. 60 to 64 show a tension roller for a spinning reel according to a thirty fourth embodiment of the present invention. In contrast to the twenty ninth through thirty third embodiments, wherein the fishing line 1 is sandwiched at two positions as indicated by the hatchings in FIG. 50, according to the thirty fourth embodiment, the fishing line 1 is sandwiched at only a single position as shown in FIG. 64 (position D).

Figure 60:
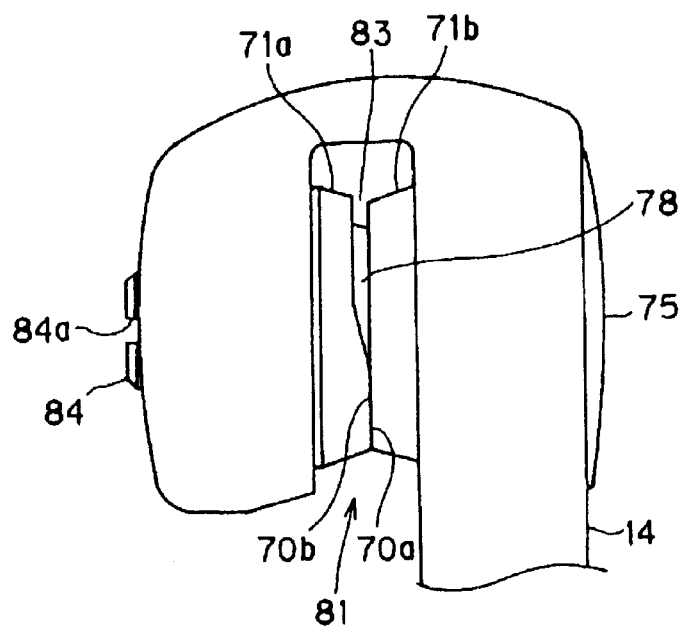
FIG. 60 is a plan view showing a tension roller according to a thirty fourth embodiment of the present invention in a fishing line releasing state.
Figure 61:
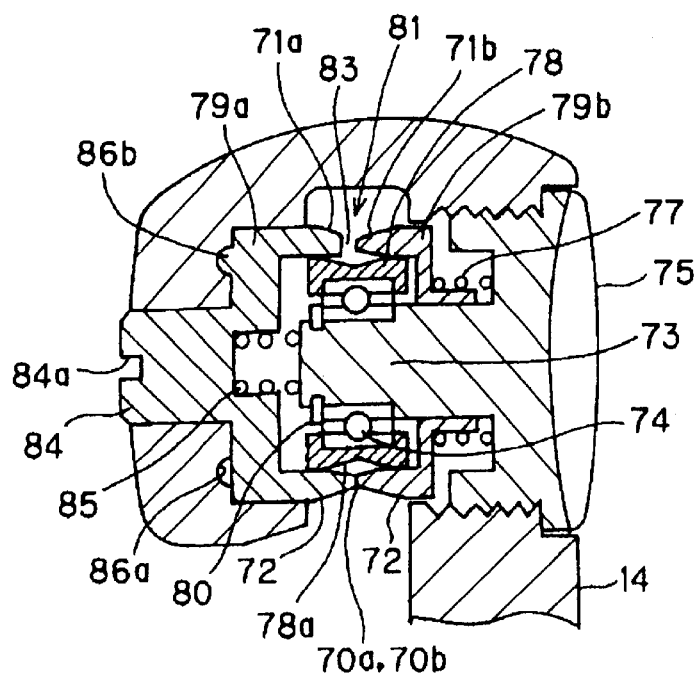
FIG. 61 is a cross-sectional view showing the tension roller of FIG. 60 in the fishing line releasing state.

As best seen in FIGS. 60 and 62, according to the thirty fourth embodiment, the cylindrical abutment portion 71a of the collar portion 79a is formed with a thick portion and a thin portion connected by a slanting surface. On the other hand, the cylindrical abutment portion 71b of the collar portion 79b is formed in a uniform thickness around its entire periphery. As shown in FIGS. 60 and 61, in the fishing line releasing state, the fishing line contact faces 70a, 70b of the cylindrical abutment portions 71a, 71b close together at the thick portion of the cylindrical abutment portion 71a and a gap 83 is generated at the thin portion of the cylindrical abutment portion 71a. Accordingly, when the fishing line 1 is being wound up, even with only a small tension being placed on the fishing line 1, the fishing line 1 will enter between the fishing line contact faces 70a, 70b from the gap 83, that is, adjacent to the thin portion of the cylindrical abutment portion 71a, into the closed area, that is adjacent to the thick portion of the cylindrical abutment portion 71a. As a result, as shown in FIGS. 62 through 64, the fishing line 1 will be sandwiched between the collar portions 79a, 79b. As indicated by the hatching in FIG. 64, the fishing line 1 will be sandwiched between the fishing line contact faces 70a, 70b at the location of the thick portion of the cylindrical abutment portion 71a, and so will be pulled taught when wound up around the spool 8 as shown in FIGS. 2 and 3.

The collar portion 79a is fixed in place on the tension roller support portion of the bail arm lever 14 so as not to rotate even when contacted by the moving fishing line 1. The collar portion 79b can be attached to the tension roller support portion so as to either rotate or not to rotate when contacted by the fishing line 1.

The collar portion 79a is formed integrally with a support shaft 84. The support shaft 84 of the collar portion 79a is fitted into and through a hole formed in the tension roller support portion. An engagement groove 84a is formed in the tip of the support shaft 84 that protrudes outside of the tension roller support portion. The engagement groove 84a is for receiving a tool, such as a screw driver, to rotate the collar portion 79a in the tension roller support portion. A resilient spring 85 is mounted between the tip of the support shaft 73 and the support shaft 84. A protrusion 86b is formed in the collar portion 79a. Also, a plurality of complementary indentations 86a are formed in the tension roller support portion at positions in confrontation with the orbit of the protrusion 86b when the collar portion 79a is rotated. The indentations 86a and the protrusion 86b serve as a click stop mechanism used to maintain the collar portion 79a in a desired angular orientation when rotating the tension roller support portion and the collar portion 79a.

The collar portion 79b is supported on the support shaft 73. A coil spring 77 which serves as urging means is mounted on the support shaft 73 and constantly urges the collar portion 79b toward the collar portion 79a. With this configuration, the collar portions 79a, 79b constantly attempt to engage so that the fishing line contact faces 70a, 70b abut against each other.

The position where the collar portions 79a, 79b sandwich the fishing line 1 can be adjusted by inserting a tool (not shown) into the engagement groove 84a of the support shaft 84 and rotating the support shaft 84 to a desired angle with respect to the tension roller support portion. By adjusting the sandwiching position, the position where the fishing line 1 is sandwiched can be set to various positions indicated in FIG. 64 by arrows C, D, or both C and D. Alternatively, the thick portion of the collar portion 79a can be offset from the fishing line winding portion so that the fishing line 1 is not sandwiched at all. With this configuration, the sandwiching position can be adjusted in accordance with the tension applied to the fishing line 1, the diameter of the spool 8, or the material or thickness of the fishing line 1. Furthermore, by adjusting the fixed rotational position, the positions C and D can also be adjusted. Thus, optimum holding or interposing force can be applied to the fishing line to control tension applied to the fishing line wound over the spool.

According to the twentieth through thirty-fourth embodiments shown in FIGS. 3(a) through 64, the tension roller is divided into left and right tension rollers. Both left and right tension rollers are supported about the same axis. The left and right tension rollers engage so that their contact faces overlap. Also, an urging means is provided for resiliently urging the fishing line contact faces to move toward each other. With this configuration, the left and right tension rollers smoothly slide along the same axis without tilting. Therefore, even if only a small tension is applied to a fishing line as it travels from the fishing rod to the tension roller, the fishing line will be reliably sandwiched between the fishing line contact faces. Accordingly, the fishing line can be properly wound around the spool at a uniform thickness while applied with proper tension force. Backlash can be prevented. The fishing line can also be prevented from tangling on the spool so that casting distance can be increased.

Further, the pair of cylindrical abutment portions are provided for guiding the fishing line to the outer surface of a fishing line guide of the tension roller, and also for abutting the fishing line from both sides. At least one of the cylindrical abutment portions is provided slidable in the axial direction of the support shaft of the tension roller so as to be abuttable against the other cylindrical abutment portion. An urging means is provided for urging at least one of the cylindrical abutment portions in a direction for abutting against the other cylindrical abutment portion. With this configuration, the fishing line can be separated from the tension roller when feeding out the fishing line, and can be caught on the tension roller when winding up the fishing line, both by merely switching the bail arm back and forth in the manner of a normal spinning reel.

Also, according to the several embodiments, cylindrical abutment portions abut the fishing line from either side at two positions, that is, when its enters toward the tension roller and exits away from the tension roller. As a result, the fishing line will not snap even when applied with a large load. The cylindrical abutment portions prevents the fishing line from separating from the tension roller, even when the tension roller is rotated in a direction for feeding out the fishing line, for example, when a fish pulls on the fishing line. The fishing line will be properly wound on the spool without any danger of back lash even when a small tension is applied on the fishing line.

Figure 65:
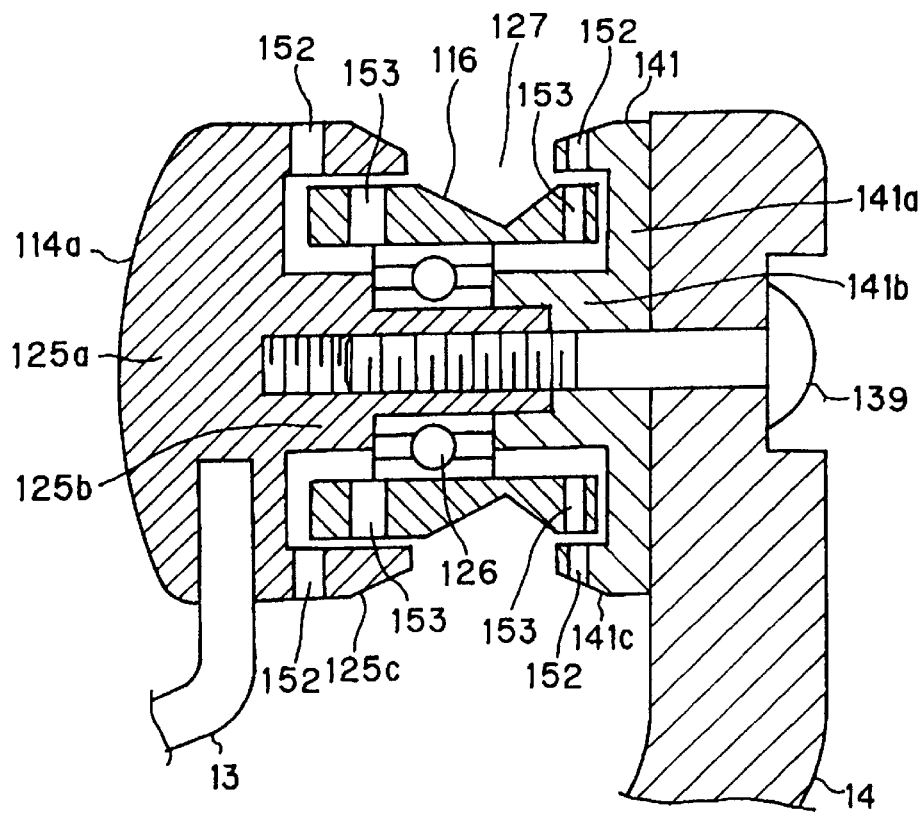
FIG. 65 is a cross-sectional view showing a tension roller according to the thirty fifth embodiment of the present invention.

Next, while referring to FIG. 65, a tension roller of a spinning reel according to a thirty fifth embodiment will be described. As shown in FIG. 65, a bail arm lever 14, which serves as a bail arm support member, is formed integrally with a collar 141 at its tip and with a fishing line slide portion 114a. The bail arm lever 14 supports the bail arm 13 through the fishing line slide portion 114a.

The collar 141 includes a disk portion 141a, a support shaft 141b, and a rim portion 141c. The disk portion 141a is in sealing contact with the side of the tip of the bail arm lever 114. The support shaft 141b protrudes from the disk portion 141a toward the fishing line slide portion 114a. The rim portion 141c protrudes from the outer periphery of the disk portion 141a toward the fishing line slide portion 114a The fishing line slide portion 114a includes a disk portion 125a, a support shaft 125b, and a rim portion 125c. The disk portion 125a confronts the disk portion 141a of the collar 141. The support shaft 125b is fitted into the support shaft 141b of the collar 141. The rim portion 125c confronts the rim portion 141c of the collar 141. The collar 141 and the fishing line slide portion 114a are integrally connected to the bail arm lever 14 by a connecting bolt 139 that passes from the bail arm lever 14 through a screw hole formed through both of the support shafts 141b, 125b.

The surfaces of the support shafts 141b, 125b and of the rim portions 141c, 125c define an open annular chamber, opened at a cylindrical opening portion 127 formed between the rim portions 141c, 125c. An annular roller 116 is housed in the annular chamber, exposed externally from the bail arm lever 114 through the cylindrical opening portion 127. The annular roller 116 is freely rotatably supported on the support shaft 125b through a ball bearing 126. An annular groove into which the fishing line 1 is guided is formed in the center portion of the annular shaped roller 116, which is exposed from the cylindrical opening portion 127.

Water drain holes 152 are formed on the rim portions 141c, 125c. The water drain holes 152 are for bringing the annular chamber, in which the tension roller 116 is housed, into communication with the atmosphere. It is desirable to form the water drain holes 152 at positions and with orientation that facilitate discharge of water out of the chamber by the centrifugal force generated by the rotor. Other water drain holes 153 can be formed at portions corresponding to the water drain holes 152 in the line roller 116 at positions to interpose the annular groove in the tension roller 116 therebetween. The water drain holes 152 can instead be disposed on the bail arm lever 114 or some other component other than the rim portions 141c, 125c.

Any fresh water or sea water that enters into the chamber of the annular shape roller 116 is discharged through the water drain holes 152. Components in the tension roller support portion, such as the support shafts 141b, 125b and the ball bearings 126 can be prevented from rusting and also salt crystals can be prevented from clinging to these components. As a result, smooth rotation of the tension roller 116 can be maintained. Water introduced through the cylindrical opening portion 127, for example, when the fishing line 1 is being reeled in, and accumulated in the chamber of the bail arm lever 14 can be discharged out through the water drain holes 152 efficiently by centrifugal force generated by rotation of the rotor.

While the invention has been described in detail with reference to specific embodiments thereof, it would be apparent to those skilled in the art that various changes and modifications may be made therein without departing from the spirit of the invention, the scope of which is defined by the attached claims.

For example, in the seventeenth embodiment shown in FIGS. 23(a) through 25, the left and right tension rollers 16a, 16b are disposed so that their axes intersect each other at an intersectional angle θ. However, the support shafts 19a, 19b can be aligned on the same axial line so that the intersectional angle θ is zero. In this case, the fishing line contact faces 17a, 17b of the left and right tension rollers 16a, 16b confront each other.

Figure 66:
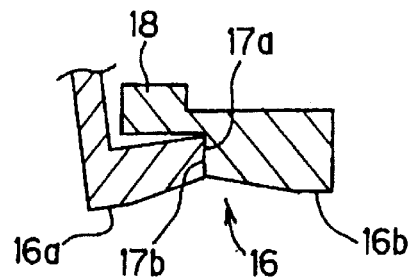
Figure 66:
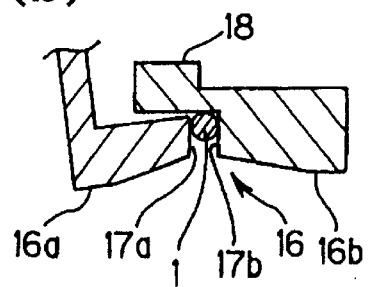

The fishing line contact faces 17a, 17b of the tension roller 16 according to the first through nineteenth embodiments shown in FIGS. 1 to 29 can be modified in a variety of ways. For example, in a first modification shown in FIGS. 66(a) and 66(b), the fishing line contact faces 17a, 17b are formed so as to contact on a plane at the base end side of the fishing rod as shown in FIG. 66(a). For this reason, the fishing line 1 can easily be sandwiched between the fishing line contact faces 17a, 17b as shown in FIG. 66(b) and tension can be easily applied to the fishing line 1.

Figure 67:
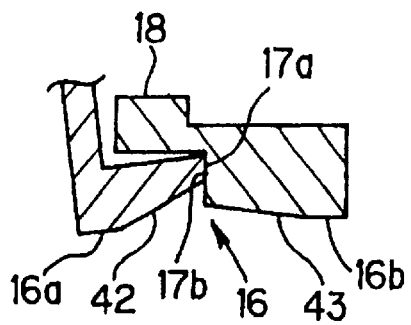
Figure 67:
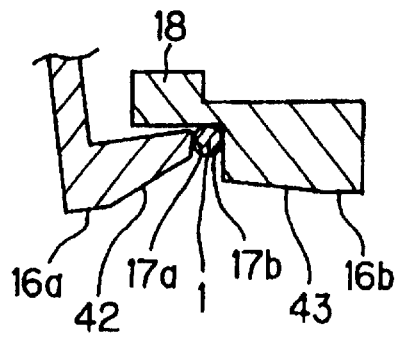

According to a second modification shown in FIGS. 67(a) and 67(b), in a manner similar to the first modification, the fishing line contact faces 17a, 17b are in plane contact with each other at a position nearest the base of the fishing rod. However, in this modification, the taper surface 42 of the left tension roller 16a is formed with a slant in a direction from the base of the left tension roller 16a toward the fishing line contact face 17a, that has a greater angle than a taper surface 43 of the right tension roller 16b. As shown in FIG. 67(b), the fishing line 1 is sandwiched with a smaller surface area in comparison with the case shown in FIG. 66(b), but the fishing line 1 is more easily guided into the fishing line guide groove because of the greater inclination of the taper surface 42.

Figure 68:
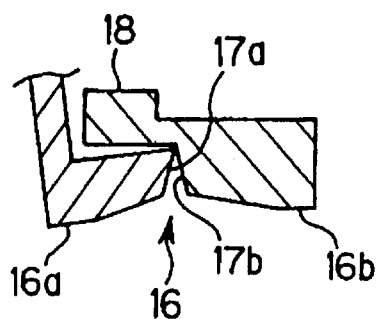
Figure 68:
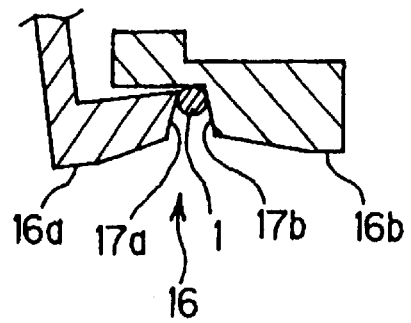

A third modification is shown in FIGS. 68(a), 68(b). As shown in FIG. 68(a), the fishing line contact faces 17a, 17b slant to form a V-shaped gap therebetween at a position nearest the base of the fishing rod. As shown in FIG. 68(b), the fishing line 1 is sandwiched between the fishing line contact faces 17a, 17b at the deepest portion of the fishing line guide groove formed between the fishing line contact faces 17a, 17b.

Figure 69:
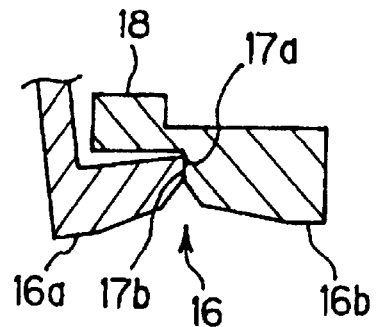
Figure 69:
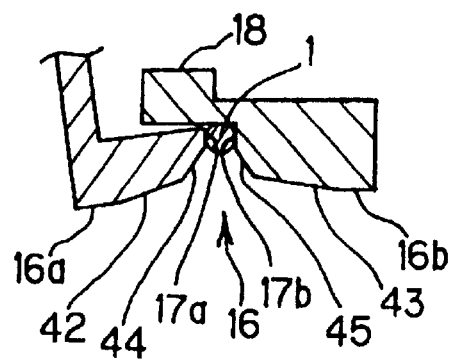

A fourth modification is shown in FIGS. 69(a), 69(b). This modification provides structure similar to the first and second modifications. Further, the left and right tension rollers 16a, 16b of the fourth modification have further taper surfaces 44, 44, which different slanting angles between the taper surfaces 42, 43 and the fishing line contact faces 17a, 17b. As shown in FIG. 69(b), the fishing line 1 more easily enters between the fishing line contact faces 17a, 17b.

Figure 70:
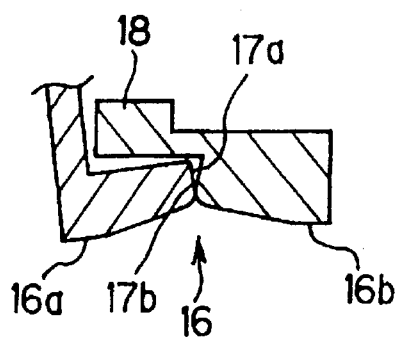
Figure 70:
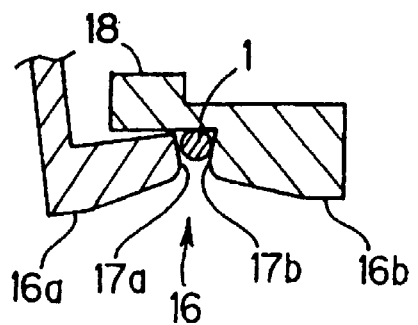

A fifth modification is shown in FIGS. 70(a), 70(b). According to the fifth modification, the fishing line contact faces 17a, 17b of the tension roller 16 form a V shaped gap, that, as shown in FIG. 70(a), is inverted compared to the V-shaped gap of the third modification shown in FIG. 68(a)

and 68(b). As shown in FIG. 70(b), the fishing line 1 is sandwiched between the fishing line contact faces 17a, 17b at the deepest portion of the fishing line guide groove, which has the greatest distance between the contact faces. With this configuration, a high tension force is applied to the fishing line 1.

Figure 71:
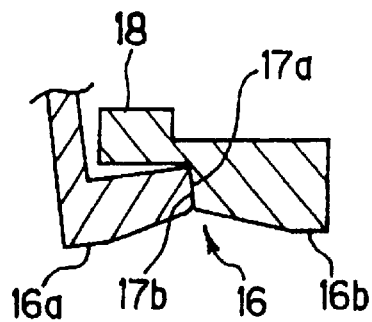
Figure 71:
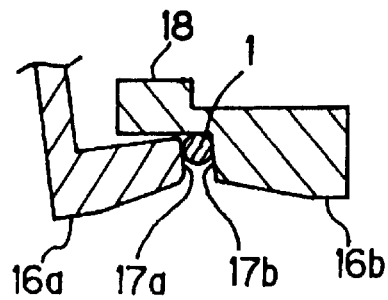

A sixth modification is shown in FIGS. 71(a) and 71(b). In contrast to the tension roller 16 of the first modification shown in FIGS. 66(a) and 66(b), according to the sixth modification, the contact plane where the fishing line contact faces 17a, 17b contact each other has a slight slant with respect to the direction from the tip to the base of the fishing rod. That is, the fishing line contact faces 17a, 17b are formed to contact on a plane that slants slightly with respect to the direction from the tip to the base of the fishing rod.

Figure 72:
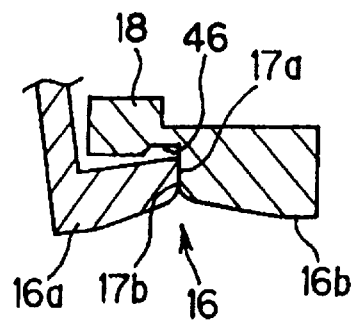
Figure 72:
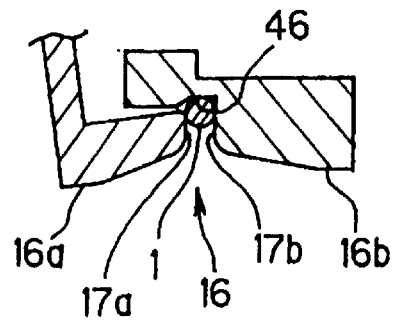

A seventh modification is shown in FIGS. 72(a) and 72(b). As shown in FIG. 72(a), a groove 46 is formed in the surface of the sleeve member 18 that contacts the fishing line contact face 17b. The groove 46 can be formed annularly around the entire sleeve member 18 or locally on only certain portions of the sleeve member 18. As shown in FIG. 72(b), the fishing line 1 enters into the groove 46 simultaneously with being sandwiched between the fishing line contact faces 17a, 17b.

Figure 73:
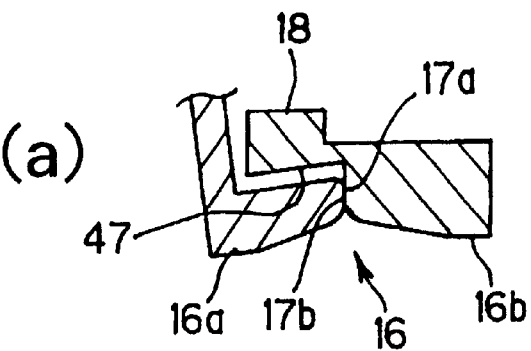
Figure 73:
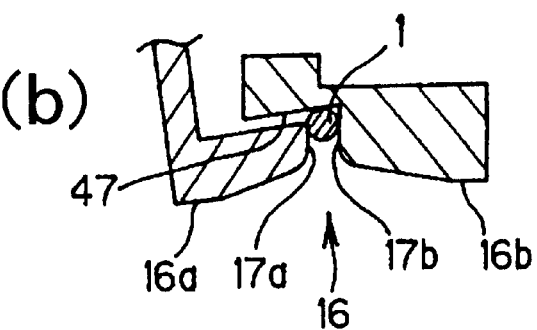

An eighth modification is shown in FIGS. 73(a) and 73(b). The sleeve member 18 provided on the right tension roller 16b is formed with a taper surface 47, in order to open a gap of fixed distance between the outer periphery of the sleeve member 18 and the inner peripheral surface of the left tension roller 16a.

Figure 74:
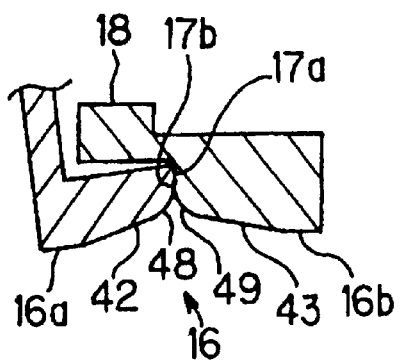
Figure 74:
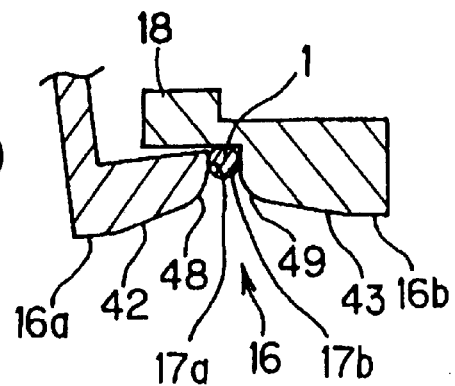

A ninth modification is shown in FIGS. 74(a) and 74(b). According to the ninth modification, the left and right tension rollers 16a, 16b are formed with curved surfaces 48, 49 from the taper surfaces 42, 43 to the fishing line contact faces 17a, 17b. With this configuration, the fishing line 1 can smoothly follow the curved surfaces 48, 49 and slide into the fishing line guide groove between the fishing line contact faces 17a, 17b.

Next, modifications of the tension roller described in twentieth through thirty fourth embodiments shown in FIGS. 30 through 64 will be described.

In a first modification shown in FIG. 75(a), the fishing line contact faces 17a, 17b of the tension roller 16 are formed to contact at a larger surface area than in the twentieth to thirty fourth embodiments. As a result, as shown in FIG. 75(b), the fishing line 1 enters deeper into the fishing line introduction groove so that a fishing line of greater diameter is available.

In a second modification shown in FIGS. 76(a) and 76(b), the fishing line contact faces 17a, 17b are formed to generate a V-shaped gap therebetween as shown in FIGS. 76(a). With this configuration, as shown in FIG. 76(b), the fishing line 1 can more easily enter between the fishing line contact faces 17a, 17b. The fishing line 1 sandwiched between the fishing line contact faces 17a, 17b is at deepest portion of the fishing line guide groove.

A third modification is shown FIGS. 77(a) and 77(b). The left and right tension rollers 16a, 16b are similar to those of the first modification in that the taper surfaces 42, 43 are formed at the outer periphery of the left and right tension rollers 16a, 16b. However, according to the third modification, other taper surfaces 44, 45, which have a different slant angle than the taper surfaces 42, 43, are formed in between the taper surfaces 42, 43 and the fishing line contact faces 17a, 17b. As shown in FIG. 77(b), this configuration enables the fishing line 1 to easily enter between the fishing line contact faces 17a, 17b while still maintaining a comparatively large surface area at the fishing line contact faces 17a, 17b, so that the fishing line 1 can be firmly grasped between the fishing line contact faces 17a, 17b. As a result, a relatively large tension can be applied to the fishing line 1.

A fourth modification is shown in FIGS. 78(a) and 78(b). The fourth modification differs from the first modification in that, as shown in FIG. 78(a), the fishing line contact face 17a is indented in an conical surface. As shown in FIG. 78(b), when the fishing line 1 enters in between the fishing line contact faces 17a, 17b, the fishing line contact faces 17a, 17b strongly grasp the fishing line 1 and apply a comparatively large tension thereto.

A fifth modification is shown in FIGS. 79(a) to 80. The fifth modification differs from the fourth modification in that, as shown in FIG. 79(a), both of the fishing line contact faces 17a, 17b are formed with indented conical surfaces. As shown in FIG. 79(b), the fishing line 1 is sandwiched between the fishing line contact faces 17a, 17b at the deepest section of the fishing line introduction groove that has the longest distance tehrebetween. Also, as indicated by hatching in FIG. 80, the fishing line 1 is sandwiched at the two positions where a diametric line intersects the outer periphery of the tension roller 16. When the fishing line 1 is sandwiched between the fishing line contact faces 17a, 17b, the tension roller will slide smoothly without tilting on the support shafts 19a, 19b (refer to FIG. 31).

A sixth modification is shown in FIGS. 81(a) and 81(b). The sixth modification differs from the fifth modification in that one of the fishing line contact faces 17a, 17b is formed with an indented conical surface, and other fishing line contact faces 17a, 17b is formed with a complementary protruding conical surface. The fishing line 1 is sandwiched between these conical surfaces.

A seventh modification is shown in FIGS. 82(a) and 82(b). The seventh modification differs from the first modification in that the outer periphery of the left tension roller 16a is formed with a surface tilted to a greater extent than the taper surface 43 at the outer periphery of the right tension roller 16b. As shown in FIG. 82(b), the fishing line 1 more easily enters between the fishing line contact faces 17a, 17b.

In an eighth modification shown in FIGS. 83(a) and 83(b), an annular groove 46 is formed on the surface of the sleeve member 18 that contacts the fishing line contact face 17a. As shown in FIG. 83(b), the fishing line 1 is sandwiched between the fishing line contact faces 17a, 17b and at the same time, fits into the groove 46.

In a ninth modification shown in FIGS. 84(a) and 84(b), the outer surface of the sleeve member 18 of the tension roller 16b is formed with taper surfaces that gradually decrease the diameter of the sleeve member 18 with proximity to the fishing line contact face 17b. This results in an annular groove 46' being formed between the sleeve member 18 and the fishing line contact face 17b. As shown in FIG. 84(b), the fishing line 1 is sandwiched between the fishing line contact faces 17a, 17b and simultaneously fitted into the groove 46'. As a result, the fishing line 1 is strongly sandwiched between the fishing line contact faces 17a, 17b.

In a tenth modification shown in FIGS. 85(a) and 85(b), the left and right tension rollers 16a, 16b are formed with curved surfaces 48, 49 from the taper surfaces 42, 43 to the fishing line contact faces 17a, 17b. For this reason, the fishing line 1 smoothly follows the curved surfaces 48, 49 and smoothly enters into the fishing line guide groove between the fishing line contact faces 17a, 17b. The curved surfaces 48, 49 can alternatively be formed on one of the left and right tension rollers 16a, 16b instead.

What is claimed is:

1. A spinning reel comprising:

a reel body having a front side and a rear side, the front side facing a front side of a fishing rod and the rear side facing a rear side of the fishing rod when the spinning reel is mounted on the fishing rod;

a spool positioned at the front side of the reel body for winding therearound a fishing line, the fishing line extending from the spool toward the front side of the fishing rod;

a rotor rotatably supported on the front side of the reel body;

a bail arm assembly provided to the rotor and circularly movable around the spool; and, a line roller mechanism provided to the bail arm assembly comprising:

a first tension roller having a first fishing line contact face;

a second tension roller having a second fishing line contact face confronting the first fishing line contact face, the first tension roller and the second tension roller each having a front end side positioned towards the front side of the fishing rod and a rear end side positioned towards the rear side of the fishing rod, the first fishing line contact face and the second fishing line contact face providing a fishing line guide groove therebetween, a distance between the first fishing line contact face and the second fishing line contact face at the rear end sides being smaller than a distance therebetween at the front end sides, the fishing line being introduced form the front side of the fishing rod into a front end side of the fishing line guide groove and the fishing line being guidedly directed to the spool while being pressed by the first fishing line contact face and the second fishing line contact face at a rear end side of the fishing line guide groove during a fishing line winding operation; and a biasing member urging at least one of the first tension roller and the second tension roller to reduce a distance between the first fishing line contact face and the second fishing line contact face.

2. The spinning reel as claimed in claim 1, wherein the line roller mechanism further comprises:

a first support means provided at the bail arm assembly and having a first axis extending in a first direction, the first tension roller being rotatably and coaxially mounted on the first support means; and a second support means provided at the bail arm assembly for coaxially supporting the second tension roller and for providing a second axis extending in a second direction different from the first direction, a combination of the first axis and the second axis providing an angle protruding toward the front side of the fishing rod to provide the fishing line guide groove when the spinning reel is mounted on the fishing rod.

3. The spinning reel as claimed in claim 2, wherein the line roller mechanism further comprises an adjusting member provided at the bail arm assembly for adjusting a biasing force of the biasing member.

4. The spinning reel as claimed in claim 2, wherein the first support means comprises a first cylindrical rod member extending in the first direction and the second support means comprises a second cylindrical rod member extending in the second direction and integrally joined to the first cylindrical rod member at an intersecting portion therebetween.

5. The spinning reel as claimed in claim 2, wherein the line roller mechanism further comprises a collar provided over at least one of the first support means and the second support means for facilitating movement of the at least one of the first line roller and the second line roller over the collar.

6. The spinning reel as claimed in claim 2, wherein one of the first and second support means comprises a spherical surface portion on which a corresponding one of the first and second tension rollers is rotatably mounted.

7. The spinning reel as claimed in claim 2, wherein one of the first and second support means comprises means for changing orientation of one of the first axis and the second axis of a corresponding one of the first and second tension rollers.

8. The spinning reel as claimed in claim 2, wherein at least one of the first fishing line contact face and the second fishing line contact face is formed with a rounded portion.

9. The spinning reel as claimed in claim 2, wherein when the spinning reel is mounted on the fishing rod, one of the first fishing line contact face and the second fishing line contact face extends in a direction parallel with a fishing rod, and remaining one of the first fishing line contact face and the second fishing line contact face extends in a direction intersecting with the fishing rod.

10. The spinning reel as claimed in claim 2, wherein the first tension roller comprises a first sleeve member rotatably supported on the first support means and having an outer peripheral surface, and a flange member radially outwardly protruding from the sleeve member, and wherein the second tension roller comprises a second sleeve member engageable with the outer peripheral surface of the first sleeve member and having an axially end face, a part of the outer peripheral surface serving as a bottom of the fishing line guide groove, and the flange member serving as the first fishing line contact face, and the axially end face of the second sleeve member serving as the second fishing line contact face.

11. The spinning reel as claimed in claim 2, wherein the line roller mechanism further comprises a synchronous rotation mechanism connecting the first tension roller to the second tension roller for synchronously rotating the first tension roller and the second tension roller.

12. The spinning reel as claimed in claim 1, wherein the bail arm assembly is formed with a water drainage hole for allowing an internal space of the line roller mechanism to communicate with an atmosphere.

13. The spinning reel as claimed in claim 1, wherein the line roller mechanism further comprises:

a first support means provided at the bail arm assembly and having a first axis, the first tension roller being coaxially mounted on the first support means; and a second support means provided at the bail arm assembly and having a second axis extending in line with the first axis, the second tension roller being coaxially mounted on the second support means, so that the first tension roller and the second tension roller are coaxially provided, one of the first tension roller and the second tension roller being rotatably mounted on the corresponding first support means and the second support means, and remaining one of the first tension roller and the second tension roller being unrotatably mounted on the corresponding first support means and the second support means; one of the first fishing line contact face and the second fishing line contact face of the first tension roller and the second tension roller that is prevented from rotation being formed with an inclined surface which gradually reduces the distance between the first fishing line contact face and the second fishing line contact face toward the rear end side.

14. The spinning reel as claimed in claim 13, wherein the line roller mechanism further comprises:

means for controlling angular rotational fixing position of one of the first tension roller and the second tension roller whereby a position of the inclined surface is controlled.

15. The spinning reel as claimed in claim 13, wherein the line roller mechanism further comprises an adjusting member provided at the bail arm assembly for adjusting a biasing force of the biasing member.

16. The spinning reel as claimed in claim 13, wherein at least one of the first fishing line contact face and the second fishing line contact face is formed with a rounded portion.

17. The spinning reel as claimed in claim 13, wherein the first tension roller comprises a first sleeve member rotatably supported on the first support means and having an outer peripheral surface, and a flange member radially outwardly protruding from the sleeve member, and wherein the second tension roller comprises a second sleeve member engageable with the outer peripheral surface of the first sleeve member and having an axially end face, a part of the outer peripheral surface serving as a bottom of the fishing line guide groove and the flange member serving as the first fishing line contact face, and the axially end face of the second sleeve member serving as the second fishing line contact face.

18. The spinning reel as claimed in claim 17, wherein the flange member has a radially outer portion protruding toward the second sleeve member, and wherein the axially end face of the second sleeve member has a radially outer portion protruding toward the flange member contactable with the protruding radially outer portion of the flange member.

19. The spinning reel as claimed in claim 17, wherein the flange member has a first outer peripheral surface having an outer diameter gradually reduced toward the second sleeve member, and the second sleeve member has a second outer peripheral surface having an outer diameter gradually reduced toward the flange member.

20. The spinning reel as claimed in claim 17, wherein the outer peripheral surface of the first sleeve member has an outer diameter gradually reduced toward the flange portion.

21. The spinning reel as claimed in claim 13, wherein the first tension roller comprises an inner roller having an outer peripheral surface on which the fishing line is placed, and an outer roller having a first sleeve member disposed to surround the inner roller and movable in an axial direction thereof, the first sleeve member having a first end face serving as the first fishing line contact surface;

the second tension roller having a second sleeve member disposed to surround the inner roller and having a second end face confronting the first end face to serve as the second fishing line contact face, an angular rotational position of the second tension roller being adjustably fixed.

* * * * *